(12) United States Patent
Kelley

(10) Patent No.: US 8,335,780 B2
(45) Date of Patent: Dec. 18, 2012

(54) SCALABLE HIGH SPEED RELATIONAL PROCESSOR FOR DATABASES AND NETWORKS

(76) Inventor: James Madison Kelley, Saratoga, CA (US)

( * ) Notice: Subject to any disclaimer, the term of this patent is extended or adjusted under 35 U.S.C. 154(b) by 682 days.

(21) Appl. No.: 12/400,611

(22) Filed: Mar. 9, 2009

(65) Prior Publication Data
US 2009/0265320 A1 Oct. 22, 2009

Related U.S. Application Data

(60) Provisional application No. 61/035,649, filed on Mar. 11, 2008.

(51) Int. Cl.
*G06F 17/30* (2006.01)
*G06F 15/16* (2006.01)
(52) U.S. Cl. ........................................ 707/713; 707/706
(58) Field of Classification Search .................. 707/706; 711/108
See application file for complete search history.

(56) References Cited

U.S. PATENT DOCUMENTS

| | | |
|---|---|---|
| 4,567,572 A | 1/1986 | Morris et al. |
| 5,566,170 A | 10/1996 | Bakke et al. |
| 5,611,076 A | 3/1997 | Durflinger et al. |
| 5,619,713 A | 4/1997 | Baum et al. |
| 5,740,171 A | 4/1998 | Mazzola |
| 5,835,720 A | 11/1998 | Nelson et al. |
| 5,845,091 A | 12/1998 | Dunne et al. |
| 5,873,078 A | 2/1999 | Angle et al. |
| 5,917,820 A | 6/1999 | Rekter |
| 5,983,223 A | 11/1999 | Perlman |
| 6,018,524 A | 1/2000 | Turner et al. |
| 6,061,368 A | 5/2000 | Hitzelberger |
| 6,061,712 A | 5/2000 | Tzeng |
| 6,157,641 A | 12/2000 | Wilford |
| 6,212,183 B1 | 4/2001 | Wilford |
| 6,223,172 B1 | 4/2001 | Hunter et al. |
| 6,237,061 B1 | 5/2001 | Srinivasan |
| 6,266,705 B1 | 7/2001 | Ullam et al. |
| 6,334,123 B1 | 12/2001 | Ross |
| 6,370,145 B1 | 4/2002 | Dally et al. |
| 6,370,613 B1 | 4/2002 | Diede et al. |
| 6,374,326 B1 * | 4/2002 | Kansal et al. ................. 711/108 |
| 6,389,507 B1 * | 5/2002 | Sherman ....................... 711/108 |
| 6,487,547 B1 | 11/2002 | Ellison et al. |
| 6,633,953 B2 | 10/2003 | Stark |
| 6,680,916 B2 | 1/2004 | Puleston |
| 6,725,326 B1 | 4/2004 | Patra et al. |
| 6,728,732 B1 | 4/2004 | Eatherton et al. |
| 6,738,862 B1 | 5/2004 | Ross et al. |
| 6,763,348 B2 | 7/2004 | O'Keefe et al. |

(Continued)

*Primary Examiner* — Tony Mahmoudi
*Assistant Examiner* — Brittany N McCue

(57) ABSTRACT

A relational processor (RP) to create, maintain and query a relational database by assigning, storing and retrieving a unique associate for each instance of a relation for one or more relations and a plurality of instances of a relation. The associate may contain one or more semantic tokens. The RP comprises an input for receiving and processing relations, relation instances and queries, at least one associate processor (AP) for storing the associate and retrieving associate sets by domain, at least one set processor (SP) for performing set operations on associate sets to satisfy a query, and output which outputs the associates responsive to a query. The RP further includes an associate array manager (AAM) for managing the APs, and the SPs (which are arranged in the sieve architecture) and a response collector (RC) that collects the associate sets that satisfy a query. An alternative architecture uses an associate switch (AS), which routs associates from the APs to the SPs based on associate value.

20 Claims, 62 Drawing Sheets

U.S. PATENT DOCUMENTS

| | | |
|---|---|---|
| 6,766,317 B2 | 7/2004 | Sahrma et al. |
| 6,788,695 B1 | 9/2004 | Nagasawa |
| 6,792,423 B1 | 9/2004 | Jeffries et al. |
| 6,804,241 B2 | 10/2004 | Schwartz et al. |
| 6,820,120 B1 | 11/2004 | Keats et al. |
| 6,839,800 B2 | 1/2005 | Stark |
| 6,889,225 B2 | 5/2005 | Cheng et al. |
| 6,961,725 B2 * | 11/2005 | Yuan et al. .................... 707/694 |
| 7,212,531 B1 | 5/2007 | Kopelman et al. |
| 7,286,528 B1 | 10/2007 | Pannell |
| 2001/0043602 A1 | 11/2001 | Brown |
| 2005/0262294 A1 | 11/2005 | Bitar |

* cited by examiner

240

142 ► search(key1,key2) = search(key1) .intersection. search (key2)

```
search : (E,9)    {1,3,4,7,8,9}    .I.{null}          = {null}
search : (E,1)    {1,3,4,7,8,9}    .I.{7}             = {7}
search : (E,5)    {1,3,4,7,8,9}    .I.{3}             = {3}
search : (E,A)    {1,3,4,7,8,9}    .I.{4}             = {4}
search : (D,9)    {2,5}            .I.  {null}        = {null}
search : (D,D)    {2,5}            .I.  {2}           = {2}
search : (D,E)    {2,5}            .I.  {5}           = {5}
search : (C,0)           {6}       .I.  {6}           = {6}
search : (E,2) {1,3,4,7,8,9}       .I. {9,10,11,12,13} = {9}
```

For Sets A, B and C

Commutative Law :
A .intersection. B = B .intersection. A
A .union. B = B .union. A Associative Law :

(A .intersection. B ) .intersection. C
= A .intersection. (B .intersection. C)

(A .union. B ) .union. C
= A .union. (B .union. C)

Distributive Law :

(A .intersection B) .union. C = (A .union. C) .intersection. (B .union. C)

(A .union. B) .intersection. C = (A .intersection.C) .union. (B .intersection.C)

FIG. 28

| K1 | K2 | K3 | a |
|----|----|----|---|
| 1 | 3 | 5 | 1 |
| 1 | 2 | 4 | 2 |
| 1 | 9 | 4 | 3 |
| 1 | 2 | 5 | 4 |
| 3 | 3 | 5 | 5 |
| 3 | 1 | 5 | 6 |
| 2 | 2 | 4 | 7 |
| 4 | 9 | 4 | 8 |

FIG. 30A

| K1=1 | OP1 | K2=2 | OP2 | K3=5 |
|------|-----|------|-----|------|
| | and | | and | |
| | and | | or | |
| | and | | eor | |
| | or | | and | |
| | or | | or | |
| | or | | eor | |
| | eor | | and | |
| | cor | | or | |
| | eor | | eor | |

FIG. 30B

| K1=1 | | K2=2 | | K3=5 | | |
|------|------|------|------|------|---|---|
| | OP1 | | OP2 | | | |
| {1,2,3,4} | intersection | {2,4} | intersection | {1,4,5,6} | = | {4} |
| | intersection | {2,4} | union | | = | {1,2,4,5,6} |
| | intersection | {2,4} | difference | | = | {1,2,5,6} |
| | union | {1,2,3,4,7} | intersection | | = | {1,4} |
| | union | {1,2,3,4,7} | union | | = | {1,2,3,4,5,6,7} |
| | union | {1,2,3,4,7} | difference | | = | {5,6,7} |
| | difference | {1,3,7} | intersection | | = | {1} |
| | difference | {1,3,7} | union | | = | {1,3,4,5,6,7} |
| | difference | {1,3,7} | difference | | = | {3,4,5,6,7} |

DeMorgan's Logic laws
NOT (A .AND. B) = NOT (A) .OR. NOT (B)
NOT (A .OR. B) = NOT (A) .AND. NOT (B)

DeMorgan's Set laws
C(A .Intersection. B) = C(A) .Union. C (B)
C(A .Union. B) = C(A) .Intersection. C(B)

where:
C = Set Complement

630

Precedence Order of Boolean Operations

| | |
|---|---|
| 1) | Parentheses |
| 2) | Negation |
| 3) | AND |
| 4) | OR |

900

| Mode (2 bits) | Field 2 (31 bits) | Field 1 (31 bits) |
|---|---|---|
| 00 | associate_link | associate 1 |
| 01 | associate 2 | associate 1 |
| 10 | key 1_Link | key 1 |
| 11 | associate_link | key_link |

| | | AP worst Case Performance | | | | | |
|---|---|---|---|---|---|---|---|
| 64 bit word | p | 1 | 2 | 3 | 4 | 5 | 6 |
| | 1 | 1 | 3 | 4 | 7 | 8,9 | |
| | 2 | 9 | 10 | 11 | 12,13 | | |
| | 3 | | 1,9 | 3,10 | 4,11 | 7,12,13 | 8,9 |

| | | Cycle | 1 | 2 | 3 | 4 | 5 |
|---|---|---|---|---|---|---|---|
| 96 bit word | P | | 1 | 2 | 3 | 4 | 5 |
| | 1 | | 1,3 | 4,7 | 8,9 | | |
| | 2 | | 9,10 | 11,12 | 13 | | |
| | 3 | | | 1,3,9,10 | 4,7,11,12 | 8,9,13 | |

72 bit word Static Memory

| mode (4 bits) | key1 (8 bits) | link (20 bits) | associate(20 bits) | associate(20 bits) |
|---|---|---|---|---|

| | mode | key1 | link | associate | associate |
|---|---|---|---|---|---|
| 902 | 00 | key1 | associate_link | Associate 2 | Associate 1 |
| 904 | 01 | key1 | Associate 5 | Associate 4 | Associate 3 |
| 906 | 10 | key1 | key1_link | associate2 | associate1 |
| 908 | 11 | key1 | key_link | associate_link | associate1 |

| Source IP | Source Port | Permit/Deny |
|---|---|---|
| Destination IP | Destination Port | Other |

982, 984, 986 (headers); 988, 990, 1000 (bottom labels)

| Source associate | Source Port | Permit/Deny |
|---|---|---|
| Destination associate | Destination Port | Other |

1004, 1006 (headers); 1008, 1010, 1012 (bottom labels)

FIG. 61B

SCALABLE HIGH SPEED RELATIONAL PROCESSOR FOR DATABASES AND NETWORKS

CROSS-REFERENCE TO RELATED APPLICATIONS

This application claims the benefit of provisional application Ser. No. 61/035,649 filed Mar. 11, 2008 by the present inventor.

FEDERALLY SPONSORED RESEARCH

Not Applicable.

SEQUENCE LISTING OF PROGRAM

Not Applicable

BACKGROUND OF THE INVENTION

1. Technical Field of the Invention

The present invention relates in general to a relational processor. More specifically, the present invention relates to an improved relational processor that is used to implement scalable high speed database systems and particularly to relational database systems 2. Description of the Related Art There are various systems for storing, searching and accessing data in relational databases. High speed database requirements are characterized in terms of memory capacity, processing speed, types of operations to be performed and by the characteristics of the data. However, current databases are too slow to make it practical to routinely solve complex logic problems. Real-time relational databases are not extant.

U.S. Pat. No. 6,334,123 issued to Ross on Dec. 25, 2001 discloses a method of relational processing where a query of one or more databases of records returns the query result in the form of one or more threads of parallel words. A collection generator generates one or more intermediate vectors of serial bit streams from the one or more threads, and processes the one or more intermediate vectors with a relational processor. The relational processor is operable to perform one or more logical operations thereon in a single pass, and outputs a contiguous serial bit stream. But such a relational processor is not efficient to solve complex logic problems.

U.S. Patent Application. No. 20050262294 issued to Nabil Bitar, on May 5, 2004 discloses a TCAM-Memory hybrid scheme that enables high search rates with memory based search and the TCAM can be configured to return a memory pointer to a head of an action list. In such a hybrid scheme the actions are daisy-chained in a strict order in memory and are applied to the packet in the same order. However, the attempts to improve memory storage capacity by the daisy chained TCAM components leads in a slow down processing.

U.S. Pat. No. 6,738,862 issued to Rose, on May 18, 2004 provides a method and system for flexible matching of data in a CAM. The entries of the CAM are logically grouped in a set of blocks, each block having a single mask that applies to all entries in the block. However, the CAM has a hard limit on memory capacity. Furthermore, the power consumption of the CAM is too large for large systems.

One prior art, taught in U.S. Pat. No. 6,237,061 issued to Srinivasan on May 22, 2001 provides a ternary content addressable memory to perform a longest prefix match search. Each content addressable memory cell within the ternary content addressable memory has an associated mask cell so that the content addressable memory cells may be individually masked. Since each CAM entry is masked according to an associated prefix value, the ternary CAM requires only one search operation to locate the CAM entry having the longest matching prefix. However, such a longest prefix match search process is very difficult to implement.

Hence, it can be seen, that there is a need for an ultra high speed relational processor that would be scalable both in speed and memory capacity. Further, such a device would be capable of solving complex logic problems in real time. Such a needed device does rely on preordering of database keys and can be updated dynamically without presorting. Such a device would also permit a plurality of relations to be dynamically maintained without switchover overhead. Such a needed device is easy to reprogram for changes in input relations in contrast to hash devices in which the algorithms are tailored to the input. Such a needed device introduces a longest prefix match search that is easy to implement and efficient. The device would be capable of performing operations between relational domains and between relations and be user programmable. Moreover, such a device would have lower power consumption and is more economical. The present invention accomplishes these objectives.

SUMMARY OF THE INVENTION

To minimize the limitations found in the prior art, and to minimize other limitations that will be apparent upon the reading of the specifications, the present invention provides a relational processor for storing relational instances and processing relational queries using a unique isomorphic mapping. The relational processor RP comprises of at least one input means for receiving and processing query packets, at least one associate processor AP for generating at least one associate set {a} and at least one set processor SP for generating at least one response associate a and at least one output means for transmitting the response associate to at least one user or a machine. The AP performs at least one operation on the relational instance. The RP further includes an associate array manager AAM, an associate switch AS and a response collector RC. The relational processor utilizes a unique isomorphic mapping between a specified domain of the at least one relational instance and a unique associate for processing the at least one relational instance. The input means may include an input network processor unit INPU and the output means may include an output network processor unit ONPU. The AS routs the at least one associate set to the SP using a longest prefix match algorithm or some other algorithm. The SP is adaptable to perform set operations on the associate set.

In another aspect of the present invention is a method for storing and processing a query packet using a relational processor comprising of receiving the query packet by at least one input means and extracting at the data and command from the query packet. The method further includes at least one associate processor for receiving data and command and producing at least one associate set. The method further comprises receiving the associate sets generated by the at least one AP and performing at least one set operation on the associate sets to generate at least one response associate and moreover transmitting the at least one response by at least one output means to at least one user or to a machine through a network interface.

Objects and Advantages

One objective of the invention is to provide a relational processor that allows implementing scalable high speed database systems.

A second objective of the invention is to provide a relational processor adaptable to use new automatic storage and retrieval algorithms based on relations and set theory.

A third objective of the invention is to provide a relational processor that uses new methods for mapping relations into serial and parallel physical memory structures.

A fourth objective of the invention is to provide a relational processor adaptable to perform operations on a relational instance.

A fifth objective of the invention is to provide a relational processor that permits creation of a database by an insertion operation of a relational instance.

A sixth objective of the invention is to provide a relational processor that allows a deletion of data from a database by reference to a relational instance.

A seventh objective of the invention is to provide a relational processor that permits a search operation of a database by reference to a relational instance.

An eighth objective of the invention is to provide a relational processor that introduces new methods for determining the determining the longest prefix match including network routing and genomic sequencing.

A ninth objective of the invention is to provide a relational processor that permits an automatic physical memory management.

A tenth objective of the invention is to provide a relational processor that permits an automatic associate memory management.

An eleventh objective of the invention is to provide a relational processor that permits set operations to be performed on associate sets.

A twelfth objective of the invention is to provide a relational processor whereby databases can be dynamically updated in real time and the insertion and deletion of the relational instance requires approximately the same time as the search for the relational instance.

A thirteenth objective of the invention is to provide a relational processor that permits relations to be compressed using associate mappings facilitating high speed transmission of encrypted data.

A fourteenth objective of the invention is to provide a relational processor that enables the use of semantic associates thus permitting meaning to be immediately assigned to an associate response set.

A fifteenth objective of the invention is to provide a relational processor that enables the query optimization by the collecting statistics on the various stages of query processing non intrusively.

A sixteenth objective of the invention is to provide a relational processor multidimensional proximity search.

A seventeenth objective is to provide of a method of efficiently implementing the relational data model and its operations in a relational processor.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 11 is a block diagram illustrating a simple performance example in a search operation of the generation of a response associates based on the associates stored in the two lists;

FIG. 28 is a block diagram illustrating a plurality of laws that is followed by set operations;

FIG. 30A, FIG. 30B and FIG. 30C is a schematic diagram illustrating a simple example of set operations mapped into an AP;

FIG. 55 is a schematic diagram illustrating a more sophisticated AP data structure;

FIG. 56 is a diagrammatic representation illustrating a processing pipeline for 64 bit and 96 bit word using a new flexible and efficient data structure;

FIG. 59 is a schematic diagram illustrating a logical memory word for a 72-bit word in a memory of 1 million entries;

FIG. 61A is a block illustrating a typical contents of a flow control table that has a plurality of table entries similar to an access control list;

FIG. 61 B is a block illustrating a compressed access control list that;

FIG. 62 B is a schematic diagram illustrating an IPV6 packet header having the same response associate produced by the IPV4 packet header of the RP.

Throughout the description, similar reference numbers are used to identify similar elements.

DETAILED DESCRIPTION OF THE DRAWINGS

In the following discussion that addresses a number of embodiments and applications of the present invention, reference is made to the accompanying drawings that form a part of hereof, and in which is shown by way of illustration specific embodiments in which the invention may be practiced. It is to be understood that other embodiments may be made without departing from the scope of the present invention.

Various inventive features are described below that can each be used independently of one another or in combination with other features.

Figure 1:
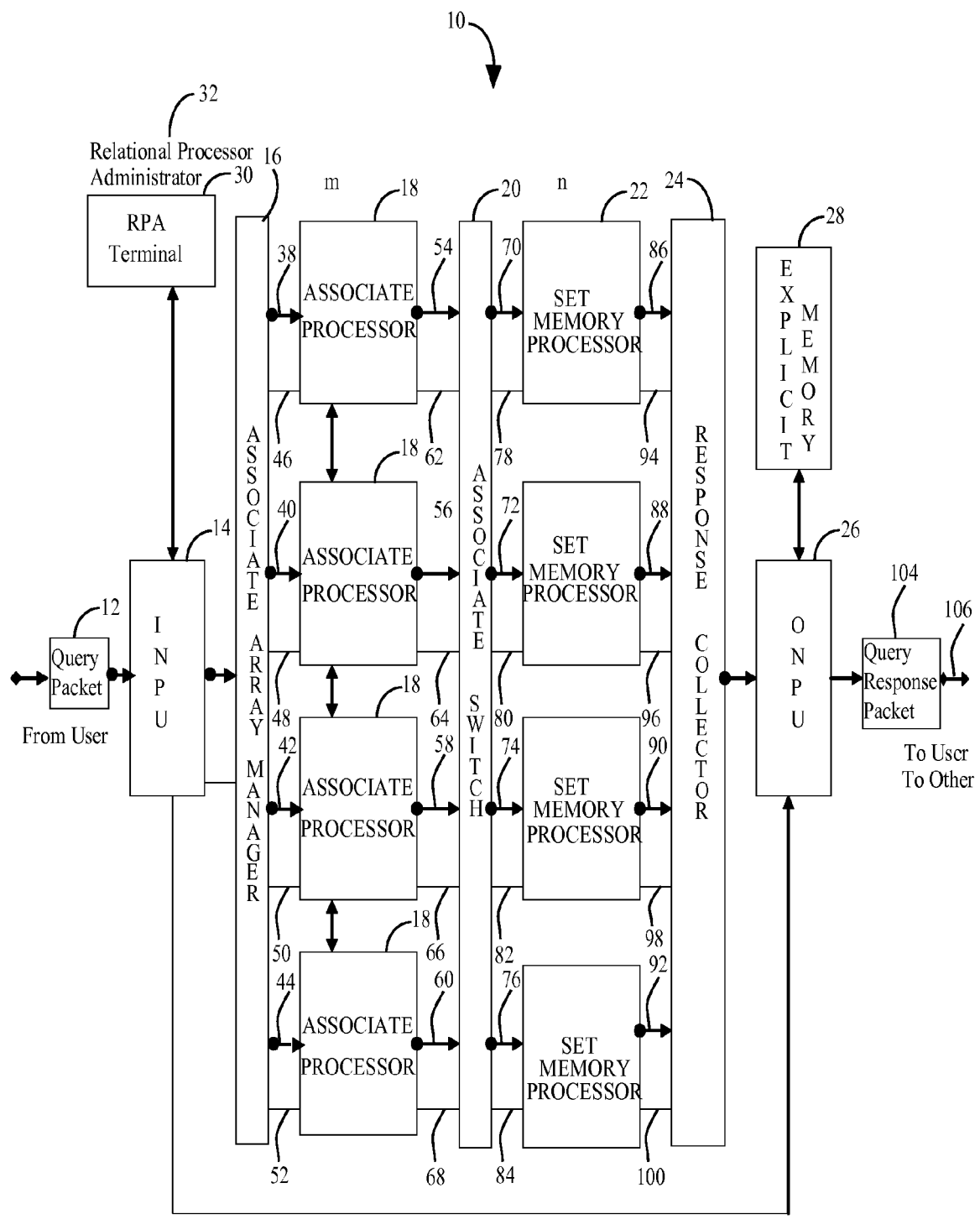
FIG. 1 is a block diagram of the present invention showing an architecture of a relational processor for storing and processing at least one query packet.

FIG. 1 shows a parallel architecture of a relational processor (RP) generally indicated as 10 for storing and processing query packets 12 that include relational instance rij and the relational query commands comprised of Select, Project, Union, Set Difference, Cartesian product, Set Intersection, Division, and Join. These operations are compiled to a series of AP and SP machine commands preferably by the client software or the INPU. The RP 10 comprises input means 14 for receiving the at least one query packet 12 and extracting at least one data and command, at least one Associate Array Manager (AAM) 16 that manages associate allocation and de-allocation and interprets and distributes commands and data to the associate processor (AP) 18. The AP is capable of the search operation but also in the preferred embodiment is also capable of the insert, delete or nop operations where a search operation on a domain key rij(dk) generates an associate set responsive rij (dk) {a} to the data and command. At least one Set Memory Processor (SP) 22 for receiving associate sets and performing set operations one to select at least one response associate. The output means 26 for formulating and transmitting query response packets 104 to users 106 or machines 106 through a network interface. The signaling connections indicated as 46, 48, 50, 52, 62, 64, 66, 68, 78, 80, 82, 84, 94, 96, 98 and 100 communicates the status of a query operation throughout RP 10.

The data and command includes at least one relational instance Rij and relational query. The RP 10 utilizes a unique mapping between a specified domain of the relational instance rij (dk) FIG. 2 and a unique associate aij for processing the relational instance Rij.

The input means may include an input network processor unit (INPU) 14 and the output means may include an output network processor unit (ONPU) 26. The AAM 16 rendered with a plurality of ports indicated as 38, 40, 42, 44 interprets and routs data and commands to the AP 18. The AP 18 having a plurality of output ports indicated as 54, 56, 58, 60 and an associate switch (AS) 20. The AS 20 includes a plurality of output ports indicated as 70, 72, 74, 76 that rout associates to SP 22. SP 22 has a plurality of output ports indicated as 86, 88, 90 92 and a response collector (RC) 24 that collects associates responsive to the query from SP 22 and formulates and transmits response associates to the ONPU 26. The query packet 12 includes packet header information 334. The ONPU 26 receives the packet information in the query packet 12 from the INPU 14 and uses the packet information to formulate the query response packet 104. The ONPU 26 transmits the query response packet 104 to the recipient 106 machine through the network interface. The RP 10 is administered by a RP administrator (RPA) 32 who performs the duties of defining the machine structure in terms of the number and types APs 18 and SPs 22 that have been used to configure the RP 10. In addition, the RPA 32 specifies the mappings of a logical relational schema into a physical machine schema.

Figure 2:
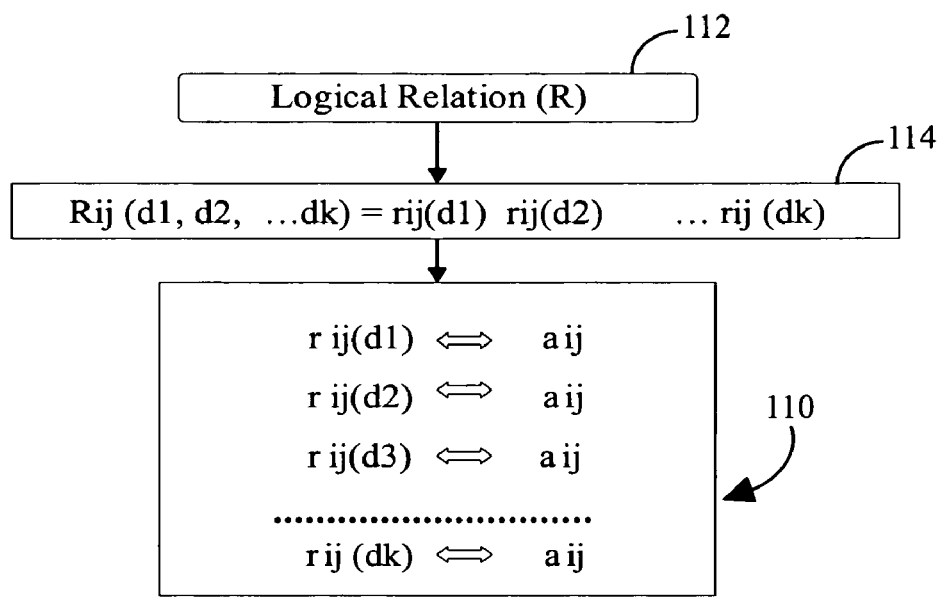
FIG. 2 is a flow chart illustrating a decomposition and an isomorphic mapping of a logical relation R.

FIG. 2 shows a decomposition and an isomorphic mapping of a logical relation R. The logical relation R as indicated at top block 112 is assigned an index i such that the relation between R and i is isomorphic. A unique associate aij is assigned to a $j^{th}$ instance of a relation Rij. The $j^{th}$ instance of a relation Rij having k domains d1, d2, . . . , dk are decomposed into a series of k single domain relations as Rij (d1, d2, . . . dk)=rij (d1) rij (d2) rij (dk), where d1, d2, . . . dk are domain values as shown at the second block 114. Each single domain relation rij (dk) is mapped into its corresponding unique associate aij as rij (dk)→i|dk|→aij as shown at the third block 116 where |dk| is the binary representation of the domain value dk. The isomorphic mapping process indicated at block 116 is reversible. The mapping performed at the third block 116 of the decomposed relations into the machine schema is done by assigning the domain relation rij (dk) as relational instance domain key for the AP 18 that stores the domain mapping 116. The i|dk| effectively become the key for storing at least one relationship to corresponding associate aij. The at least one AP 18 is adaptable to perform at least the search operation for the relational instance rij. The preferred operations include search, delete, insert, nop or the like. Higher level relational algebra or calculus commands are compiled or interpreted into the preferred operations.

Figure 3:
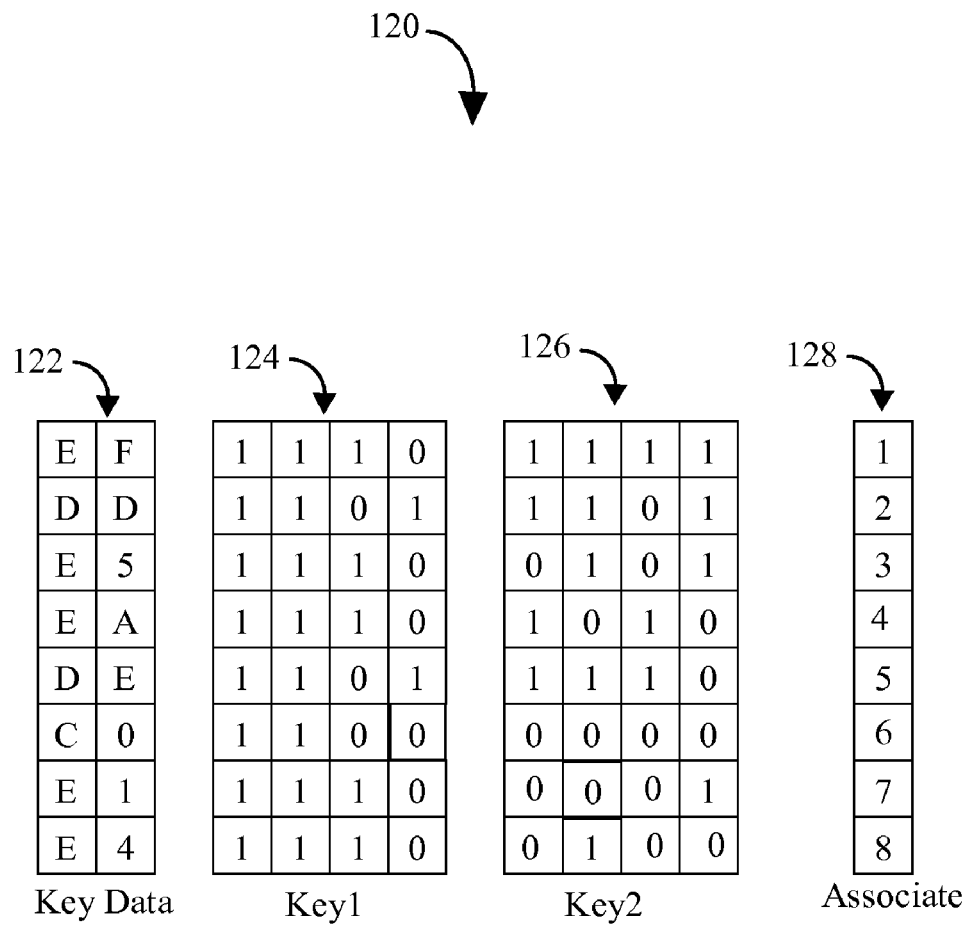
FIG. 3 is a schematic diagram illustrating an example for assigned associations between the domain keys.

FIG. 3 shows a simple example for of assigned associations 120 between the domain keys. The keys are in a hexadecimal representation indicated as 122. The keys are converted to a binary format indicated as 124 and 126. The associates indicated as 128 correspond to the keys shown as 122.

Figure 4:
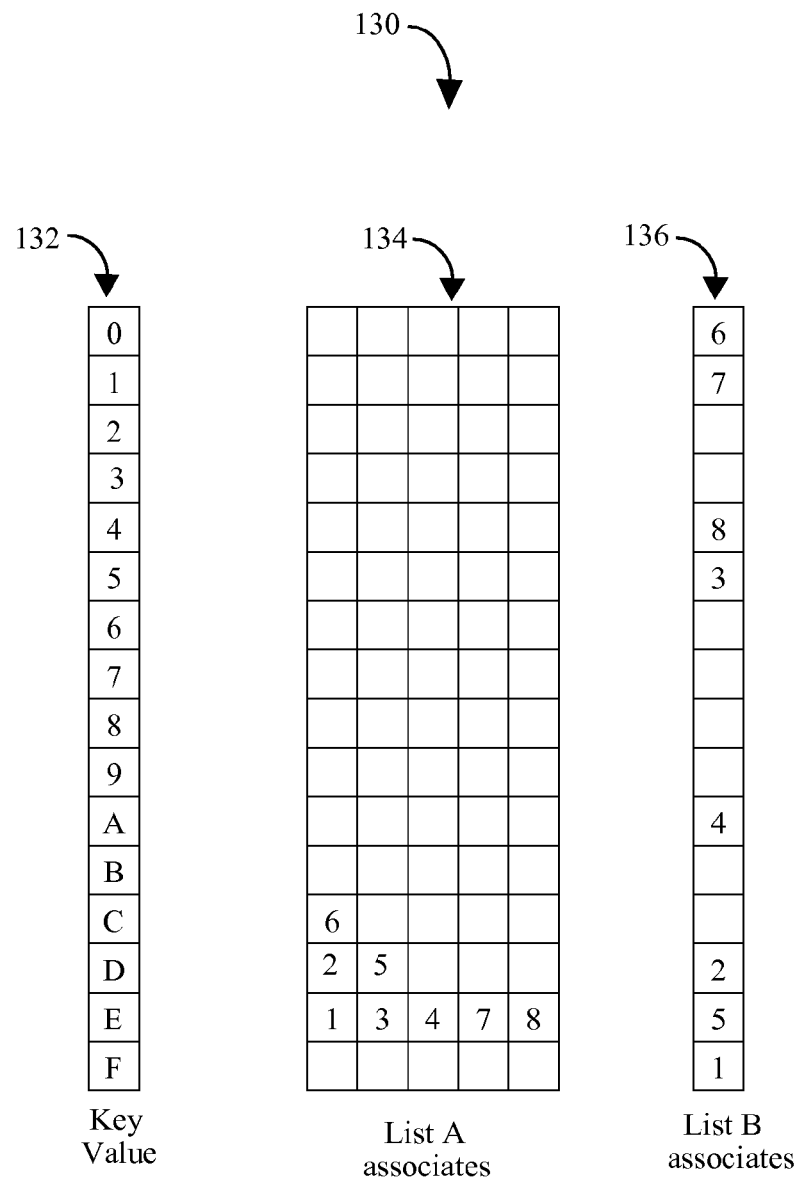
FIG. 4 is a schematic diagram illustrating an example of storage of an associate in a list data structure list A and in a list data structure list B in an AP by the key values.

FIG. 4 shows an example 130 for storage of the associates in a list data structure, list A 134 and in a list data structure, list B 136 in the at least one AP 18 by the key values 132. Data structures such as a list, a stack, a queue or the like may be used to store the associates.

Figure 5:
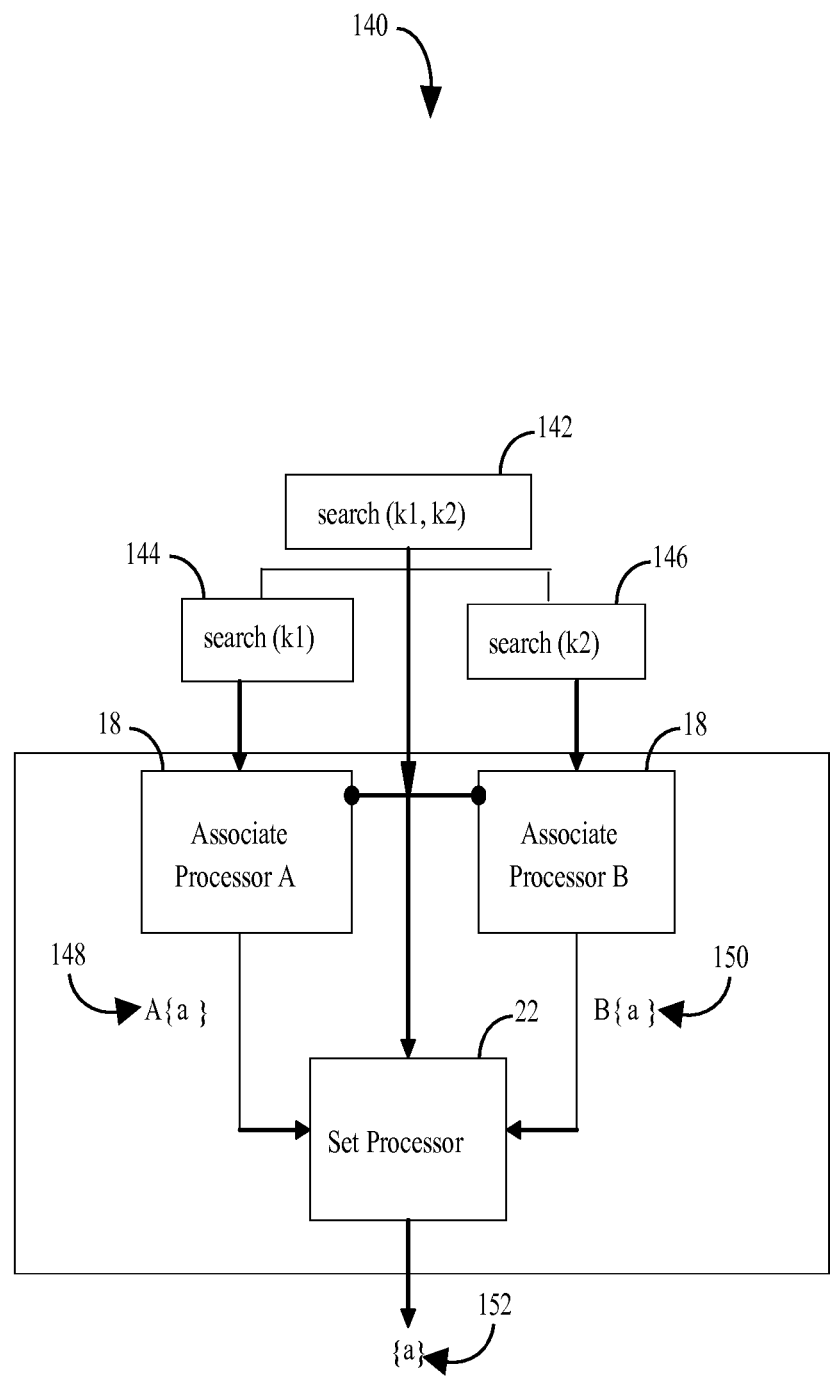
FIG. 5 is a block diagram illustrating a parallel hardware implementation of the RP for performing an example search operation to find a relational instance.

FIG. 5 shows a parallel hardware implementation 140 of the RP 10 for performing an operation search (key1, key2) to find the at least one relational instance rij as shown at block 142, for example. In the search operation, search (key1, key2) 142, key1 and key2 are the domain keys of a relational instance rij. The search operation (key1, key2) 142 is decomposed into two autonomous search operations, search (key1) 144 and search (key2) 146 on AP A and AP B generally indicated as 18. When search (key1) 144 is applied to list A 134 of FIG. 4, an associate set A {a} 148 is generated and when search (key2) 146 is applied to list B 136 of FIG. 4, an associate set B {a} 150 is generated. The associate set A {a} 148 and the associate set B {a} 150 are sent to the SP 22 which performs an intersection operation on the associate sets 148 and 150 to select response associates {a} 152. The response associate 152 is the associate Rij corresponding to the relational instance Rij.

Figure 6:
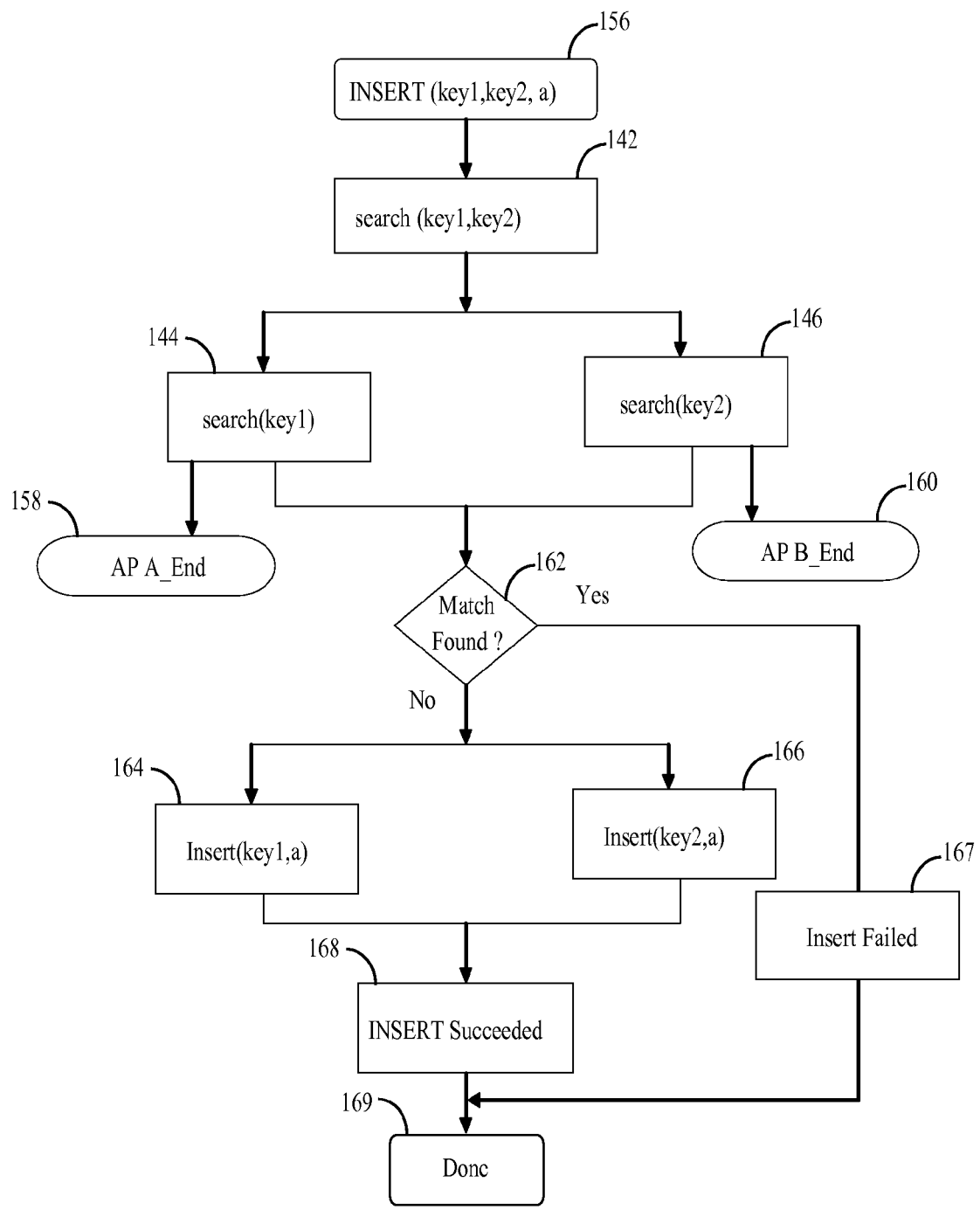
FIG. 6 is a flow chart illustrating an implementation for an insert operation for inserting relational instance into the RP.

FIG. 6 shows an implementation for the operation insert (key1, key2, a). As shown at block 156, the relational instance Rij being inserted into the RP 10, wherein a is the associate corresponding to the relational instance Rij. The operation, search (key1, key2) 142, precedes the insert operation insert (key1, key2, a) 156. The operation search (key1, key2) 142 is performed as in FIG. 5. During the search operation, a check is done at block 162 to verify whether the intersection operation performed by the SP 22 generates a response associate 152. If the check 162 is evaluated to "Yes", there is a matching relational instance corresponding to the associate a. If a match occurs, the insert operation 156 fails 167 and terminates 169. If no match occurs, the relational instance is not in the RP 10 and the insertion of the relational instance proceeds. The insert operation, insert (key1, key2, a) 156 decomposes into autonomous insert operations insert (key1, a) 164 and insert (key2, a) 166 and the relational instance Ri (key1, key2,a) 156 is successfully inserted into in the RP 10 168 and the insert operation 156 terminates as shown at block 169.

During search (key1, key2) 142, if no associate is output from the AP A 18 a signal AP_A_End 158 is generated by the AP A 18 to terminate the search operation 142 to speed up and complete the insert (key1, key2, a) 156. Similarly, if there is no associate from the AP B 18, then a signal AP_B_End 160 is generated by the AP B 18 to terminate the search operation 146 and to speed up the insert operation 166. The operation search (key1, key2) 142 terminates when AP 18 produces no match 162.

Figure 7:
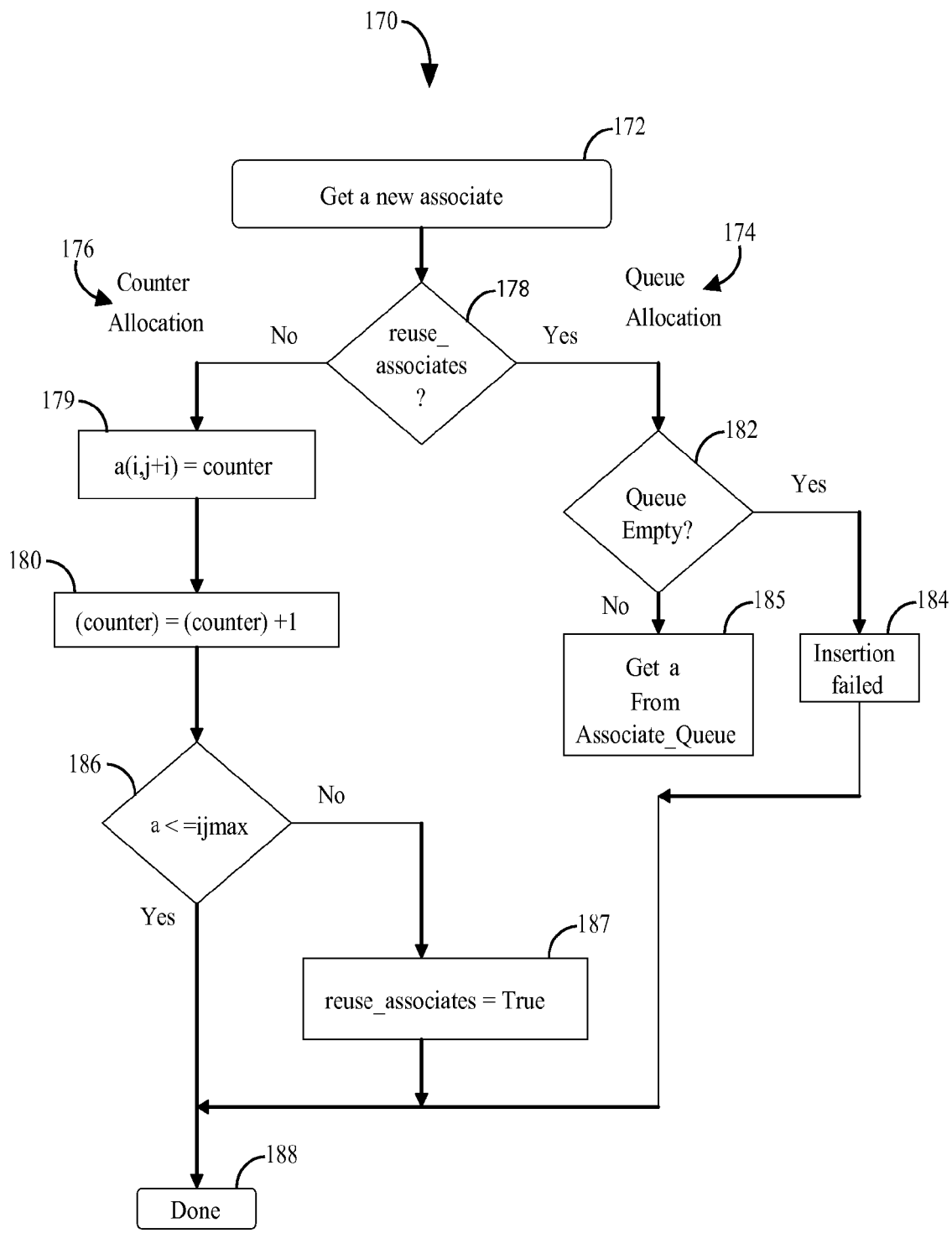
FIG. 7 is an operational flow chart illustrating an automatic associate management process.

FIG. 7 shows an operational flowchart 170 of an automatic associate management process for getting a for the operation insert (key1, key2, a) 156. Insert (key1, key2, a) 156 performs, a request for the at least one associate 172. The method is allocates the associate. The method includes a counter allocation 176, queue allocation as indicated at block 174. A check for a reuse_associate is made at block 178 to verify whether a reuse_associate flag is set to false. If the reuse_associate flag is set to false, the counter allocation method as in block 176 is used. In the counter allocation method as in blocks 176 and 179 a counter does the initial allocation of associate index. As each associate index is generated the counter is incremented as shown at 180. The counter is checked at block 186 if it is at maximum value. When the counter is the maximum the counter allocation method is turned off. If the reuse_associate flag is set true, the queue allocation method is used. In the queue allocation method a queue stores the associates and a check is made at block 182 to determine if the queue is empty, if the queue is empty, the insertion status is failed as shown at block 184 and the insert operation 156 terminates as shown at block 188.

Figure 8:
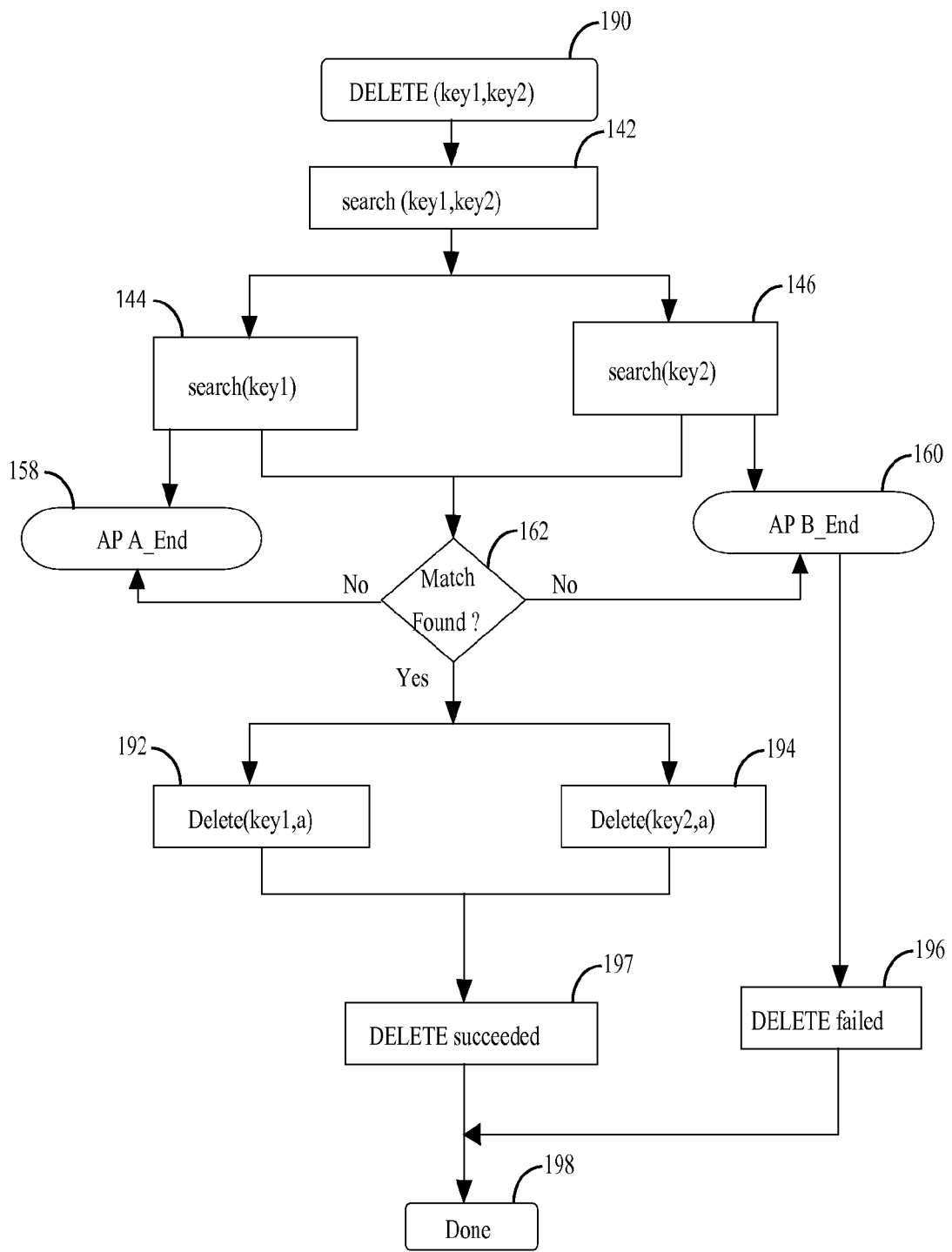
FIG. 8 is a flow chart illustrating an implementation for a delete operation for deleting a relational instance from a RP.

FIG. 8 shows an implementation of DELETE (key1, key2) 190 for deleting a relational instance Rij (key1,key2) from the RP 10. The search (key1, key2) 142 is performed as in FIG. 5 before the deletion as shown in the block 190 to determine if the relational instance to be deleted is extant in the RP 10. During the search operation 142, a check is made at block 162 to verify if the result of the intersection operation performed by the at least one SP 22 produces one response associate 152. If there is a match, the relational instance corresponding to the associate a is present in the RP 10, that signals the delete operation 190 of the relational instance to proceed. The operation delete (key1, key2, a) 190 is decomposed into autonomous delete operations delete (key1, a) 192 and delete (key2, a) 194 for the AP A 18 and the AP B 18 respectively and the relational instance rij is successfully deleted from the RP 10. If there is no match, the relational instance being searched is not in the RP 10 and the deletion operation 190 fails as indicated at block 196 and terminates as shown at block 198. If there is no match 162, the AP A_End 158 and AP B_End 160 signals generated terminate AP search 142. The AP A_End 158, AP B_End 160 signals with no match found 162 trigger 196.

Figure 9:
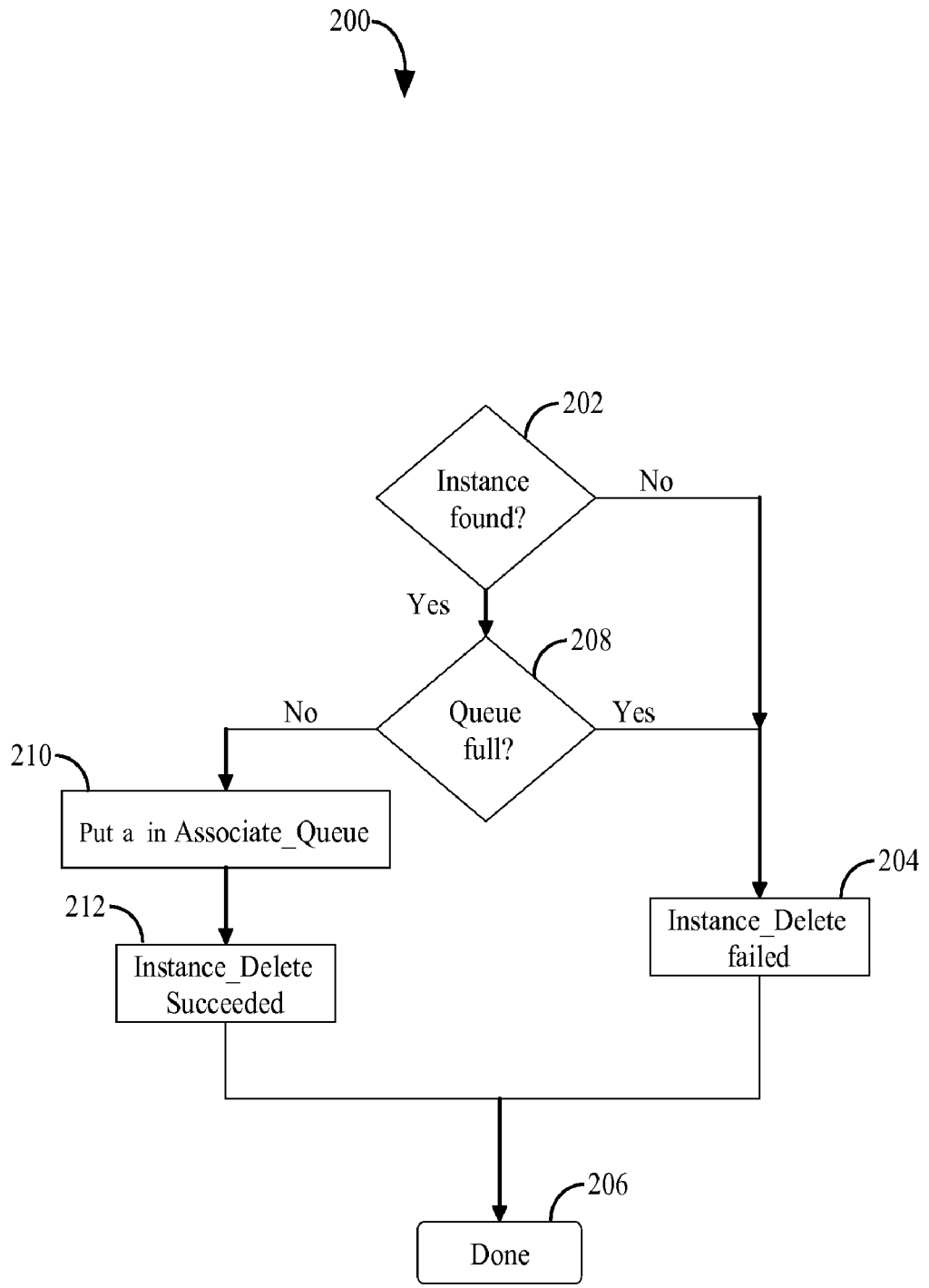
FIG. 9 is a flow chart illustrating an automatic associate management process for reusing an associate released by a delete operation.

FIG. 9 shows an automatic associate management process 200 for putting a deleted associate in a queue for reuse 210 for the delete operation 190. During a deletion, the associate corresponding to a deleted relational instance is inserted into a queue 200. A check is made at block 202 to verify if the relational instance is extant in the RP 10 for deletion. If the relational instance is not extant in the RP 10 then a status is set to fail as shown at block 204 and the delete terminates 206. If the relational instance to be deleted is extant in the RP 10, then a check is made at block 208 to determine if the queue is full. If the queue is full then the delete operation 190 will fail as indicated at block 204 and the process 200 terminates as shown in block 206. If the queue is not full, then the associate is put into the queue as shown in the block 210, the queuing operation is successful as indicated at block 212, and terminates 206. Thereby when the relational instance is deleted, its associate is reclaimed for use. This associate management process is generally necessary because memory is a finite resource and should be managed efficiently. The associates present in the queue are allocated to new relational instances by the insertion operation 156.

Figure 10:
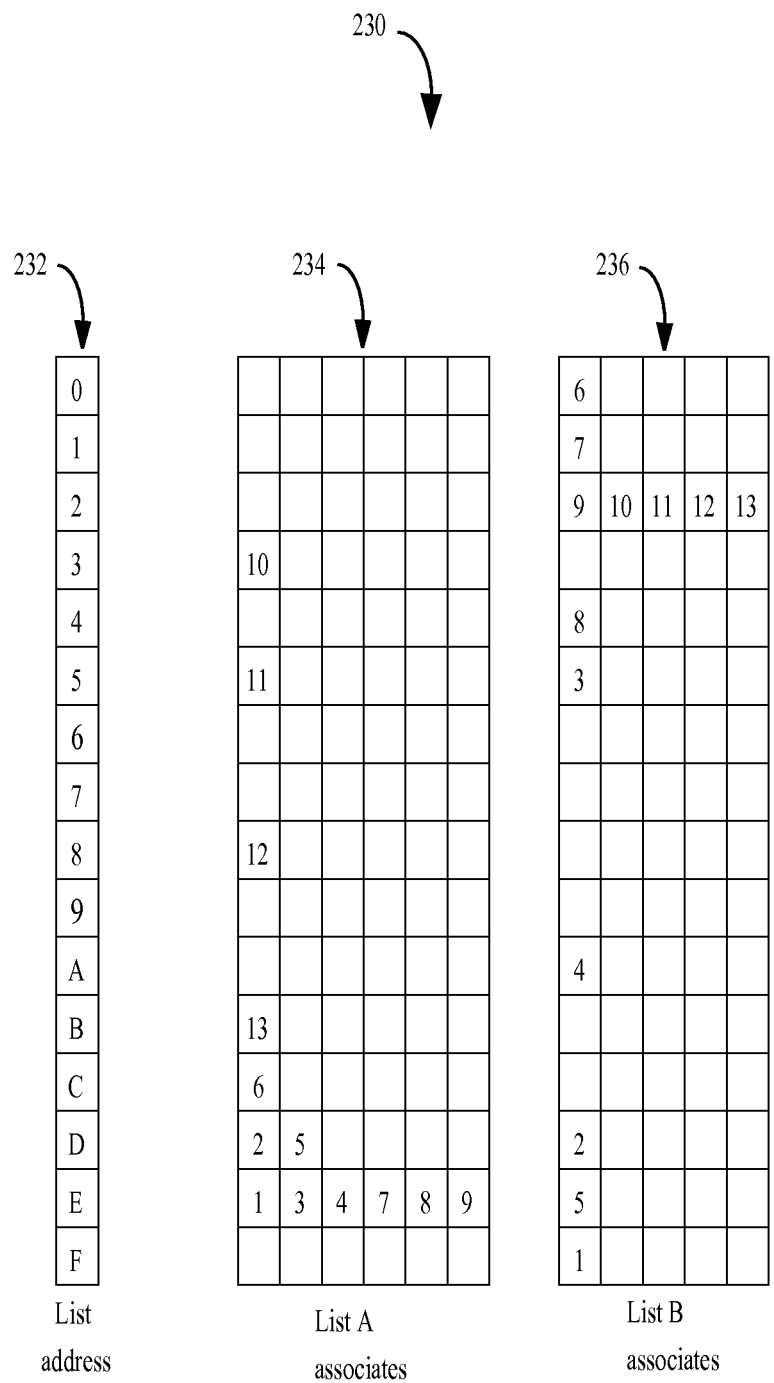
FIG. 10 is a schematic diagram illustrating an example of storage of associates in list data structures within AP A and AP B.

FIG. 10 shows an example of storage of list data structure, links not shown, within the APs A 18 and B 18. The hexadecimal address of the plurality of keys is stored in the list 232. The associates are stored in two lists 234 and 236 separately. For a match to occur during the search operation 142 the associate sets 148 and 150 of FIG. 5 must have a common associate from the two lists 234 and 236.

Performance Analysis

FIG. 11 shows a simple performance example 240 of the generation of the response associates 152 in a search operation 142 based on the associates stored in the two lists 234 and 236 described in the FIG. 10. The search operation 142 is broken down into autonomous search operations 144 and 146 on the AP A 18 and AP B 18. The intersection of the associate sets 148 and 150 yields the associate corresponding to the at least one relational instance Rij.

Figure 12:
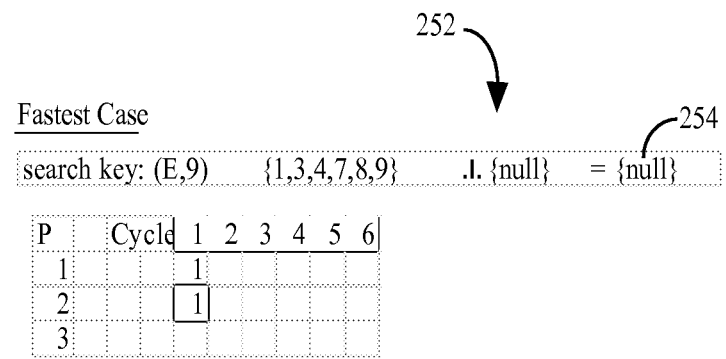
FIG. 12 is a schematic diagram illustrating a simple performance analysis of a search operation the RP.
Figure 12:
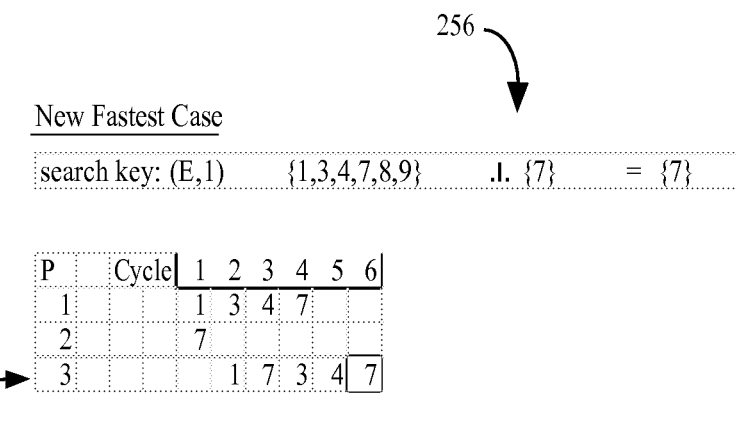
Figure 12:
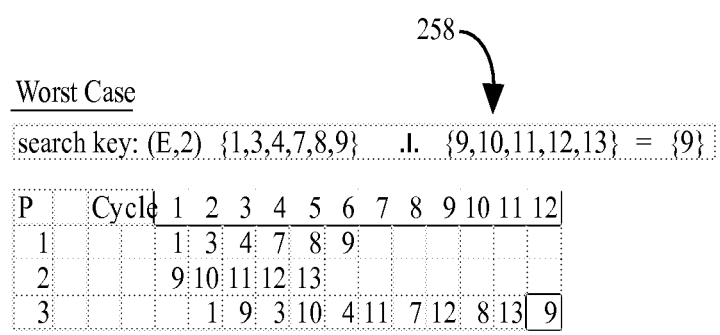

FIG. 12 shows a simple performance analysis 250 of the RP 10 based on the search operations 142 shown in the FIG. 11. In a fastest case 252, the RP 10 produces the associate 152 to the relational query in one cycle. This is the null set 254 generated by AP 18. In next fastest case 256, 6 cycles are needed to find the response associate 152. The worst case 258 occurs when a first matching associate is at the beginning of the list 236 and a second matching associate at the end of the list 234. This requires both lists 234 to be completely traversed. In the worst case 258, 12 cycles are required.

Figure 13A:
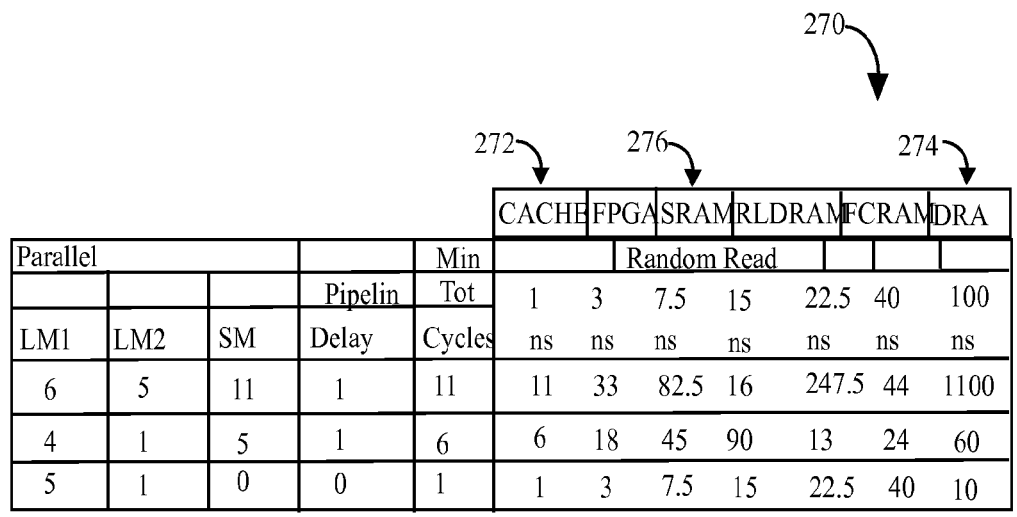
FIG. 13A is a schematic diagram illustrating an estimated performance of a parallel implementation of a RP for various commercial random access memories that translates the cycle performance into actual search times.

FIG. 13A shows an estimated performance of the parallel implementation of the RP 10 for various commercial random access memories 270 that translates the cycle performance shown in FIG. 12 into actual search times. Thus, the speed of a parallel search operation 142 takes 1 to 11 nanoseconds using a processor cache 272 or its equivalent. At the other extreme, 100 nanosecond external dynamic random access memory (DRAM) 274 could take between 0.1 and 1.1 microseconds. FIG. 13A also shows that it is possible to have search engines using static random access memory (SRAM) 276 or embedded memory with millions of relational instances with performance of over 200 million search operations per second using a naive RP.

Figure 13B:
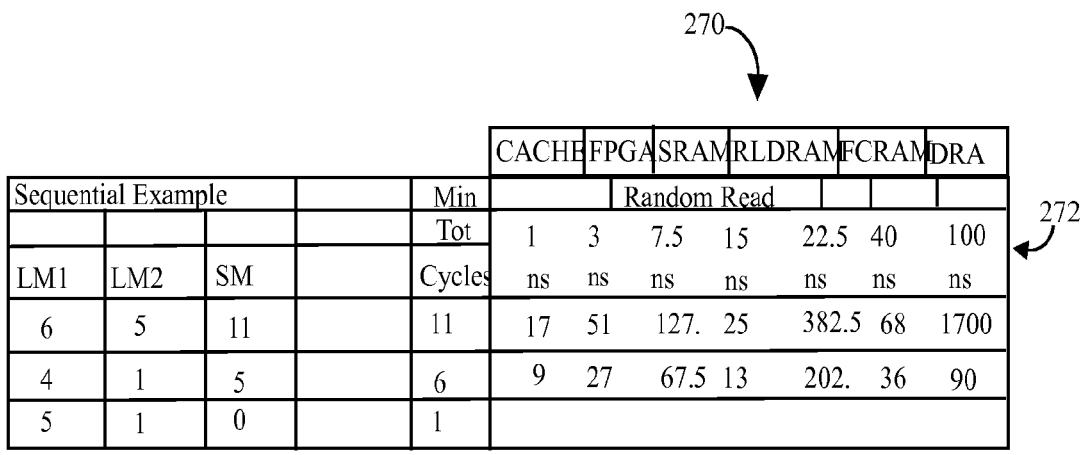
FIG. 13B is a schematic diagram illustrating an estimated performance of a naive sequential implementation of a RP for various extant commercial random access memories that translates the cycle performance into actual search times.

FIG. 13B shows the estimated performance of a naive sequential implementation of the RP 10 for the various extant commercial random access memories 270 that translates the cycle performance shown in FIG. 12 into estimated search time. The 100-nanosecond column 272 corresponds to a Pentium II software implementation.

Figure 13C:
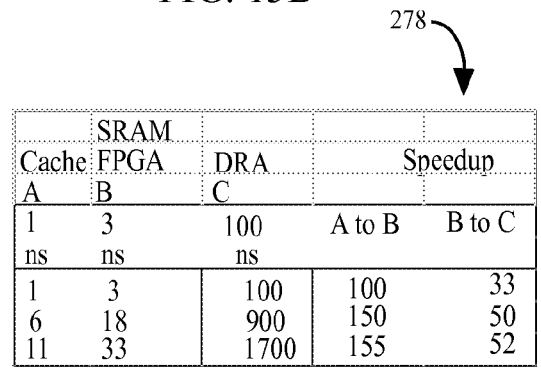
FIG. 13C is a schematic diagram illustrating a speedup ratios for parallel versus sequential implementations.

FIG. 13 C shows speedup ratios 278 as for parallel versus sequential implementation. This corresponds to the speedup due to the use of special purpose hardware versus a naive software-based implementation that uses external DRAM data storage. The performance figures illustrated are pessimistic because there is no benefit from the data locality. There is no effect of pipelining for the parallel and sequential implementations of the naive RP. The performance figures shows that a processing speed of 4 million search operations is possible in a database with billions of relational instances utilizing the DRAM 274 in the naive RP.

AP to SP Interconnect

The AS 20 FIG. 1 receives associate sets 148, 150 output by the AP 18. FIG. 5 generated by the at least one AP 18 through the plurality of ports indicated as 54, 56, 58, 60. The AS 20 routes the associates from sets 148, 150 to SP 22 using an routing mechanism through the plurality of ports indicated as 70, 72, 74, 76 (FIG. 1). One routing mechanism is based on a formula L=a mod (n−1), a is a specific associate from sets 148, 150 and m is the number of SPs 22 in the RP 10, m has a value greater than or equal to one.

Figure 14:
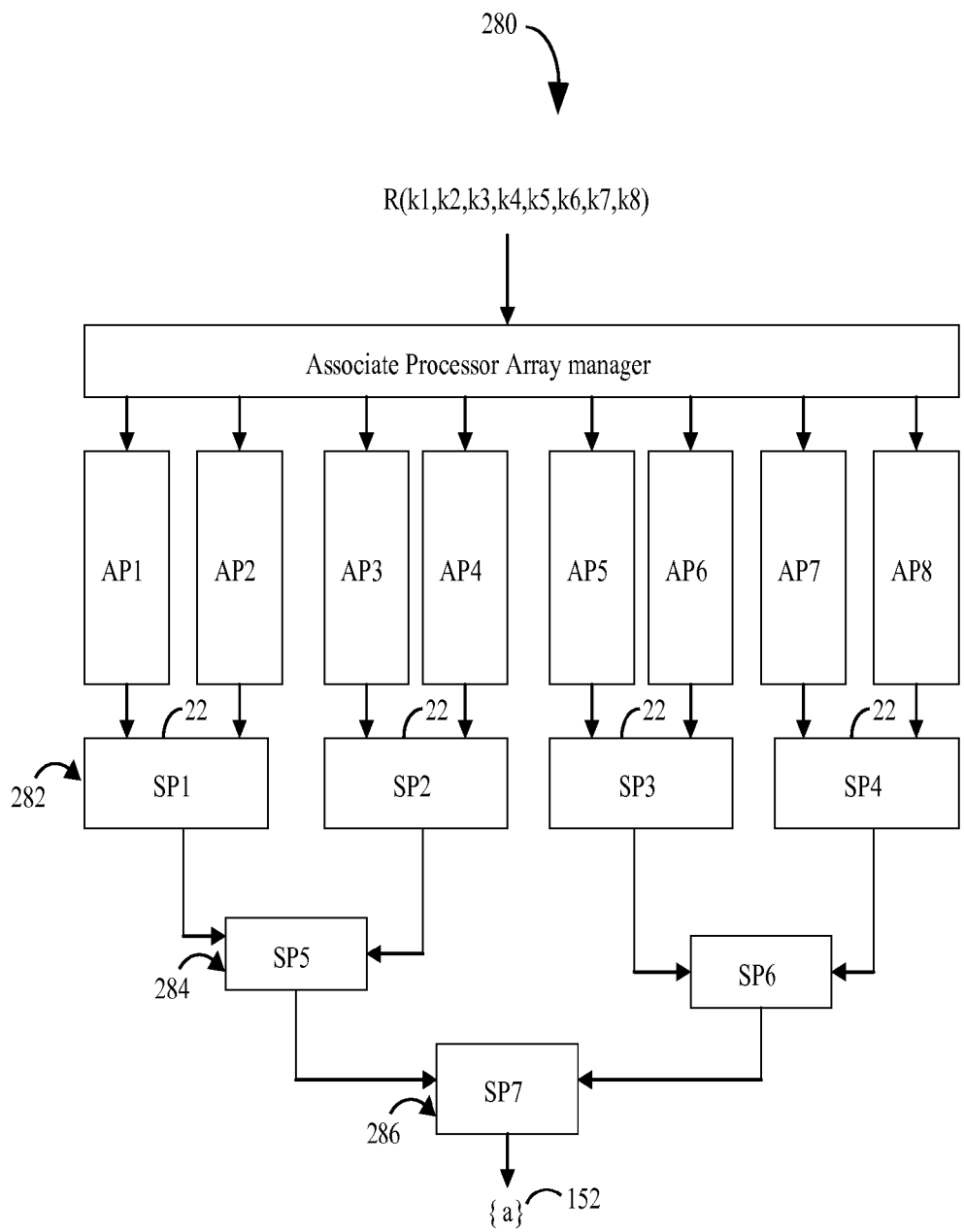
FIG. 14 is a block diagram illustrating a RP pipeline sieve architecture.

FIG. 14 shows the RP pipeline sieve architecture 280. The inventive architecture 280 is a variation of the RP 10 that eliminates the AS 20. The plurality of ports of AP 18 indicated as 54, 56, 58, 60 is connected directly to SP 22 usually two at a time. The set processors (SP1-SP4) 22 constitute a first layer 282 of the SP 22. The set processors SP5 and SP6 22 constitute a second layer 284 of the SP 22. A response associate 152 of the first layer 282 is input to the second layer 284 of the SP 22. A SP7 22 constitutes a third layer 286. A response associate 152 of the second layer 284 is input to the third layer 286 of the SP 22. The third layer 286 of the SP 22 selects response associate 152. In general, the SPs 22 in the layers 282, 284 and 286 are identical in speed and capacity. A failure to meet the requirements of the response associate 152 at any point in the pipeline architecture 280 causes the operation performed by the RP 10 to abort the operation. The sieve interface 70 72 74 76 may be a bi-port FIFO.

Figure 15:
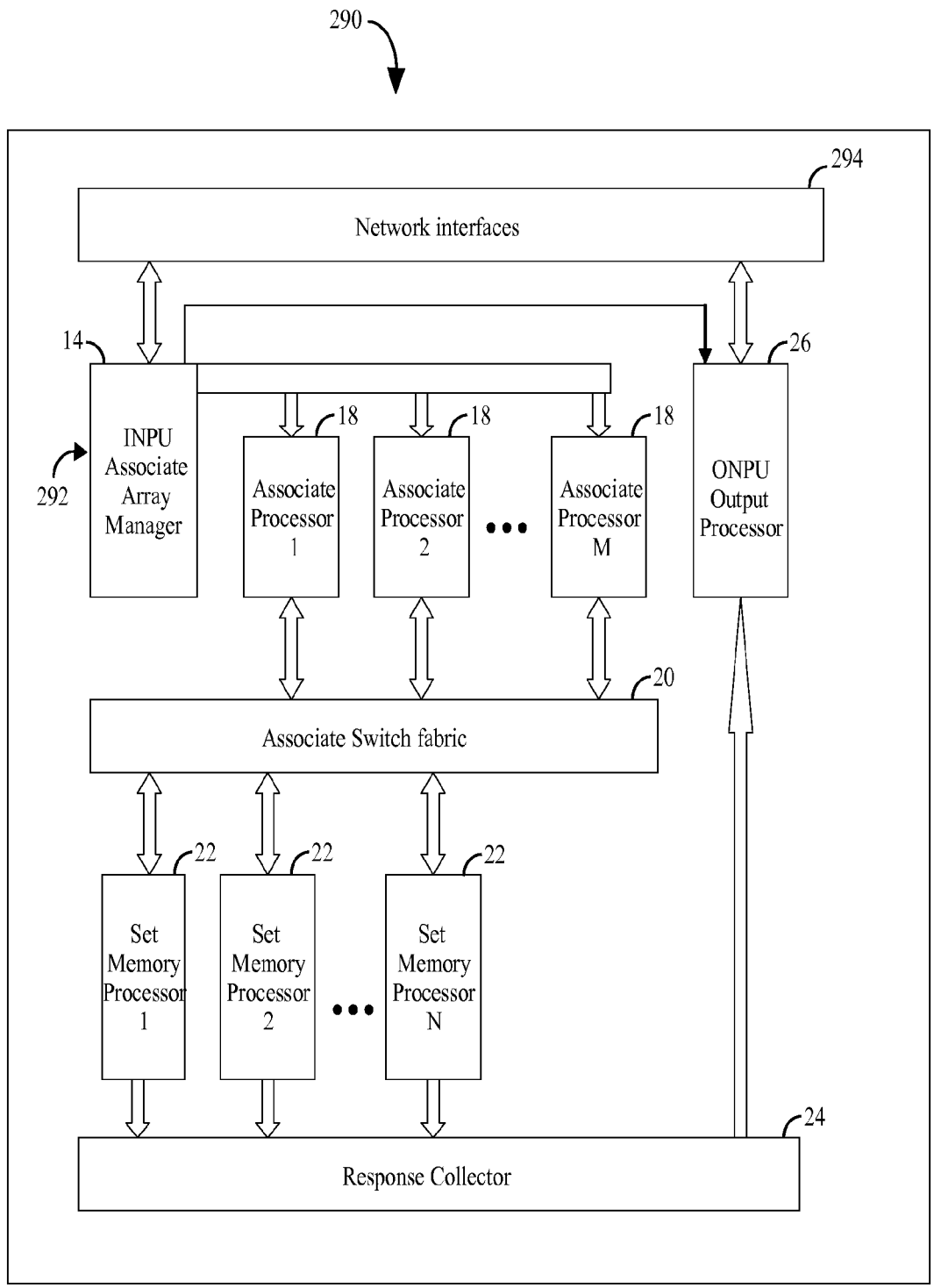
FIG. 15 is a block diagram illustrating a blade structure of a RP.

FIG. 15 shows a blade structure 290 of the RP 10. The INPU 14 and the AAM 16 can be combined on a single board 292. The data and command 300 is delivered in parallel to the at least one AP 18 and may be stored in a first in first out (FIFO) by the Associate Array Manager 16. The INPU 14 delivers the packet information from the query packet 12 to the ONPU 26. The packet header information 334 is used to format the query response packet 104.

The AP 18 utilizes a random access memory (RAM) to store the mappings 110 of a domain key i|dk| into the corresponding associates Rij. When a domain key is presented to AP 18 the associate sets 148, 150 are produced. The associate set 148, 150 may consist of at least one element or be the null set 254. The associate sets 148, 150 are routed through the AS 20 to the appropriate SP 22. The SP 22 performs the set operations on the associate set 148, 150 and determines which associates 148, 150 satisfy the relational query. The associates 152 that satisfy the relational query are collected by the RC 24 and forwarded to the ONPU 26. The ONPU 26 completes the query response packet 104 using the query and header information and responds to at least one user 106 or machine through the network interface 294. The RC 24 may be a multiport FIFO. The associate switch 20 may be replaced using the sieve architecture.

Figure 16:
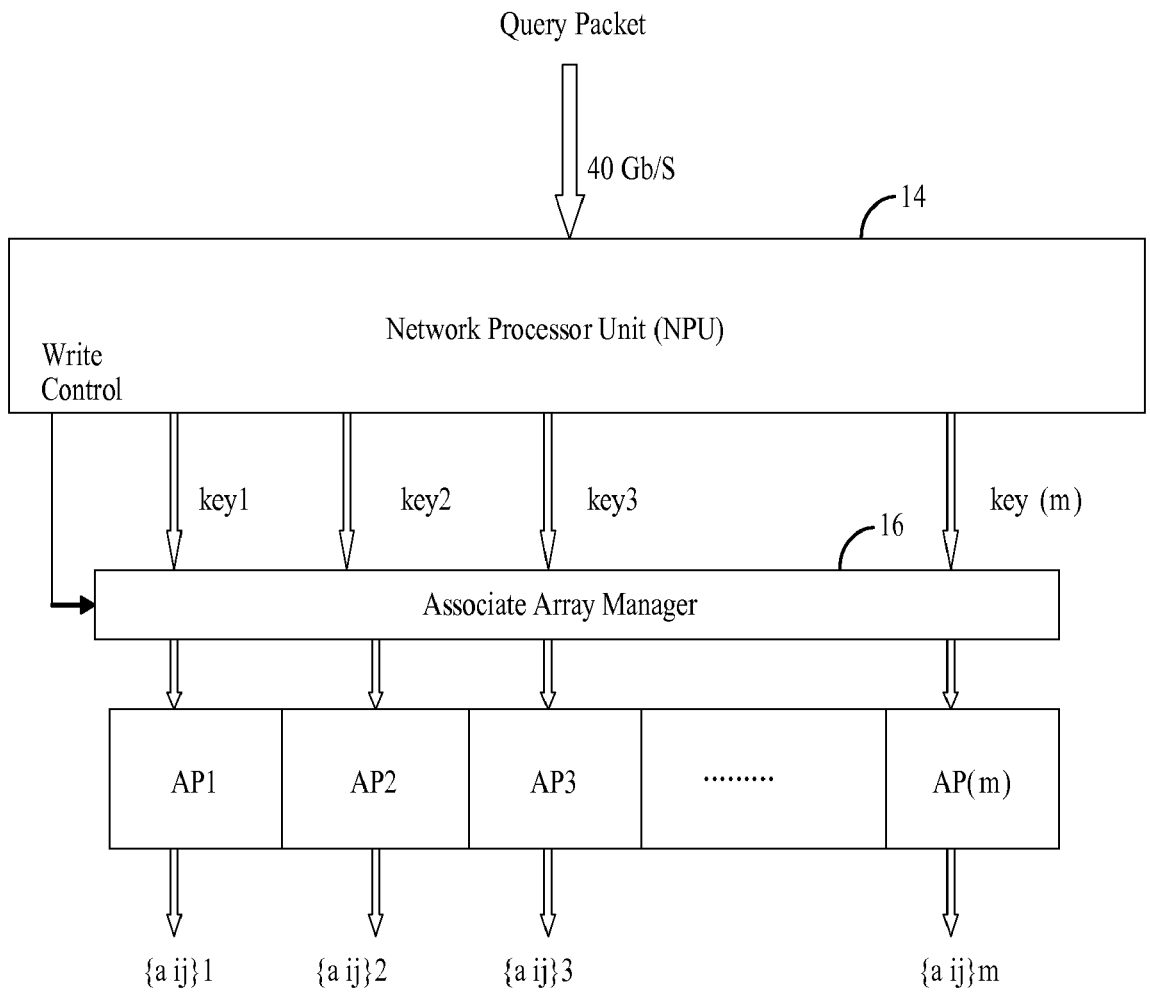
FIG. 16 is a block diagram illustrating an interface between INPU and AAM.

FIG. 16 shows an interface between the NPU 14 and the AAM 16. The NPU 14 includes a look aside memory access with 40, 80, 160 and 320 key length that can provide a direct parallel interface to the AAM 16. The AP 18 generates the associate sets 148, 150. The NPU 14 is adaptable to process about 122 million query packets per second. The NPU 14 has a direct interface to the RP 10 and possess multi protocol transmit or receive interfaces. Moreover, the NPU 14 includes a 26.5 GB per second memory bandwidth and a 1 GB payload buffer.

Figure 17:
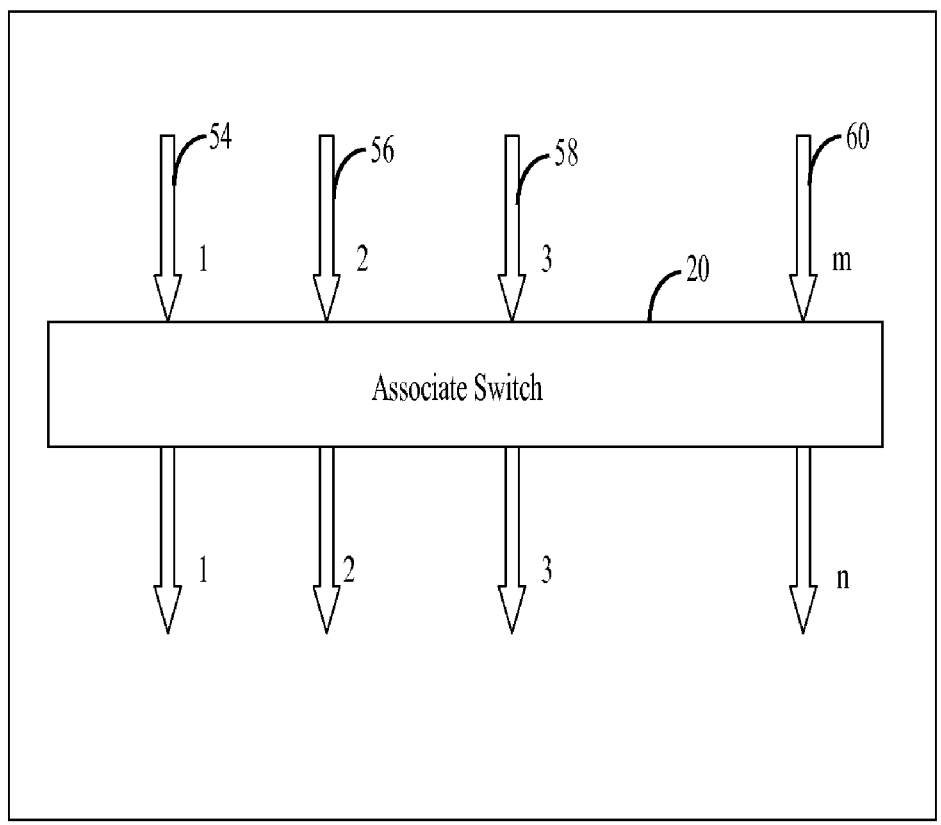
FIG. 17 is a block diagram illustrating the routing mechanism for the at least one associate set.

FIG. 17 shows the routing mechanism for associate sets 148, 150. A routing decision is based on the number n of set processors 22 in the RP 10. The formula a mod (n−1) selects at least one output port 70 72 74 76 for a given associate. The associates in the associate sets 148, 150 are delivered on the ports indicated as 54, 56, 58, 60 . . . by the AP 18. The routing decision may be based on the load balancing using formula shown in the following:

The low order bits of assigned associates may be used for routing.

SMU (x):: where x=associate Modulo (n) and n=1, 2, 3, . . .

Figure 18:
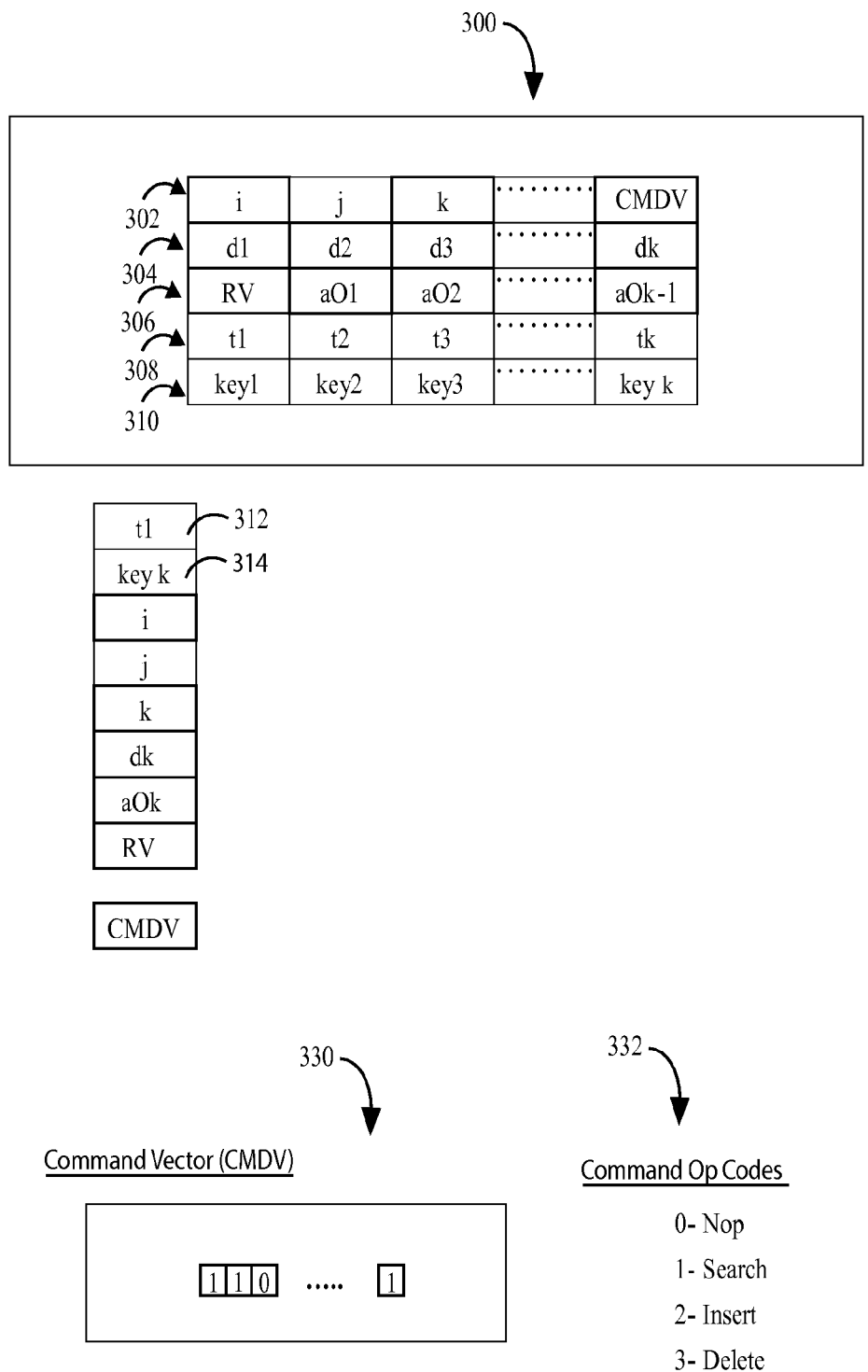
FIG. 18 is a schematic diagram illustrating a packet payload content of a query packet that are sent on to an AP through AAM by INPU.

FIG. 18 shows a packet payload content 300 of the query packet 12 sent on to AP 18 through the AAM 16 by the INPU 14. i j and k as shown at 302 are the indices which index the relation Ri, relational instance Rij and the domain key i|dk|. The RP 10 can recognize the number of relational instances of any relation as well as different kind of relations and the domain keys of each relation R. The domain keys d1, d2, . . . dk are shown at 304. A response_requirement_vector RV is shown at 306 along with command. aOk shown at 306 is the intra-domain operation command. It is possible to specify query conditions using intra domain operators such as AND, OR, XOR or the like between the domain operations. A relation R having k domains has k−1 intra domain operators for processing.

A token is defined to be a symbol embedded in an associate which serves as a sign upon which an action or actions may be taken by another process. In some applications, it may be desirable to add at least one token t1 as shown at 308, 312, 348 768, that may be used for data or control in a process. Packet forwarding information 1016 can be embedded in an associate eliminating an SRAM and an additional memory access. Tokens for all or processes internal or external to RP 10 can be collected by RP 10 and incorporated into a query response.

Also, in some cases it may be desirable to increase the size of the domain key shown at 314 being processed in the AP 18. A command vector shown at 330 includes a set of bits corresponding to a plurality of associated op codes shown at 332. The operations performed by AP 18 preferably include Nop, Search, Insert, and Delete. A Nop operation indicates that the at least one AP 18 is not participating in a relational query processing session. In a sieve architecture a signal is sent to the Set Processor processing the domain associates indicating that this is a Nop domain allowing other non Nop domain associates to pass through the SP.

Figure 19:
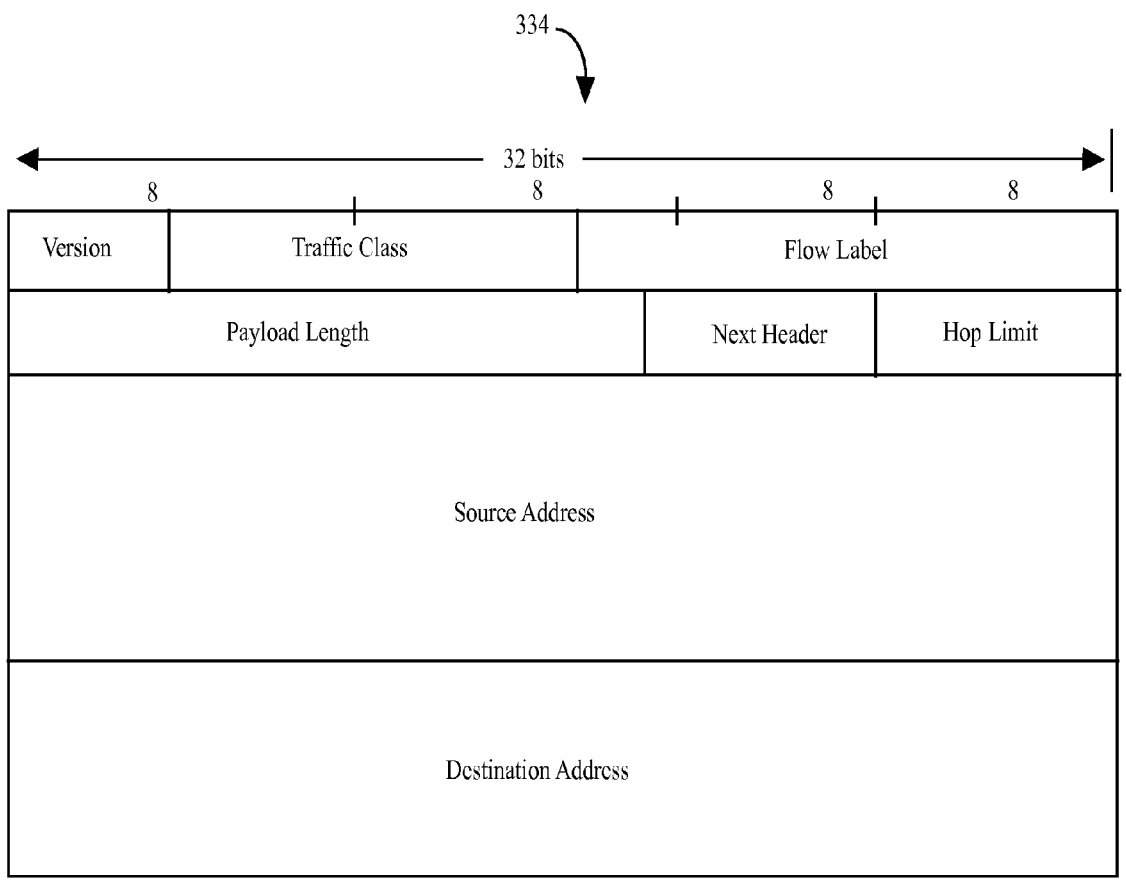
FIG. 19 is a schematic diagram illustrating IPV4 header information included in query packets and query response packets.

FIG. 19 shows the header information 334 for IPV4 included in the query packet 12 being utilized to formulate the query response packet 104. The IPV6 header contains similar information.

Figure 20:
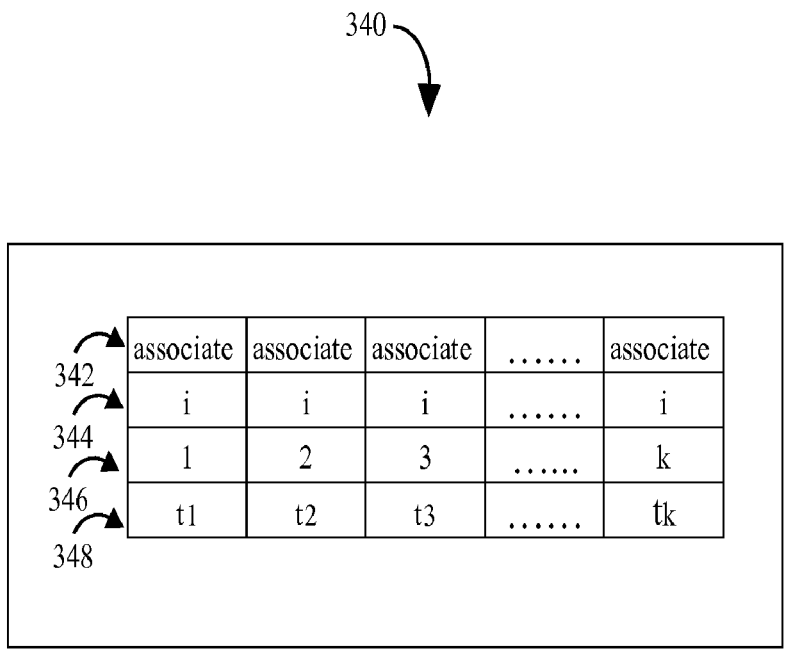
FIG. 20 is a schematic diagram illustrating a format of output data from an AP.
Figure 20:
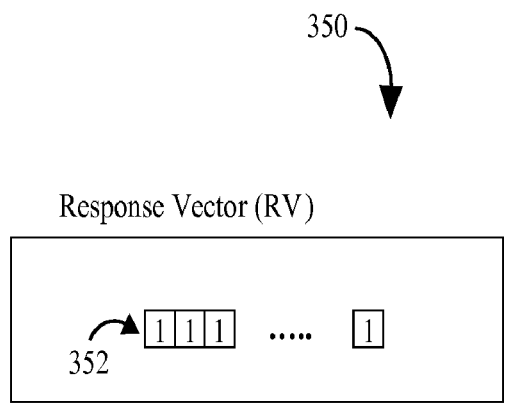

FIG. 20 shows the format of output data 340 from the AP 18. The associate set is shown at 342, the relation index i is shown at 344, the domain key index is shown at 346 and the optional token output is shown at 348. A Response Vector 350 includes a bit 352 correspondingly set for each domain key 346 requiring a response associate 152. The Response Vector determines the associate response requirements for a query.

Hardware Implementation

Figure 21:
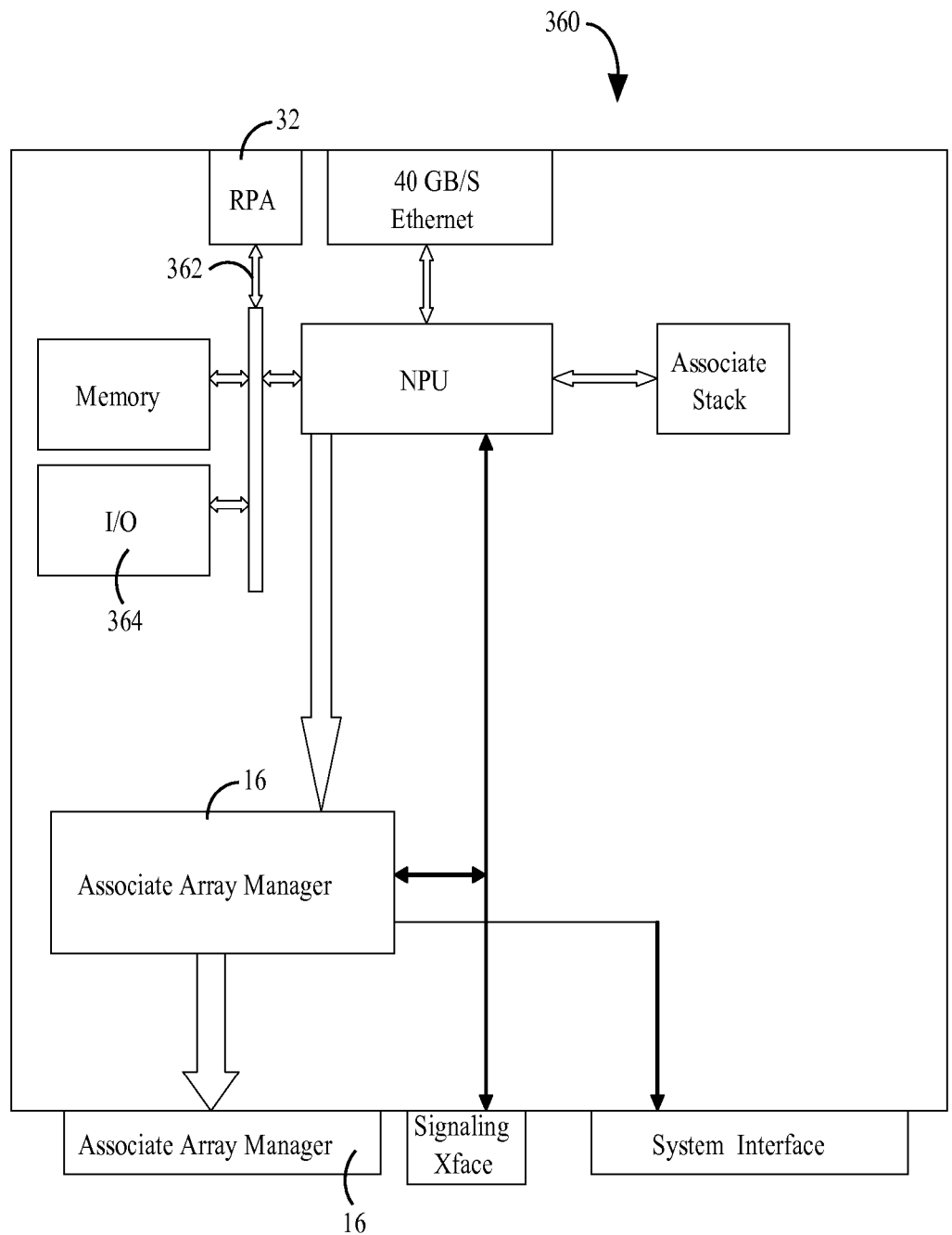
FIG. 21 is a block diagram illustrating a preferred embodiment of an large scale architecture of the AP that combines INPU and AAM on a single board.

FIG. 21 shows a preferred embodiment of an architecture 360 that combines the INPU 14 and the AAM 16 on a single board. The INPU 14 receives the query packet 12, extracts the information included in the query packet 12, formats the at least one data and command for the AAM 16, and forwards the a query response packet 104 information to the ONPU 26. The INPU 14 manages the allocation and reallocation of the associate aij for the relational instance rij. The board 360 contains a separate communication port for the RPA 32 to administrate the database. RPA I/O port 362 is isolated to avoid security breaches. The board 360 includes I/O 364 for loading, unloading and archiving the database.

Figure 22:
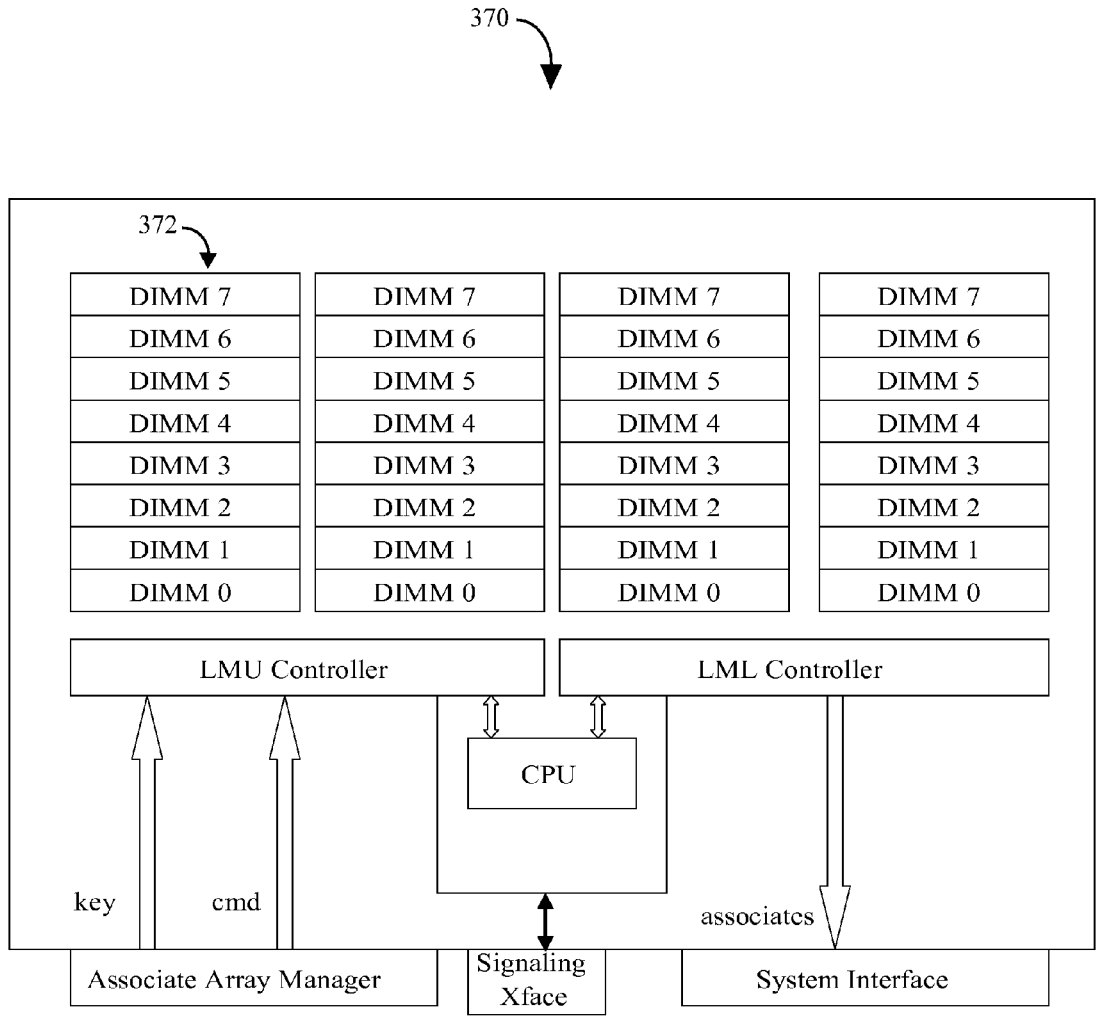
FIG. 22 is a block diagram illustrating an architecture of a AP that utilizes a set of random access memory modules.

FIG. 22 shows board 370 for the AP 18. A single double data rate 3 (DDR3) controller can manage about 16 dual in-line memory module (DIMM) 372. Thus, RP 10 with 8 APs 18 can store approximately 32 billion relations if the relation Ri is an 8-tuple with eight 4 bytes columns on average, for example. The CPU performs initialization, maintenance, monitoring, diagnostics, collects statistics, etc on the memory and ports.

Figure 23:
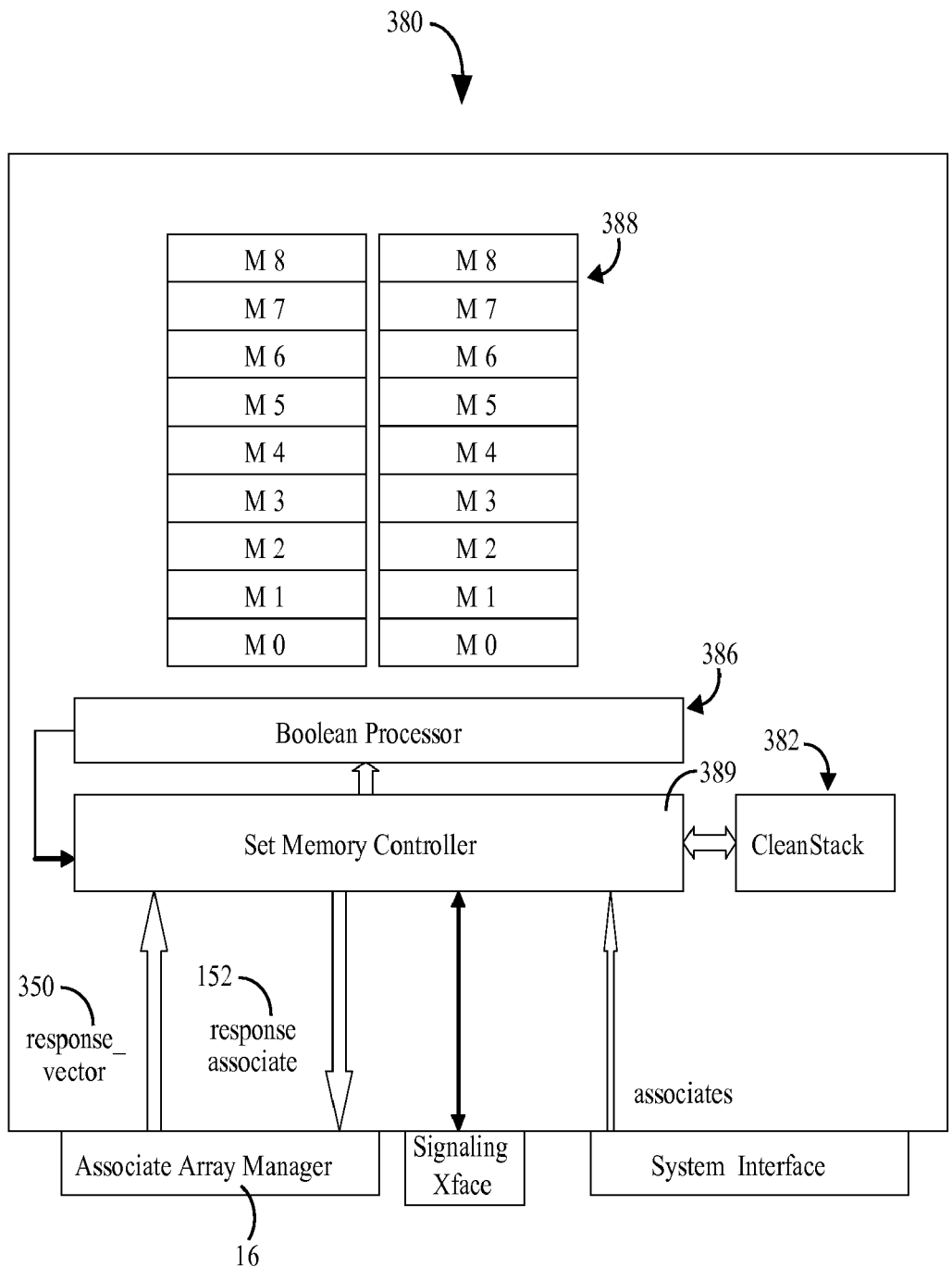
FIG. 23 is a block diagram illustrating an architecture configuration for the SP.

FIG. 23 shows a board configuration 380 for the SP 22. The board 380 for the conventional memory implementation includes at least one CleanStack 382 or CleanQueue memory to allow rapid reset of the used Set Memory 388. The communication between the AAM 16 and a Set Memory controller 389 includes the response_vector 384 and the response associate 152. A boolean processor 386 performs logical functions in accordance with the instructions received from the set memory controller 389. The board 380 allows for a plurality of banks of SM 388 per port. This maximizes a throughput by achieving near 100% availability. It should be noted that SM can be bank switched for higher throughput and there is sufficient room on the configuration 380 to replicate SM for bank switches. Ideal set memory does not require bank switching since it is reinitialized instantaneously.

Figure 24:
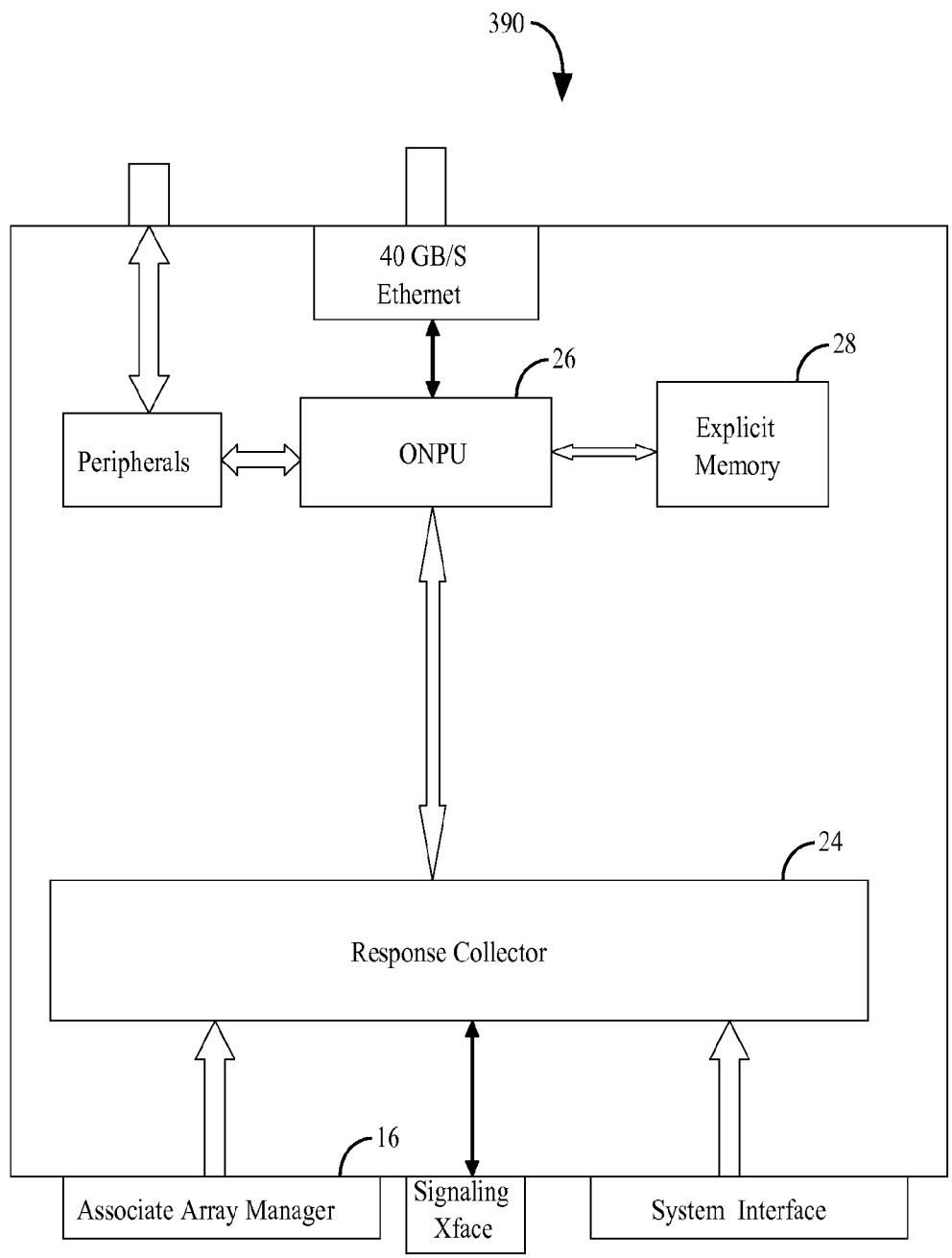
FIG. 24 is a block diagram illustrating a preferred embodiment of an architecture for RC and ONPU.

FIG. 24 shows a preferred embodiment of board 390 for the RC 24 and the ONPU 26. The RC 24 collects the associates 152 responsive to the relational query. The ONPU 26 formats and transmits the query response packet 104 either to the user 106 or to a machine through the network interface 294. The Response Packet may include explicit data, implicit data and information or statistics. The query response packet 104 may be another relational query containing at least one relational instance rij of the at least one relation Ri. A Query response packet 104 can also include new relational instances derived from the responses to a query.

Figure 25:
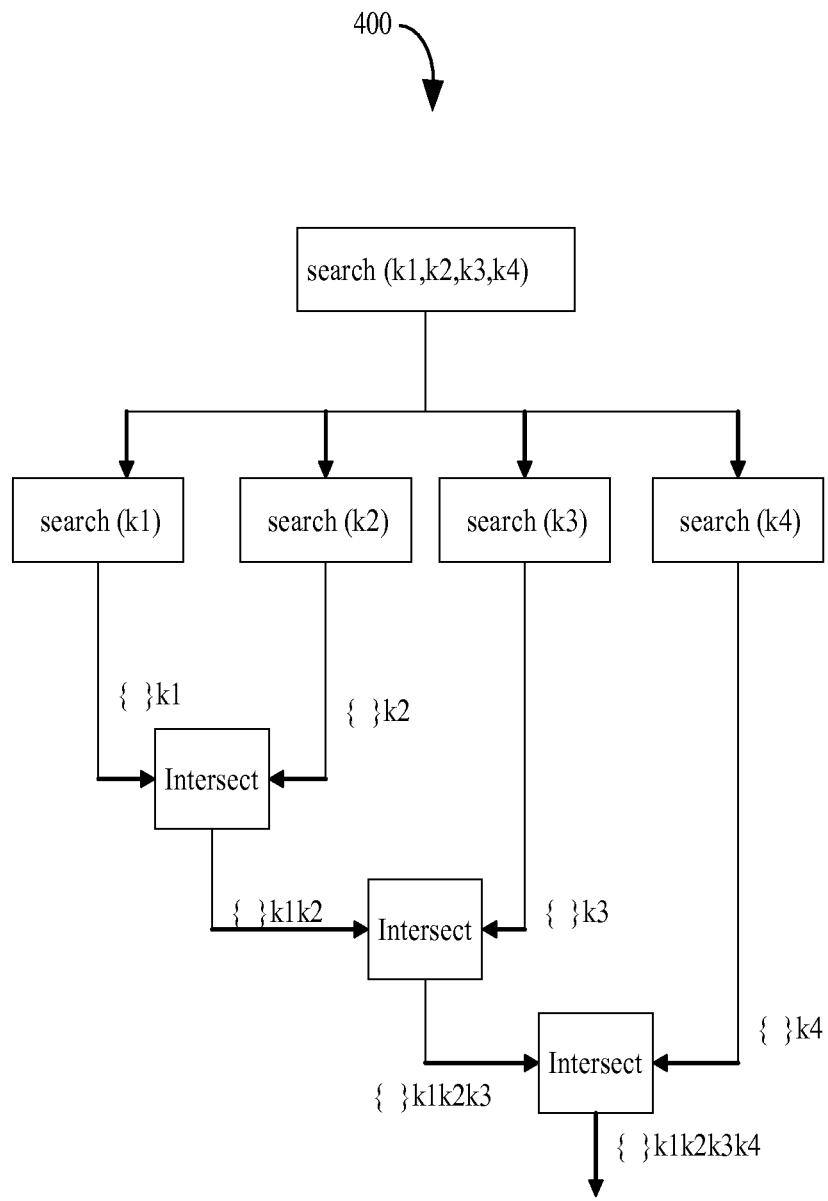
FIG. 25 is a block diagram illustrating a variant of a sieve architecture which produces the same result produced a sieve architecture using a different processing path.

FIG. 25 shows a variant sieve architecture 400 which produces the same result produced by the sieve architecture 280 using a different processing path. In some applications, the different processing path of the sieve architecture 400 may be important as it could shorten processing time of the RP 10 to a minimum and provide for processing redundancy and fail-safe switch over. The sieve architecture 400 is reconfigurable and maybe more optimal than the fixed sieve architecture 280.

Figure 26:
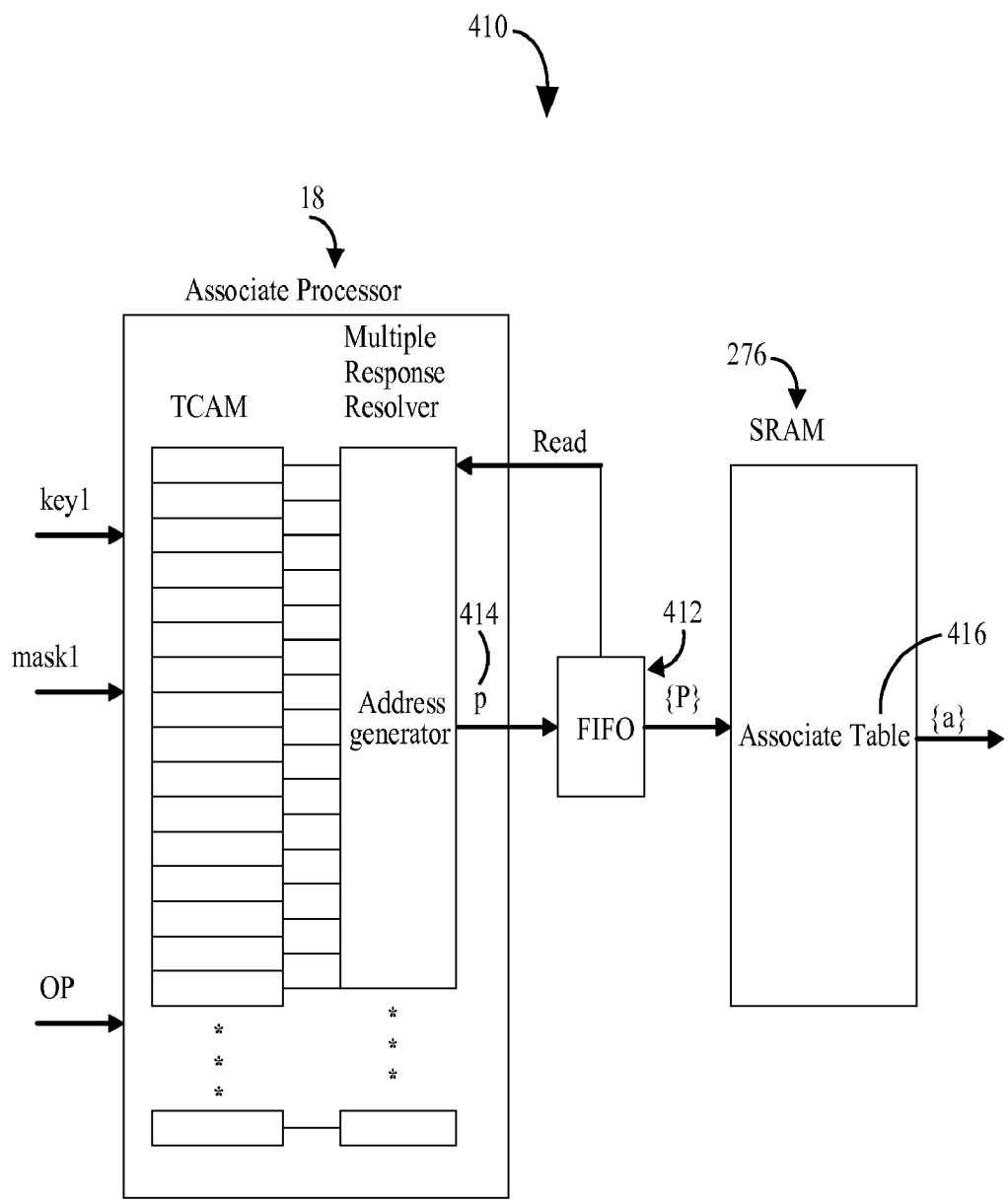
FIG. 26 is a block diagram illustrating a new type of a ternary content addressable memory.

FIG. 26 shows a new type of a ternary content addressable memory (TCAM) 410 that can function as part of the at least one AP 18 in place of the list memory 130 alternative. TCAMs store the keys explicitly. Current TCAMs respond only with one address corresponding to an associate. By modifying the TCAM priority encoder circuit to successively, disable the highest priority address responders upon readout, all responding addresses or pointers 414 can be readout sequentially. For example, pointers p 414 are generated and transferred to a register or to an external FIFO 412. These pointers 414 can be used directly to access an Associate Table 416. It is more efficient to perform a single comparison operation on 18 and readout the multiple responses that may issue as a result of a domain search than to perform many parallel comparison operations and recover one pointer at a time.

Set Processor Operations

Figure 27:
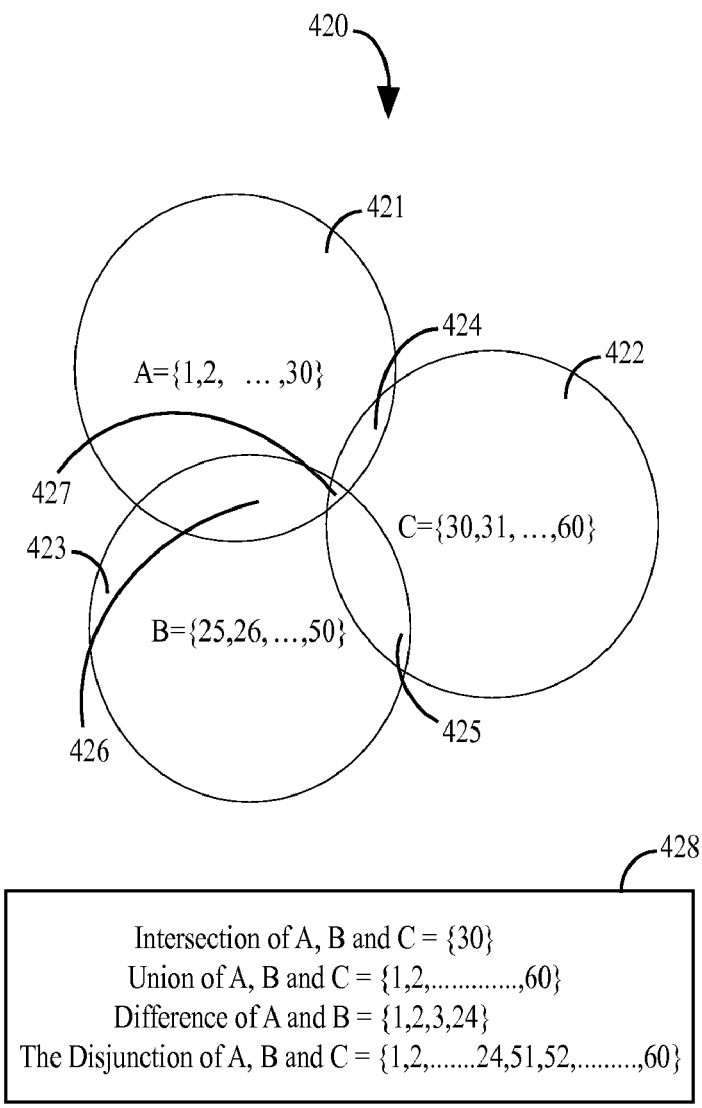
FIG. 27 is a Venn diagram illustrating a summarization of set operations supported by a SP on an associate set produced by an AP.

FIG. 27 shows a Venn diagram based visualization 420 that summarizes the set operations supported by the SP 22 on the associate set 148, 150 produced by the AP 18. The Venn diagram includes circles 421, 422 and 423 that correspond to a plurality of associate sets A, B and C respectively. The overlap area 424 indicates the intersection of circles 421 and 422. The overlap area 425 indicates the intersection of circles 422 and 423. The overlap area 426 indicates the intersection of circles 423 and 421. The overlap area 427 indicates the intersection of each of the circles 421-423. The block 428 illustrates results of the plurality of set operations performed on the associate sets A, B, and C. The set operations include intersection, union, difference or the like.

The SP 22 includes a bit vector referred to as a Response Vector 350. The Response Vector includes bit positions corresponding to domain keys i|dk| of the relation Ri. The SP 22 tracks the associate sets 148, 150 from the AP 18. Each Response Vector 384 has bit positions corresponding to each domain instance input to AP 18. In general, for each domain key k required by a query, the bit associated with domain k is set to 1 in the response_vector 384. The associates in sets 148, 150 are compared with the Response Vector 384 to determine if they satisfy the relational query.

FIG. 28 is a block that illustrates a plurality of laws 430 followed by the set operation. The plurality of laws includes associative, commutative distributive or the like. The order in which the set operations are done may significantly affect the processing speed for relational queries. A Boolean Processor 386 allows flexibility in the optimization of query response time. The Boolean Processor 386 optimizes the query response time by allowing intra domain operations. The intra domain operation may include a unary operator NOT and a plurality of binary operators AND, OR, XOR, etc.

Figure 29:
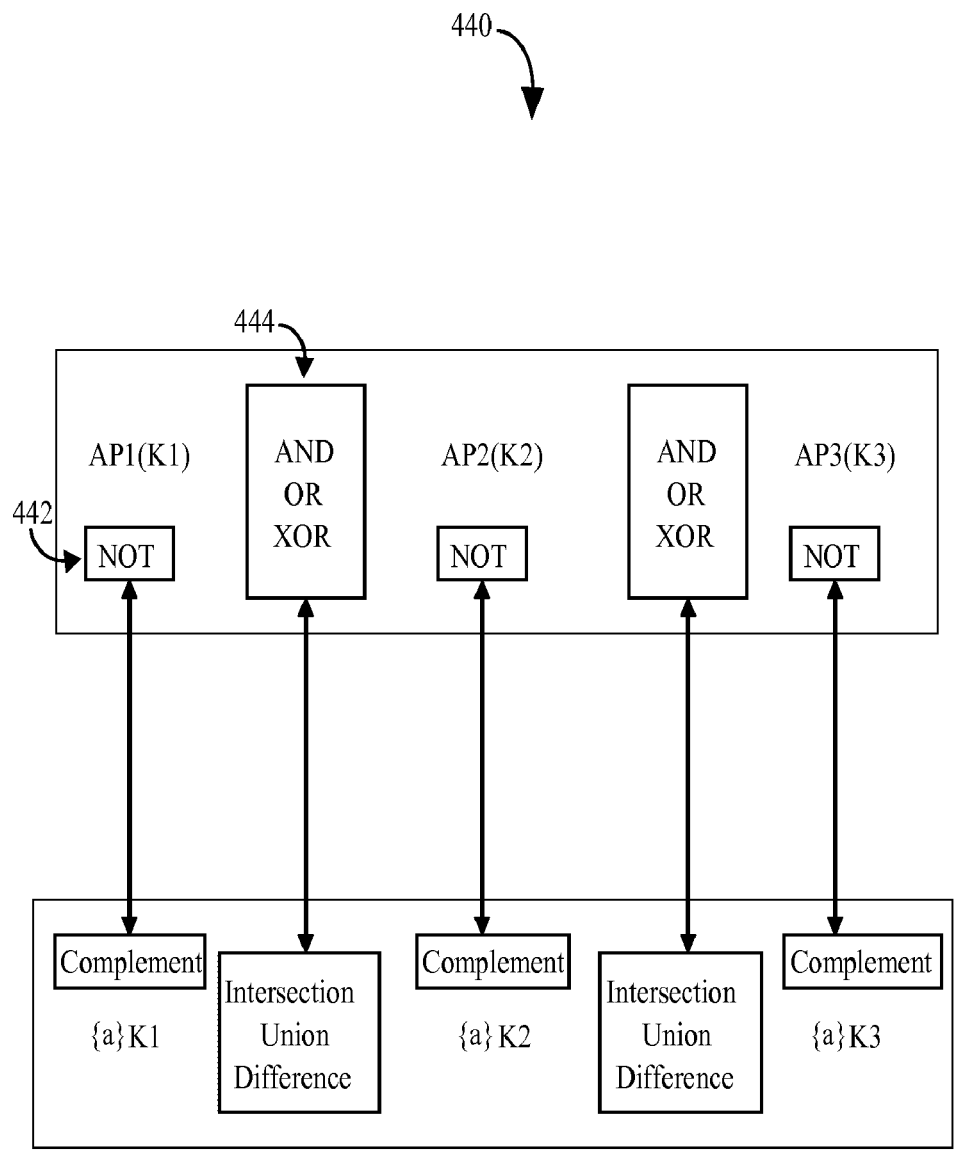
FIG. 29 is a block diagram illustrating equivalency of operations performed by a boolean domain processor and corresponding set operations.

FIG. 29 illustrates the equivalency of operations performed by the Boolean Processor 386 and corresponding set operations. It is more efficient to perform the set operations in a Boolean space using associate bit vectors.

FIG. 30A, FIG. 30B and FIG. 30C shows a simple example of the set operations mapped into the at least one AP 18. The storage of three domain keys k1, k2 and k3 and the associate a in an AP database 450 is shown in the FIG. 30A. The FIG. 30B shows a matrix 460 of possible set operations between domain keys k1, k2, k3 including the AND, OR or XOR operations performed by the boolean domain processor 386. The FIG. 30C shows the search result set 470 of the matrix 460 of the intra domain operations on the AP database 450 shown in the FIG. 30A. The first table entry 472 corresponds to the exact match operation and results in a response associate {4}.

Figure 31:
FIG. 31 is a block illustrating a DeMorgan's laws for performing intra domain operations.

FIG. 31 shows DeMorgan's laws 480 for performing the intra domain operations. It shows the effect of the unary NOT operation on the intra domain operations. DeMorgan's laws permit query optimization.

Figure 32:
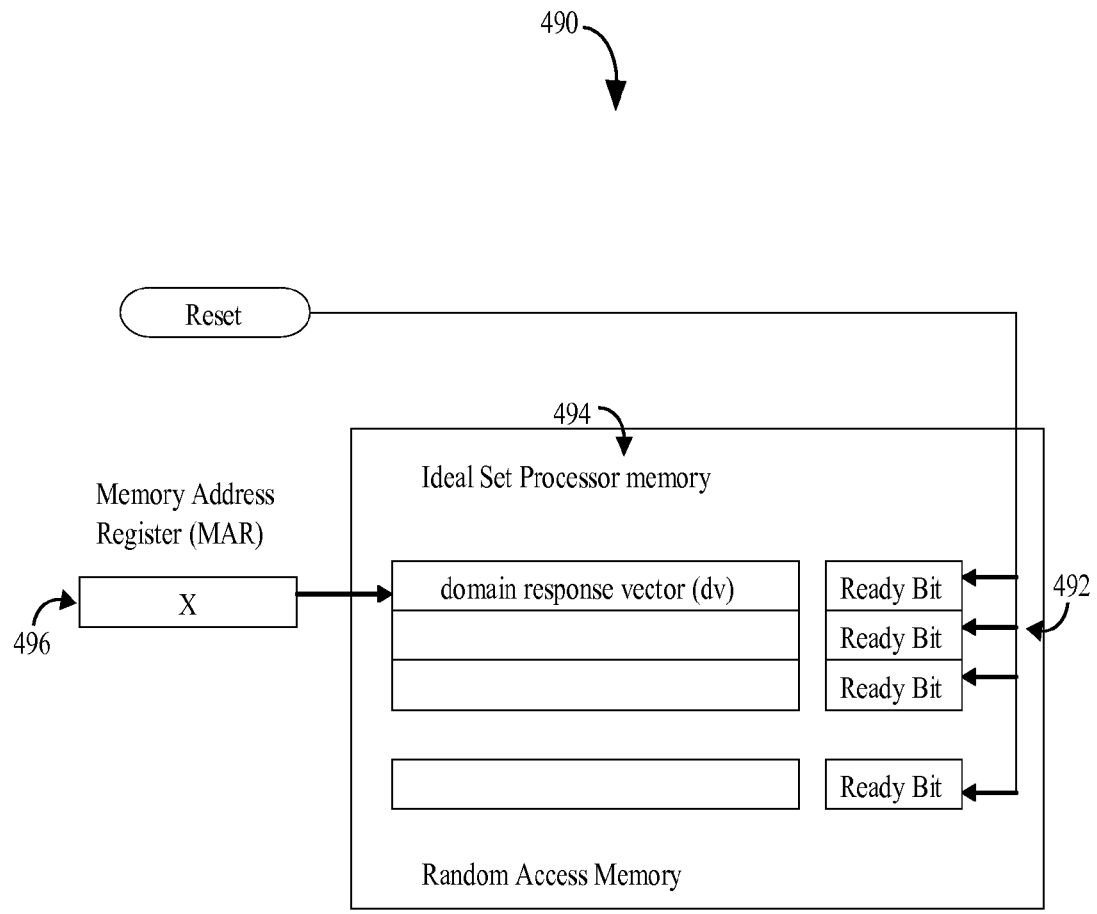
FIG. 32 is a block diagram illustrating an ideal set memory.

FIG. 32 shows a block diagram 490 for the ideal set processor memory 498 where a ready bit 492 is associated with each domain response vector 384. The ready bit 492 is reset at every location corresponding to an associate, at the end of a query. When a domain response vector is accessed the first time during the subsequent query, the ready bit 492 is set and the prior response_vector 384 is overwritten with the new domain response vector 494 based on domain associates output 148, 150. The new domain response vector has one domain bit set and the other domain bits reset. Subsequent accesses to locations that have been set are treated as updates during a session. Updates are typically domain wise OR operations. This essentially eliminates any overhead that might otherwise be needed to clear the Set Processor memory for the next query. When the ideal set memory 498 is used, the utilization of the memory 498 is essentially 100%. A memory address register, X indicated as 496 refers to the Set Processor memory address that corresponds to one associate from set 148 or 150. In some cases, X 496 is the index from an associate. The ready bit 492 need not be in the DRAM 274 or SRAM 276. The ready bit 492 can be implemented in a simple application specific integrated circuit (ASIC) or even a field programmable gate array (FPGA) attached to the same address lines as in the DRAM 274 or SRAM 276. DRAM 274 and SRAM 276 are currently not manufactured with the ready bit 492 improvement.

Set Memory Management

The specification provides another relatively efficient mechanism for implementing a CleanStack 382 or CleanQueue to reset only the locations in the Set Processor memory that were used during the query session. This is more efficient than attempting to reinitialize a very large memory.

Another efficient mechanism for resetting Set Memory is to implementing a CleanStack 382 or CleanQueue to reset or clean only locations in the set processor memory that were used during the query. This is more efficient than attempting to reinitialize a Set Memory sequentially.

Figure 33:
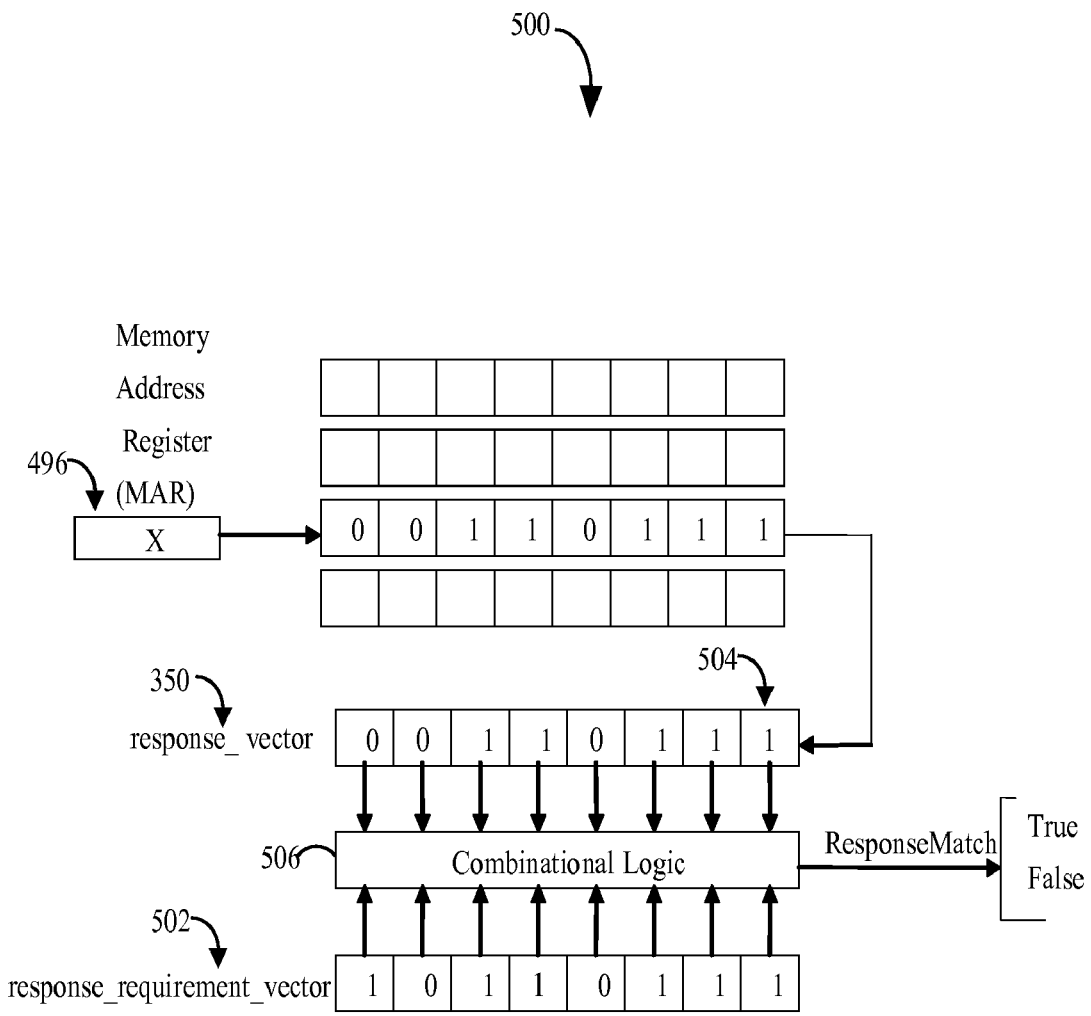
FIG. 33 is a schematic diagram illustrating a comparison between response_vector and response_requirement_vector.

FIG. 33 shows a schematic diagram 500 representing the comparison between the response_vector 384 and the response_requirement_vector 502 or said 350. The comparison is made in combinational logic circuitry 506, the response_vector 384 or said domain response vector at 494 is readout from set memory and input into the boolean processor 386 of FIG. 23 to determine the query response associate 152.

Figure 34:
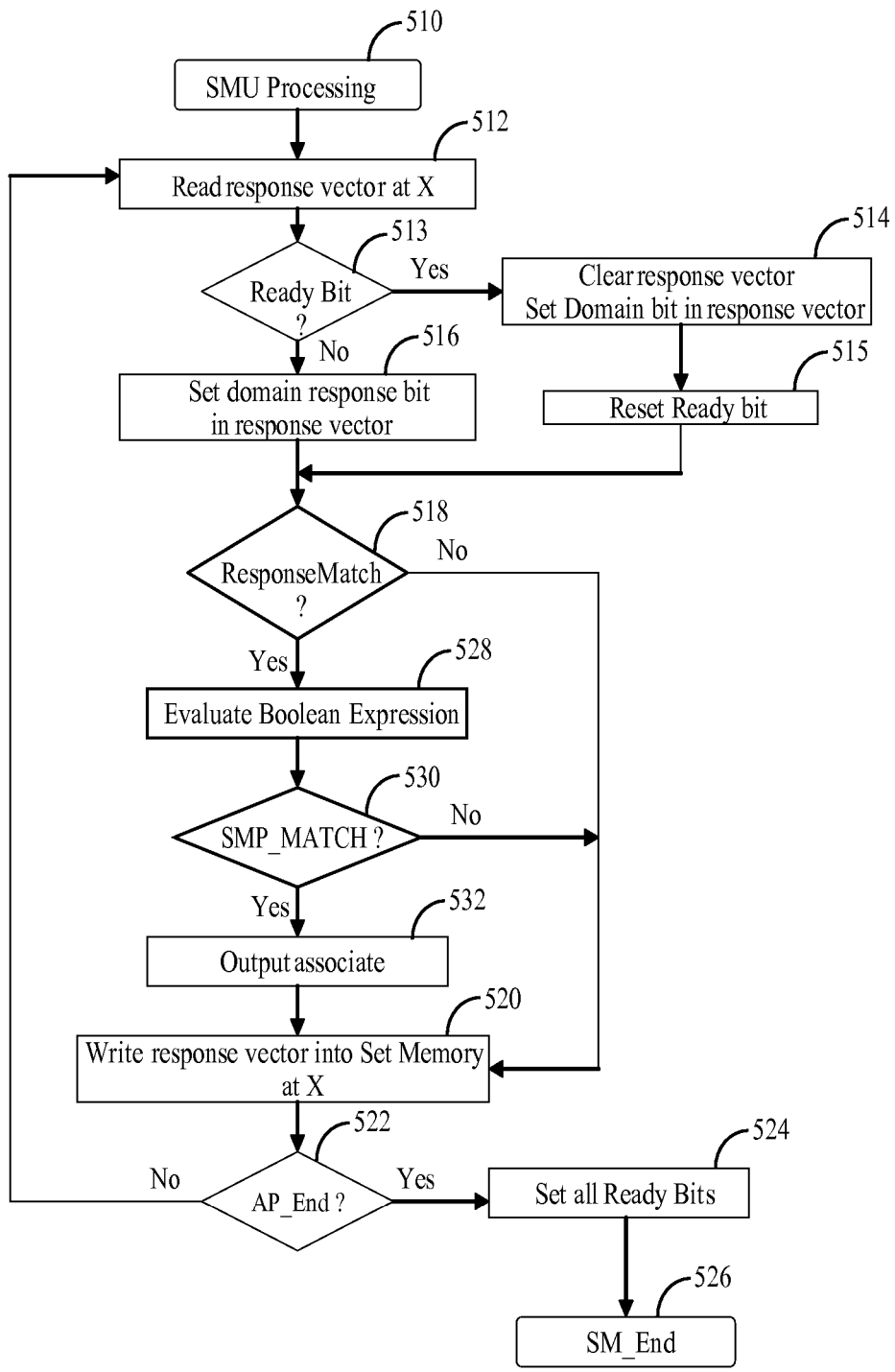
FIG. 34 is a high level operational flow chart illustrating for the processing of an ideal set processor memory.

FIG. 34 is a high level operational flow chart 510 for the processing of an ideal set processor memory. The domain response_vector at the memory location X is read 512 and a check of the ready bit 513 to determine if this is first access to the location X in Set Memory for a query. If the check 513 is true, the response_vector is cleared and the domain bit corresponding to the domain key is set in the response_vector with all other domain bits set to 0 as shown at block 514 and the ready bit is reset 515. The ready bit is reset after the first access to a location during a query. If it is not the first access to location X the response vector is updated by setting the bit corresponding to the current responding domain index as shown at block 516. Next, the control is transferred to block 518 to determine if the response_vector matches the response_requirement_vector 502 and 384. If no match found, the response_vector is written back into the Set Processor memory at the memory location X as shown at block 520 and a check is being made as shown at block 522 to determine if the processing 508 is done on the last associate generated by the AP 18. If the processing 508 is not done, the Set Processor memory reads next response vector as shown at block 512. If the processing 508 is done on the last associate set generated by the AP, all Set Memory ready bits are set 524 and the processing is terminated as 526.

If the response_vector matches the response_requirement_vector as evaluated at block 518 the response_vector is processed by the Boolean domain Processor to evaluate at least one boolean expression created from the query as shown at block 528. A check is made at block 530 to determine if the response_vector satisfies the boolean expression. With reference to the result of the boolean expression at block 528, a flag SMP_MATCH is being evaluated at block 530. If the response_vector satisfies the boolean expression, the flag SMP_MATCH is set to true and accordingly a response associate set is output as indicated at block 532. If the response_vector does not satisfy the boolean expression the match signal SMP_MATCH is set to false that causes the updated response_vector to be written back into the Set Memory as shown at block 520. A check is made at block 522 to verify if the processing in the AP 18 is completed. Query processing terminates by setting all the ready bits in Set Memory as shown at block 524 and the processing terminates as shown at block 526. If the processing in the AP is not completed, the Set Processor reads the next response_vector as shown at block 512.

Figure 35:
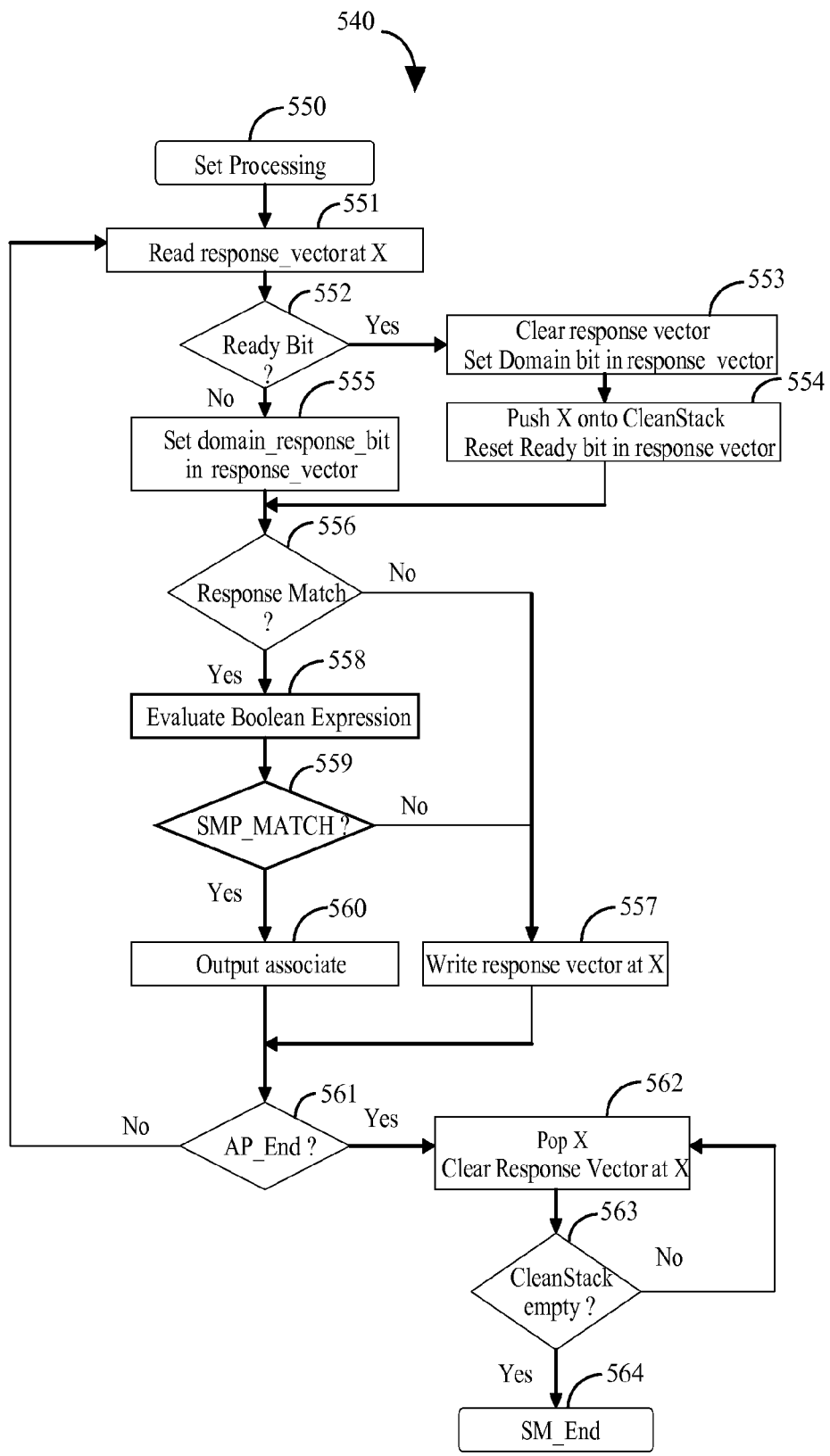
FIG. 35 is a high level operational flow chart illustrating a set processor memory implementation process using a conventional memory.

FIG. 35 is a high level operational flowchart 540 for a set processor memory implementation process using a conventional memory. The processing is initiated by a set processing as indicated at block 550. The associate set causes the domain response_vector at the set memory location X to be read as shown at block 551. A check is made at block 552 to determine if a ready_bit is set. If the ready_bit is set, the response_vector is cleared and the domain_bit is set as shown at block 553. Then the memory location X is pushed onto the CleanStack and the ready_bit is reset as shown at block 554. If the ready_bit is not set then the response_vector initialized earlier in the query processing session and the domain_bit is set in the response_vector as shown at block 555. Next, the control is transferred to block 556 for comparing the response_vector with the response_requirement_vector. If there is no match, the response_vector is written into the set processor memory at X as shown at block 567. If a match occurs, the response_vector is processed by the Boolean processor as shown at block 558. A check is made at block 559 to determine if the response_vector satisfies the query. If the response_vector satisfies the query the match signal SMP_MATCH is set to true and the response associate set is output as shown at block 560. If the response_vector does not satisfies the query the match signal, SMP_MATCH is set to false and the response_vector is written back into set memory processor at X as shown at block 557. Further, a check is made at block 561 to determine if the processing in the AP 18 has terminated. If the processing in the AP 18 has terminated then the addresses of X corresponding to the responding associate set are popped from a queue or a stack as shown at block 562 and the response_vector is cleared at the addresses X 496 indicated by the Cleanstack. At block 563, an evaluation is being made to determine if the CleanStack is empty and the processing 540 is terminated as indicated at block 564. If the processing of the AP is not finished as a result of the evaluation made at block 561, the set processor memory prepares to read the next associate set in an iterative manner as shown at block 551.

Figure 36:
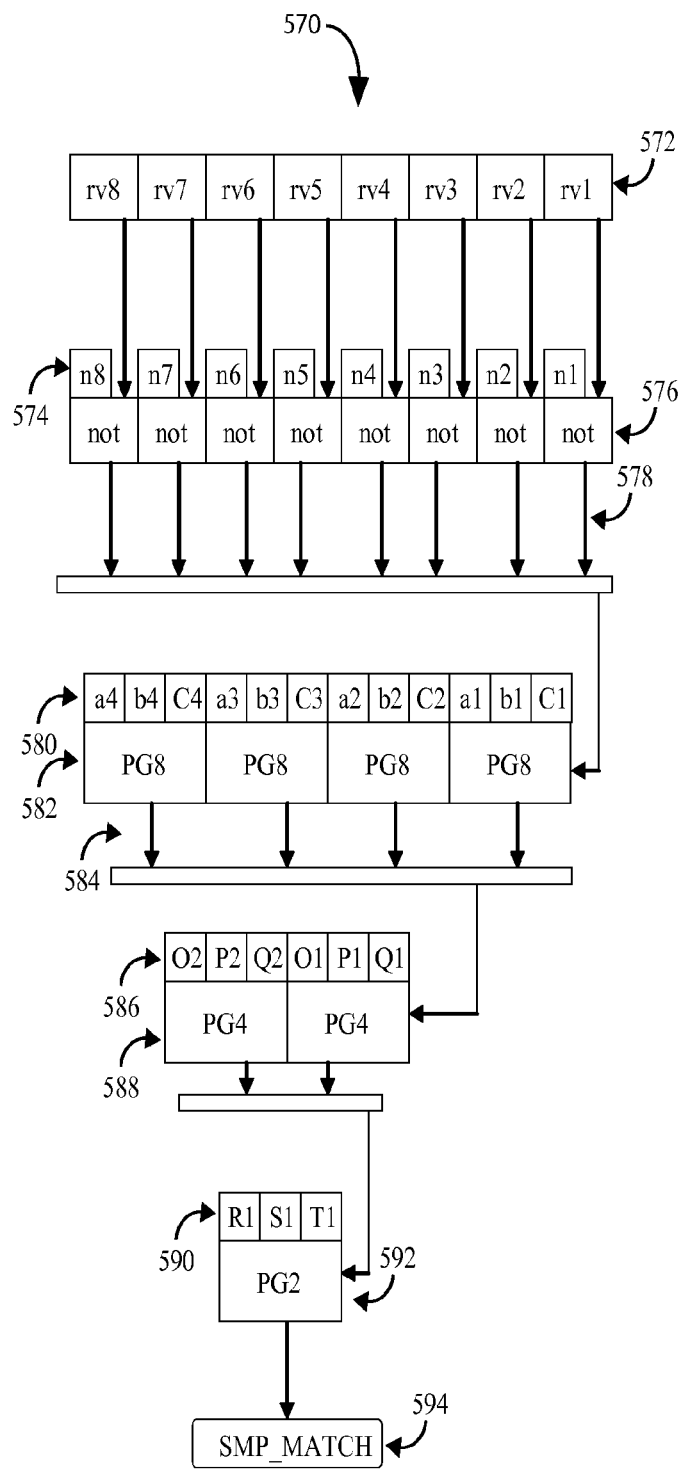
FIG. 36 is a schematic diagram illustrating an example of an organization of boolean domain processor for 8 domain keys.

FIG. 36 is a diagram 570 illustrating an example organization of the Boolean Processor for 8 domain keys. The Boolean Processor 386 operates on the Boolean expression which has already been parsed and has had all parentheses removed so the evaluation of the Boolean expression can take place at a highest possible speed. Client software parses the boolean expression. The response_vector 384 read from the set processor memory at X 496 is applied to the Boolean Processor. A unary negation function n(k) is the first step in the processing of the response_vector 384 because of the precedence order rules for a Boolean operation as shown at 576. The first response_vector bits indicated as rv1 . . . rv8 at 572 may be negated with at least one n_vector indicated as n1 . . . n8 at 574. At least one 8 data input programmable gate (PG8) 582 selects at least one binary operator such as AND, OR or XOR depending on at least one input applied on a configuration vector indicated as C1, C2, C3 and C4 at 580. A pair of at least one selection vector indicated as (a4, b4), (a3, b3), (a2, b2), and (a1, b1) at 580 selects a single pair of the 8 outputs as shown at 578. At least one 4-data input programmable gate PG4 588 uses configuration vectors Q1 and Q2 indicated at 586 to select the one logic operation. The selection vector indicated as (O1, P1) and (O2, P2) at 586 are selected from the 4 output signals 584 generated by the at least one 8 data input programmable gate (PG8) 582. T1 shown at 590 is a 2-bit operation selector. The output of a last signal pair PG2 592 is the SMP_MATCH signal 594. If the SMP_MATCH signal 594 is true then the query expression is satisfied.

Figure 37A:
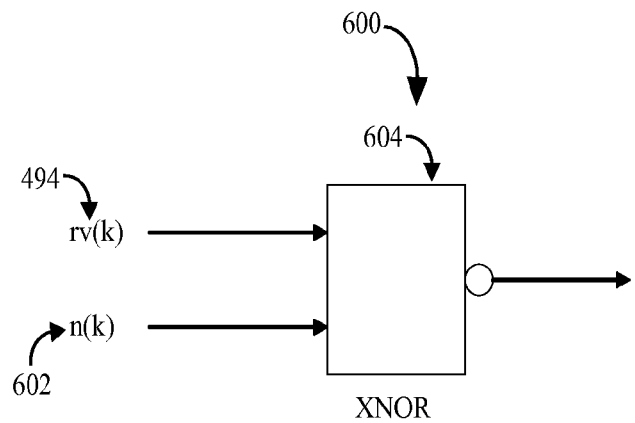
FIG. 37A is a diagrammatic representation illustrating a XNOR gate.
Figure 37B:
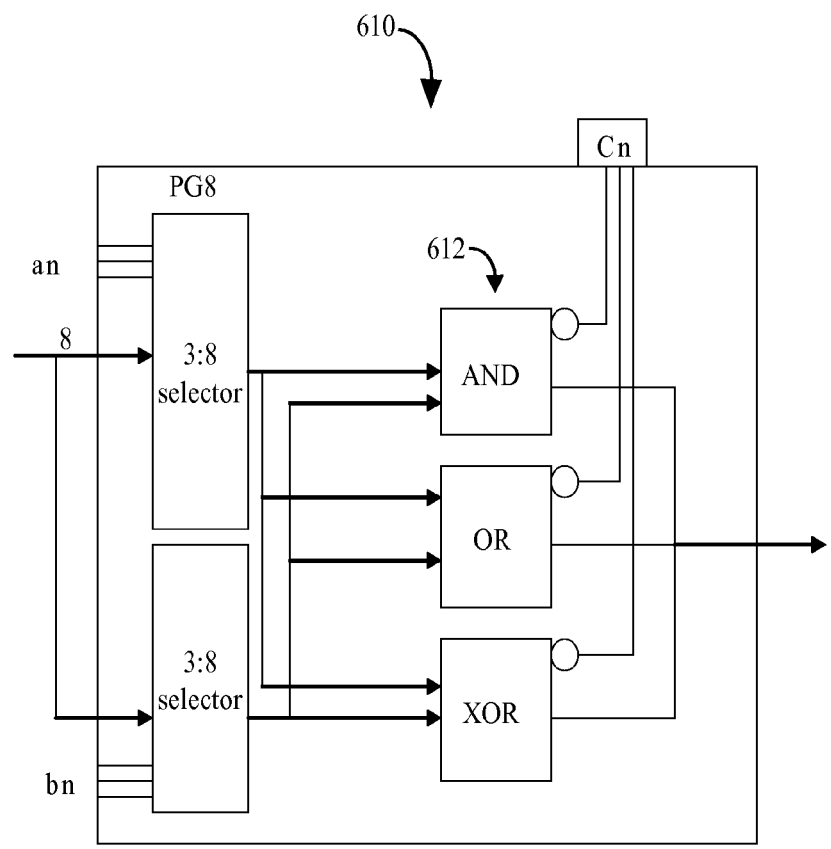
FIG. 37B is a diagrammatic representation illustrating a programmable combinational circuits.

FIG. 37 A and FIG. 37 B show diagrammatic representation 600, 610 of two programmable combinational circuits respectively. The programmable combinational circuit 600 performs the unary negation function n(k) 602 on each bit of the response_vector 384 indicated as rv (k). The unary negation function n (k) 602 is a part of the boolean precedence order evaluation. A programmable combinational circuit 610 selects a pair of inputs from the XNOR array 604 in the programmable combinational circuit 600 and performs the binary AND, OR or XOR operation 612. The binary operation 612 is an important part of the boolean processing of the response_vector 384.

Figure 38A:
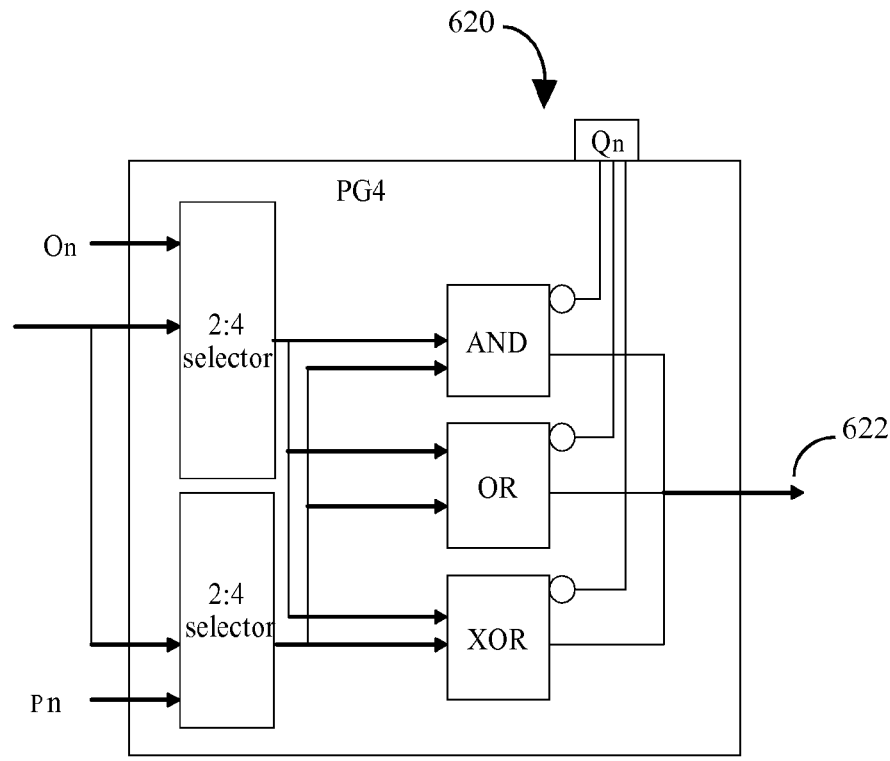
FIG. 38A is a diagrammatic representation illustrating a programmable combinational circuits.
Figure 38B:
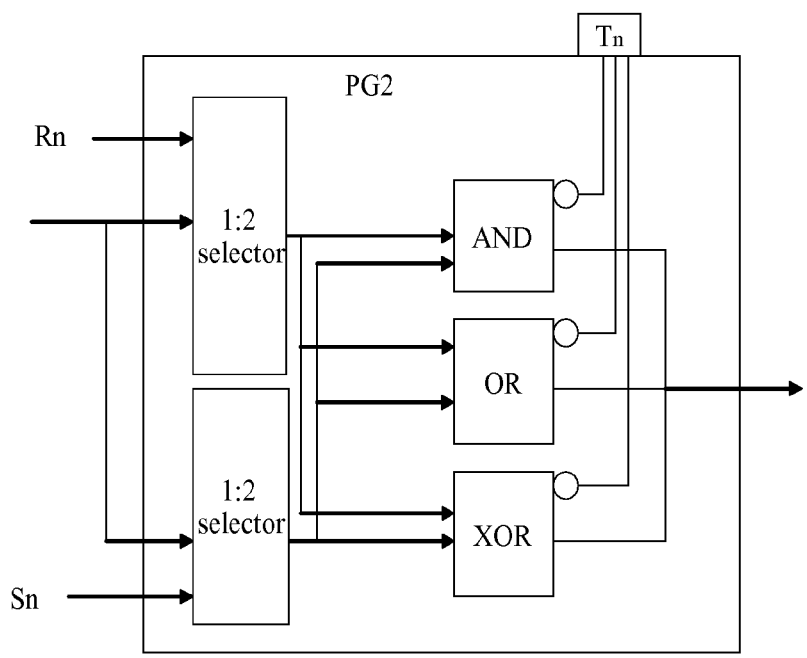
FIG. 38B is a diagrammatic representation illustrating a programmable combinational circuits.

FIG. 38 A and FIG. 38 B show two types of programmable combinational circuits utilizing AND, OR, XOR gates such as a set processor programmable gate logic 4 (PG4) 620 and a set processor programmable gate logic 2 (PG2) 624 which are used by the boolean processor 386 to determine if the response_vector 384 satisfies the query expression. The final output 622 is a true signal if the query expression is satisfied by the response_vector 384 or a false signal if the query expression is not satisfied.

Figure 39:
FIG. 39 is a block illustrating summarization of the precedence order for boolean query expression evaluation.

FIG. 39 is a block 630 illustrating summarization of the precedence order for boolean query expression evaluation. The client software simplifies the boolean query expression by removing all the parentheses before forwarding the query to the RP 10.

Figure 40:
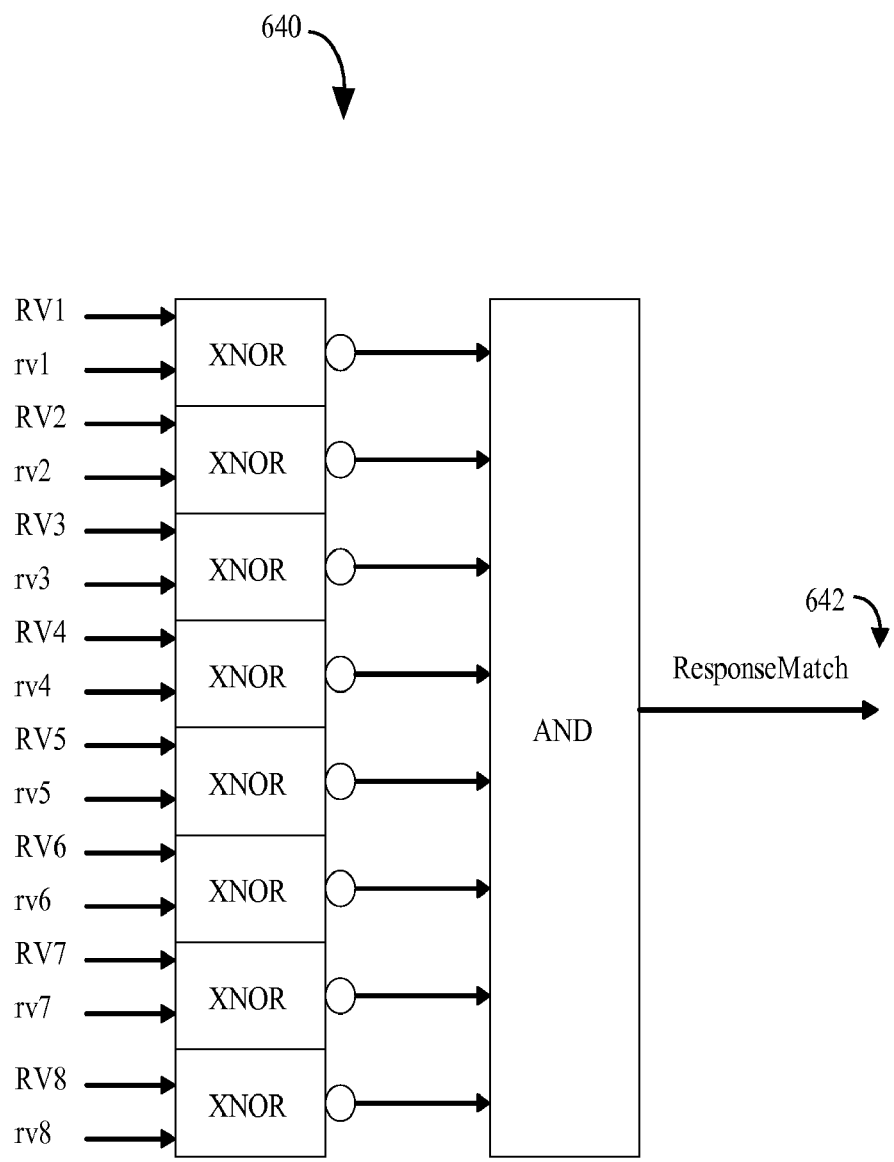
FIG. 40 is a schematic diagram illustrating a logic for comparing response_vector with response_requirement_vector.

FIG. 40 shows a logic 640 for comparing the response_vector 384 to the response_requirement_vector 502. A response match 642 indicates that all the required domain keys are responding to generate a ResponseMatch 642.

Figure 41:
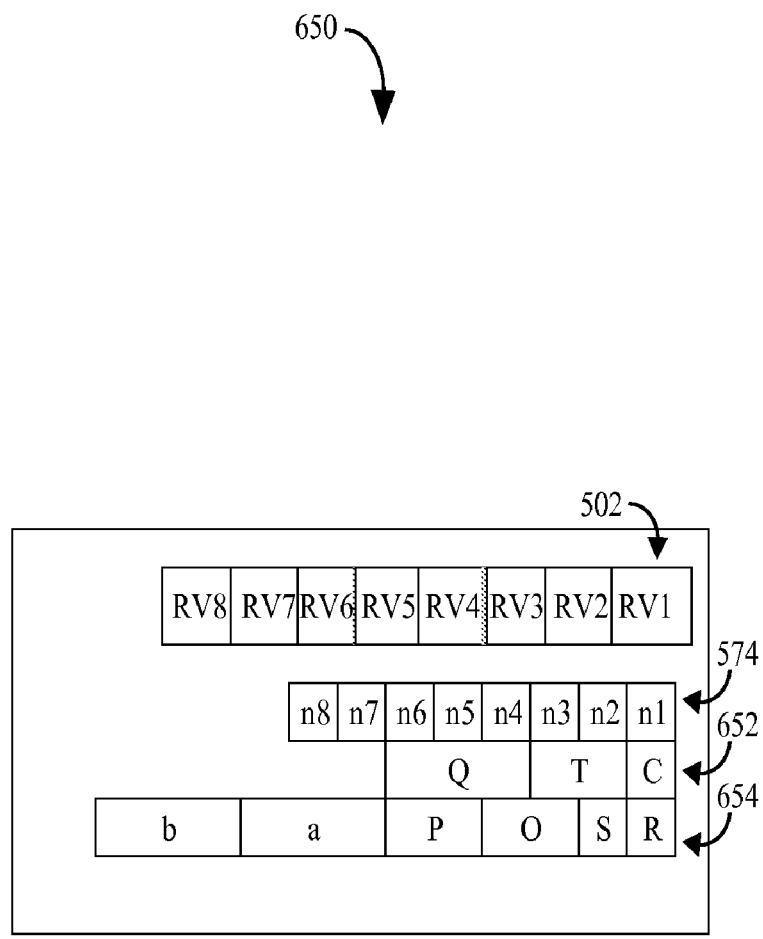
FIG. 41 is a schematic diagram illustrating a boolean domain processor configuration and a control packet.

FIG. 41 shows a schematic diagram 650 for the boolean processor configuration control. The response_requirement_vector 502 indicated as RV1 . . . RV8 is prepared by the client software and included in the query 12. The unary negation operation is controlled by the n_vector 574 indicated as n1 . . . n8. The configuration vector 652 indicated as C, Q, T configure the programmable gates PG8 582, PG4 588 and PG2 592. The pair selection vector 654 indicated as R, S, O, P, a, b performs the signal pair selection.

Longest Prefix Match Algorithm

Figure 42:
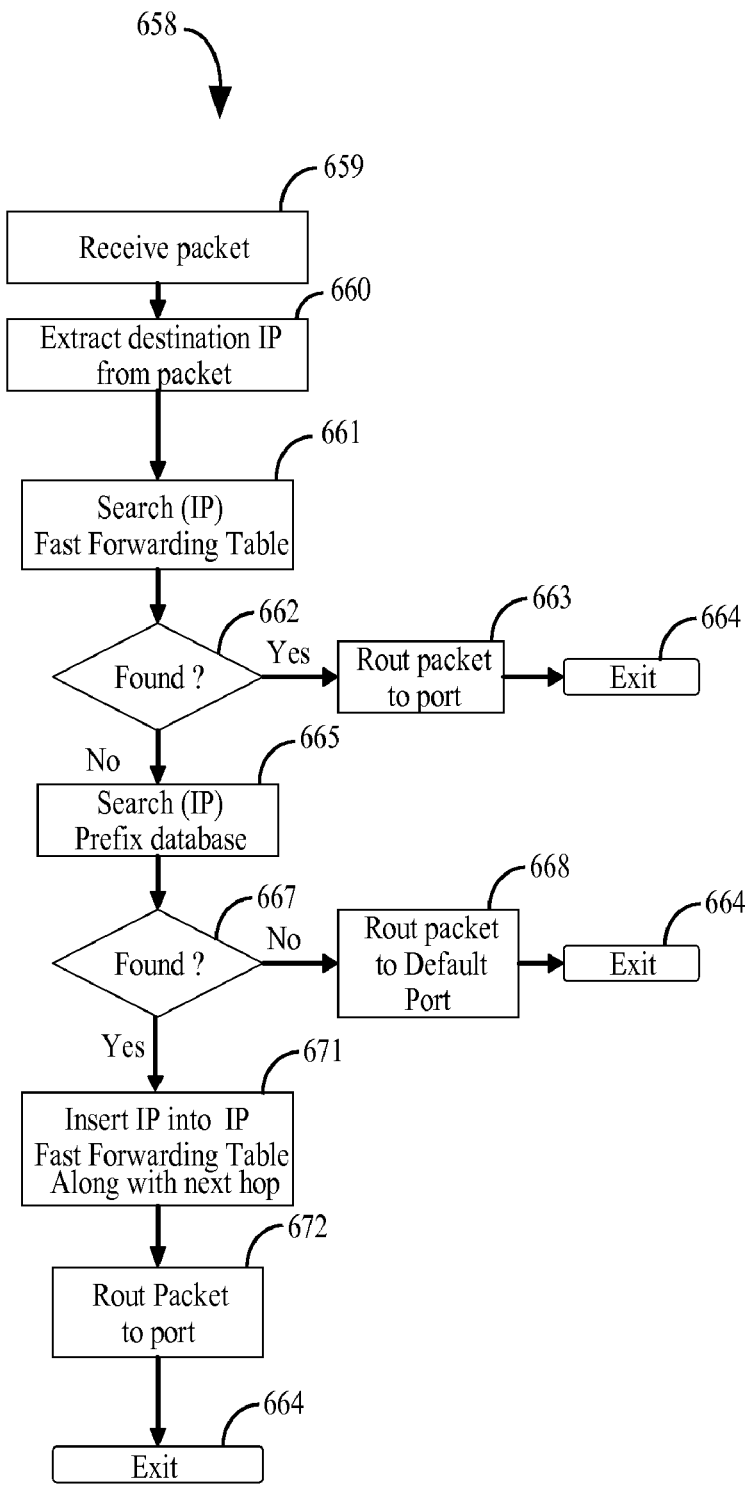
FIG. 42 is a high level operational flow chart illustrating a IPV6 RP longest prefix search engine processing.

FIG. 42 is a high level operational flowchart 658 of IPV6 RP longest prefix search engine processing. When the input query packet is received as shown at block 659, a destination IP address is extracted 660. The destination IP address is searched in a fast-forwarding table as shown at block 661. If the destination IP address is found 662, the input query packet is immediately routed to a hop port as shown at block 663 and the IPV6 RP longest prefix search engine processing terminates as shown at block 664. If the IP address is not found as indicated at block 661 in the fast forwarding table, a search is performed against a IP prefix database 665 to determine the best matching prefix. If the IP address cannot be matched at block 667, a default port is assigned as shown at block 668 and the processing 658 terminates at block 664. If the longest prefix is found then the IP address is inserted into the fast forwarding table with the best matching prefix information and port as shown at block 671. The input query packet is routed to the hop port as shown at block 672 and the processing terminates as shown at block 664. Additional information is included in the forwarding table such that additional activities may take place besides routing.

Figure 43:
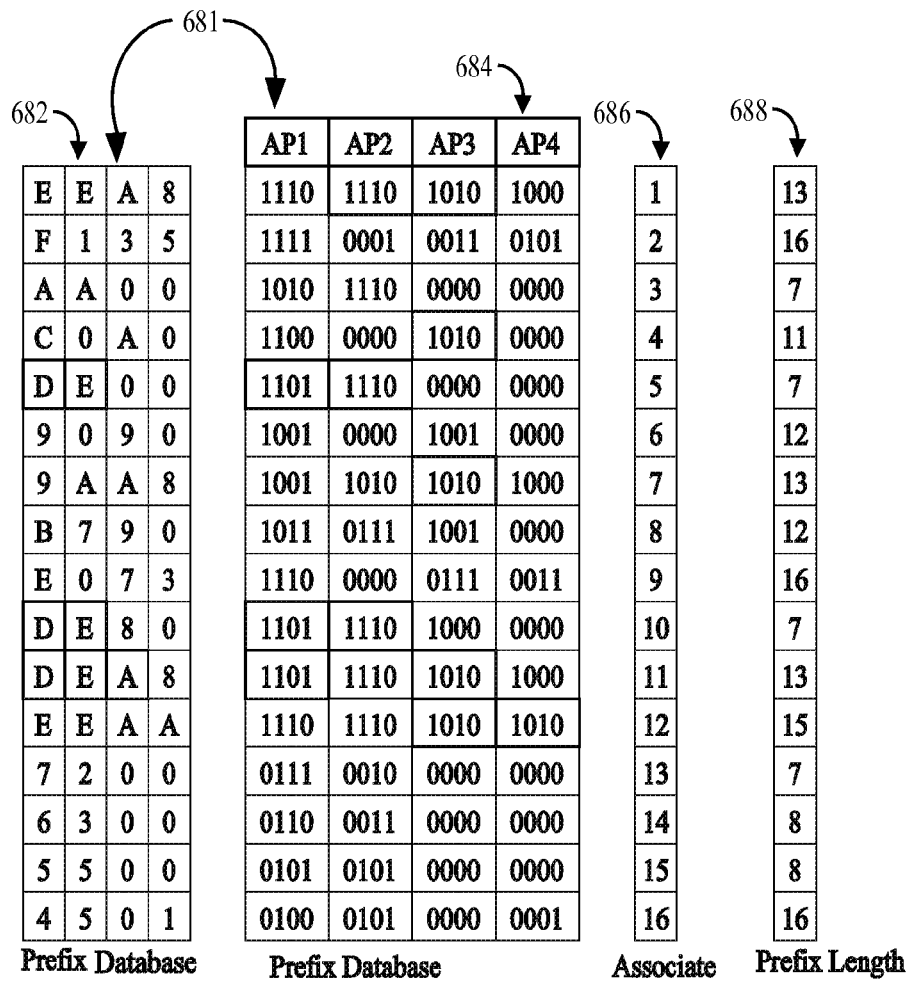
FIG. 43 is a schematic diagram illustrating an example of a prefix database used to demonstrate the longest prefix match using a new method.

FIG. 43 is a schematic diagram of an example prefix database 681 used to demonstrate the longest prefix match using a new method. The prefix database is represented includes an address 682, an associate 686 and Prefix length 688. Each column in 682 and 684 corresponds to domain key input to AP 18, specifically AP1 694, AP2 696, AP3 698 and AP4 700. In the prefix database 681, AP1 694 is the high order domain processor and AP4 18 is the low order domain processor. The associate assignment 686 and prefix length 688 are stored in the AP18. The prefix length 688 is used in the longest prefix match algorithm. A prefix length of 16 shown at 688 corresponds to an IP match in the example.

Figure 44:
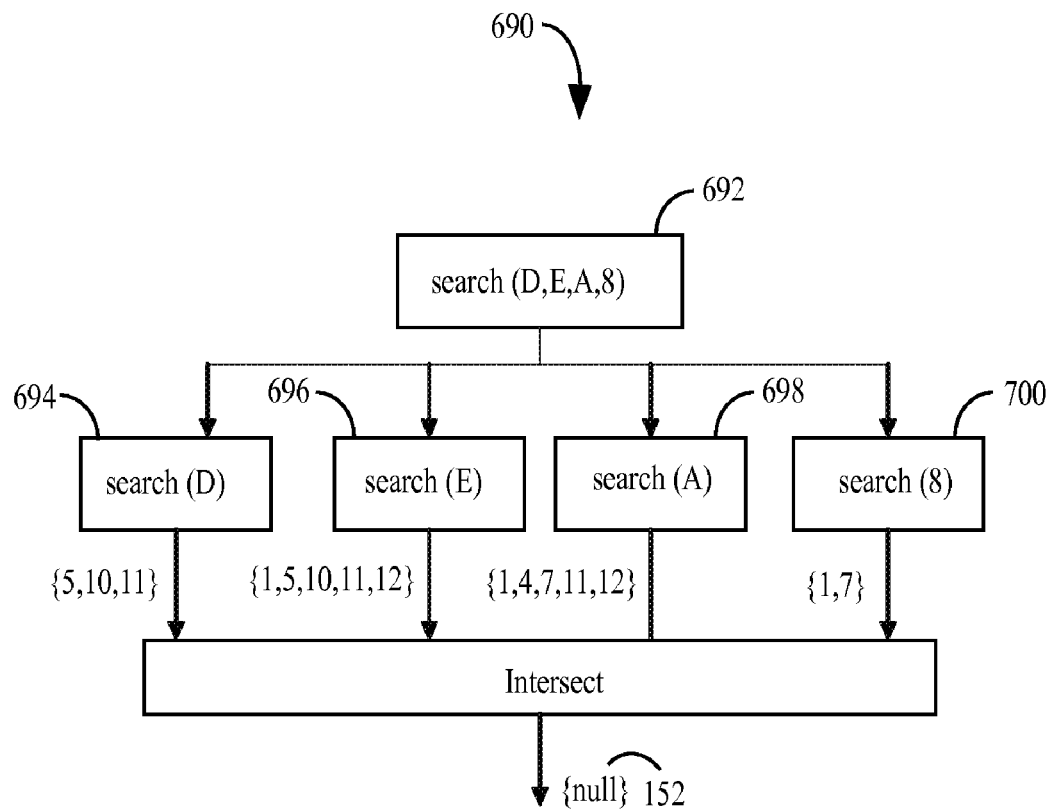
FIG. 44 is a block diagram illustrating example architecture for a longest prefix match algorithm implemented using a new method.

FIG. 44 is an example architecture 690 for the longest prefix match algorithm implemented using the new method. A search operation search (D, E, A, 8) 692 is broken down into 4 parallel search operation indicated as 694, 696, 698, 700. The results of the search operations are processed at the SP 22. The SP 22 generates a unique associate response {11} for the three contiguous domains indicated as D, E, A and the response associate is a null output {null}. The associate set generated by the three search operations search (D), search (E), and search (A), have {11} in common and the search operation search (8) generates an associate set {1, 7}. Thus, the result of the intersection operation is a null set 152. Thus {11} represents the maximal domain matches from high to low order. If the prefix length is 12 then this search is complete and the longest matching prefix has been found {11}. If the 12<prefix length<16, then the remaining bits in the prefix must match the last domain key bits in high to low order. This is called the Prefix Residue. If the Prefix Residue matches the first non matching domain input then the Longest Match Prefix has been found. If it does not match the Longest Match Prefix has not been found.

Figure 45:
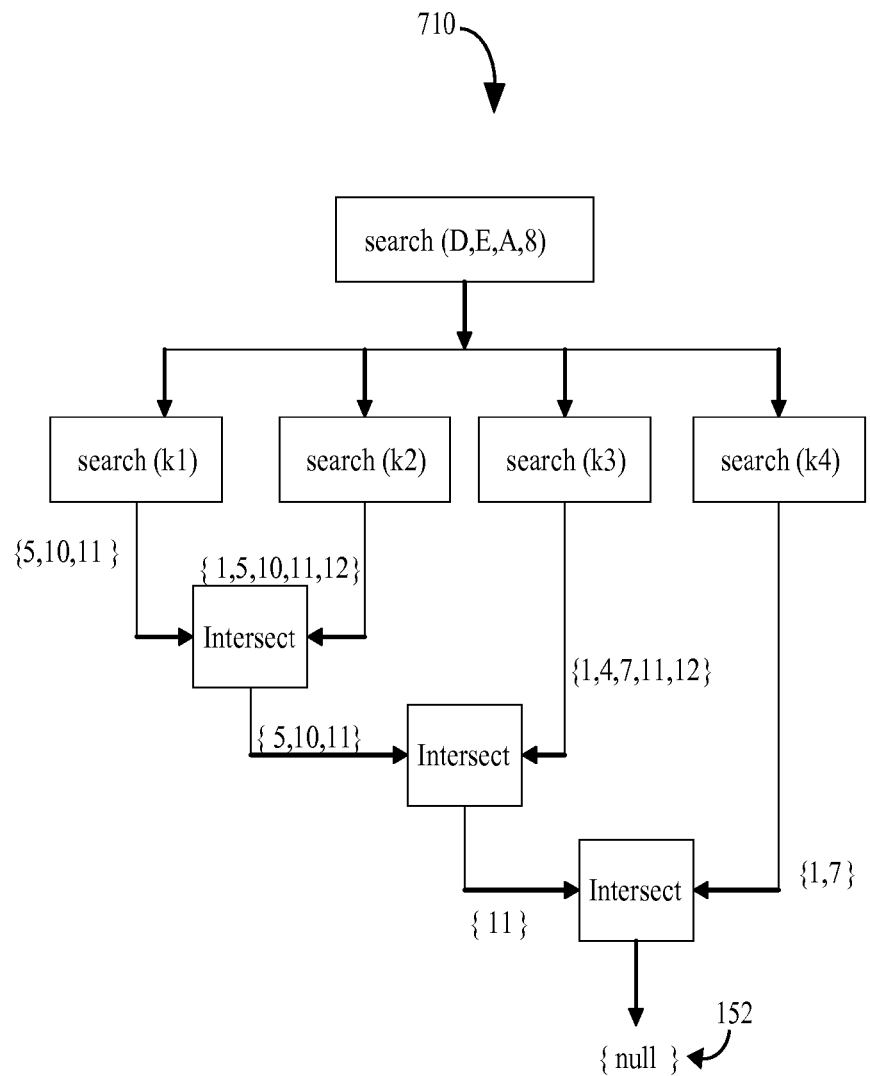
FIG. 45 is a block diagram illustrating sieve architecture for a longest prefix match algorithm.

FIG. 45 shows a sieve architecture 710 for the longest prefix match algorithm. The matching domains are shown in high to low order. The result 152 of the processing of the sieve architecture 710 is identical with the result 152 of the processing of the architecture 690. FIGS. 44 and 45 show the equivalence of different SP interconnects and also suggest that the programmable interconnects are useful. The programmable sieve architecture 710 has a flexible fault tolerance.

Figure 46:
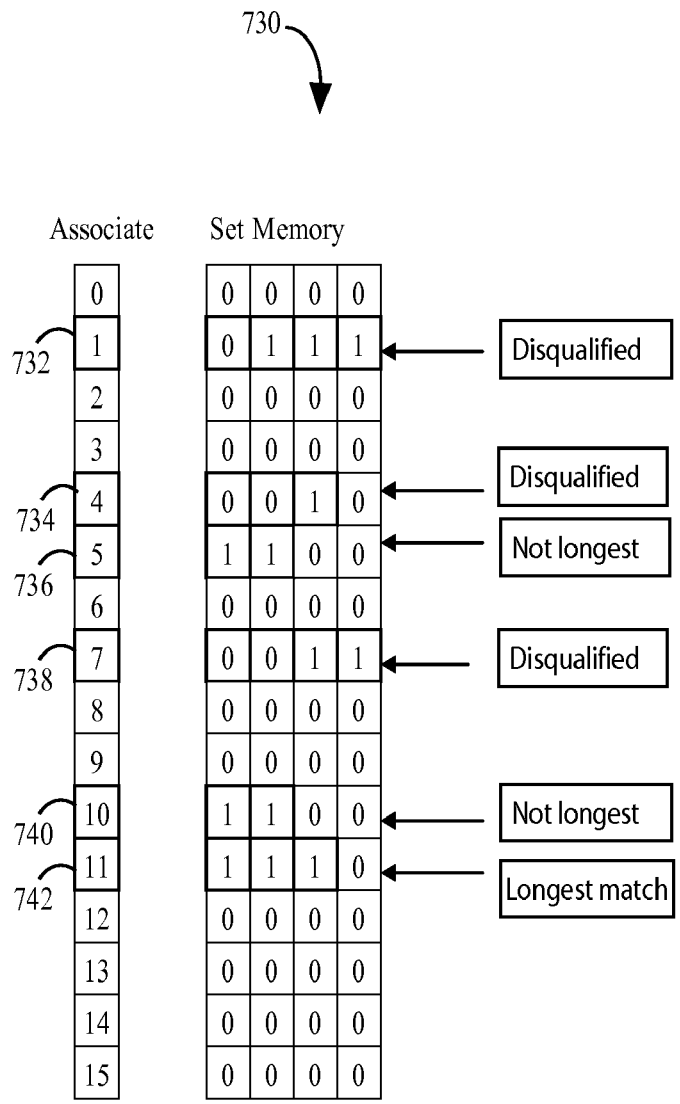
FIG. 46 is a schematic diagram illustrating an example for a longest prefix match algorithm.

FIG. 46 shows an example 730 for the longest prefix match algorithm. An associate=1 indicated as 732 is disqualified as a solution because the response_vector 0111 is missing the required response in bit 4. The associate=4 indicated as 734 and the associate=7 indicated as 738 are disqualified as the solutions because the required responses are missed in bit 3 and bit 4. The associate=5 indicated as 736 and the associate=10 indicated as 740 have acceptable responses but are not the longest matching prefix 742. The longest match is associate=11 indicated as 742 that includes response in bit 4, bit 3 and bit 2. The longest matching prefix algorithm uses the sequence of occurrence of associate domain responses to eliminate the prefixes that are not the longest prefix. A Null result requires a prefix residue match on the first highest order non matching domain. Storing the prefix residue and the prefix residue length facilitates a prefix residue match.

Figure 47:
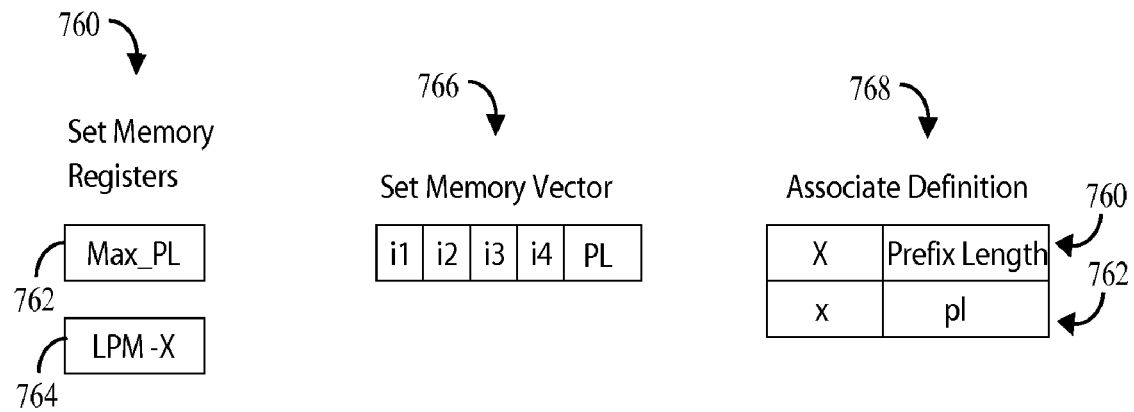
FIG. 47 is a diagrammatic representation illustrating a composition of a set memory register, a set memory vector and an associate definition.

FIG. 47 shows a diagrammatic representation of a composition of Set Memory Register 760, a Set Memory Vector 766 and an Associate Definition 768. The Set Memory Register 760 includes a Max_PL register 762 and a LPM_X register 764. The associate 768 stores the prefix length pl and the unique memory location x. The Max_PL register 762 keeps track of the maximum length of the best matching prefix 742. The LPM_X register 764 is updated with the associate index corresponding to the longest prefix match 742. When the longest prefix match process terminates the LPM_X register 764 contains the associate corresponding to the longest matching prefix 742 and the contents of the LPM_X register 764 are output to a fast forwarding table 878. If there is no longest prefix match 742, a default associate is assigned for routing. The ideal Set Processor Memory 490 stores the Set Memory vector 766. The Set Memory vector 766 stores a bit corresponding to each domain key indicated as i2, i2, i3, i4 and a prefix length as indicated as PL. PL may be stored with the Set Memory vector 766 at memory location X to facilitate comparison.

Figure 48:
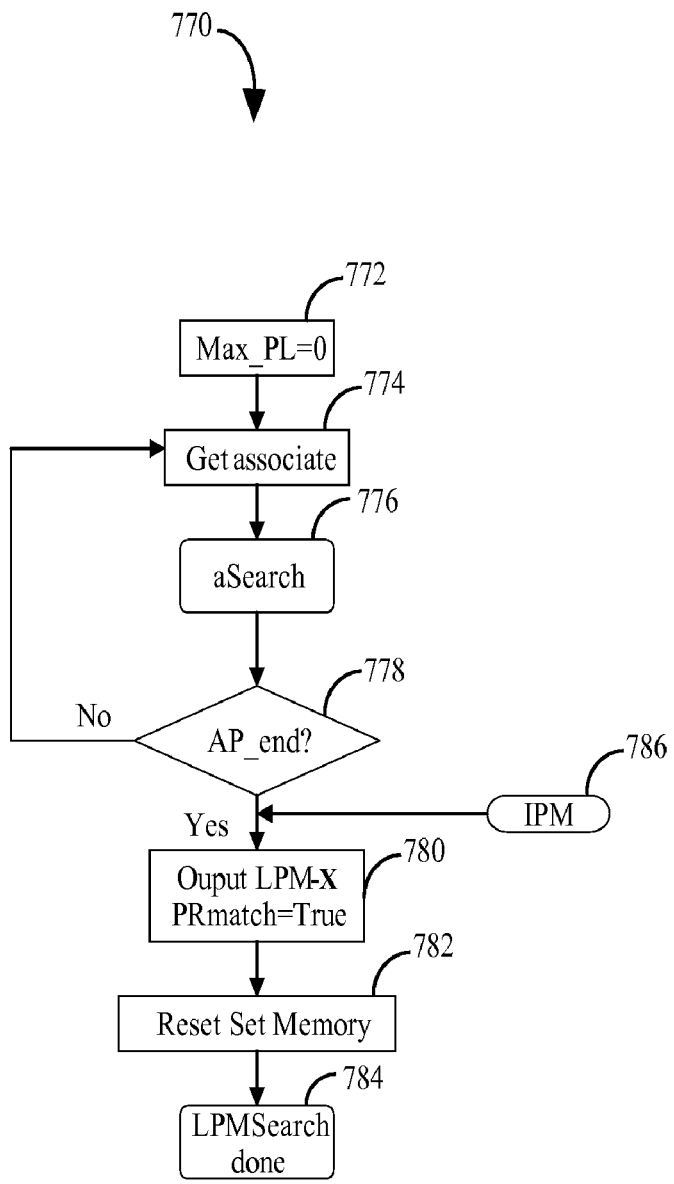
FIG. 48 is a flow chart illustrating a longest prefix match search process for finding a longest prefix that matches an IP address.

FIG. 48 shows a flowchart 770 of the search process for finding the longest prefix that matches the input IP address as in 692. The Max_PL is initialized to zero as shown at block 772. The associate set generated by the at least one AP 18 is accepted as shown in the block 774. For each associate, X and PL are extracted and a search is performed as shown at block 776 to determine if the associate belongs to the longest matching prefix. A check at block 778 is made to determine if AP processing is complete. then the associate corresponding to the longest matching prefix is output to the fast forwarding table 878 and the packet is routed.

If the IP address is entered into the database, then the IP address will be recognized efficiently in all subsequent packets as shown at block 786. The LPM_X register stores the address of the best matching prefix and is used to access the fast forwarding table. Search process 770 terminates at 784. If the best prefix match is found its address is stored in the LPM_X register as shown in the block 812 and the process terminates at 786. The set processor memory is reset as shown in the block 782 for the next longest prefix match routing query and the longest prefix match process indicated at the flowchart 770 terminates as shown at block 784.

Figure 49:
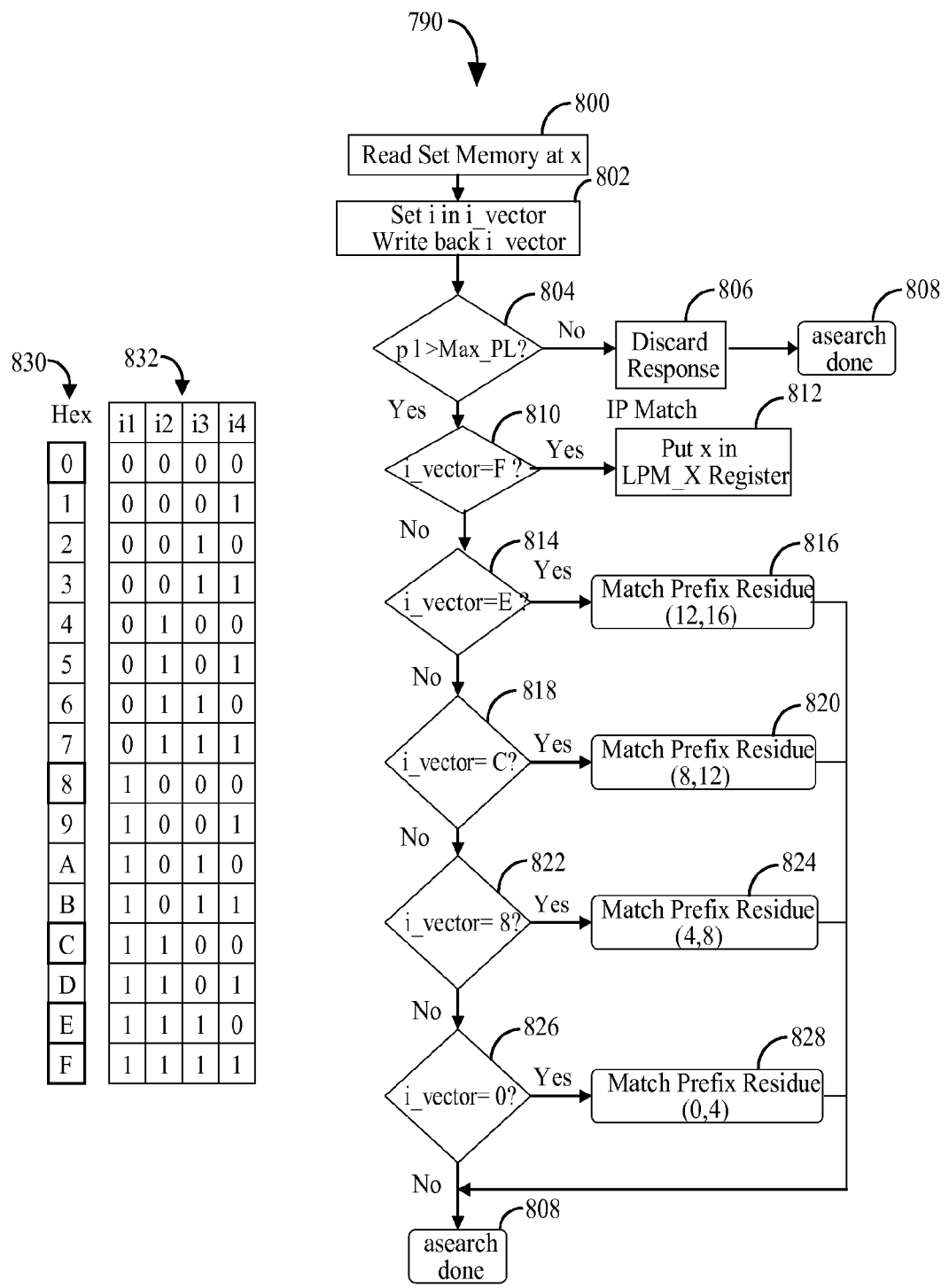
FIG. 49 is an operational flow chart illustrating an example for an associate search operation to select a associate corresponding to a maximum prefix length.

FIG. 49 is a flowchart 790 of the associate search process 776 to select the associate corresponding to the longest matching prefix. This process is performed for each associate until the best match is found except that associates that have prefix length shorter than or equal to the current maximum are discarded at 806 and the process terminates at 808. Set Memory is read from location X at block 800. x and pl are extracted from the associate 768. The Set Memory vector is read, the bit corresponding to current domain is set and the Set Memory vector is written back into the Set Memory as shown at block 802. If the prefix length pl is greater than the Max_PL 772 then the domains corresponding to are checked from highest to lowest order simultaneously. The i_vector corresponding to the highest order domain i1 831 is at F in 830. If the i_vector bits=1111 as indicated at 832, then the best matching associate has been found as shown at block 810. The memory location X is put into the LPM_X register 764 as shown at block 812 designating a perfect IP match as shown at block 786 and search 800 terminates at block 808. The correspondence of the i_vector with F means that all APs 18 AP1, AP2, AP3 and AP4 generate the same associate having the prefix length of 16 bits. If the i_vector bit is E as shown at block 814 the APs, designated as AP1, AP2 and AP3 generate the same associate leaving only AP4 without a match. The prefix residue is then compared with the input to AP4 816 bits 12 to 16 and a search terminates at 808 if a match is determined.

If the i_vector bit is C as shown at block 818 the APs, designated as AP1 and AP2 generate the same associate leaving AP3 and AP4 without a match. The prefix residue is then compared with the input to AP4 816 bits 8 to 12 and a search terminates at 808 if a match is determined. If the i_vector bit is C as shown at block 822 AP1 generate associates leaving AP2, AP3 and AP4 without a match. The prefix residue is then compared with the input to AP2 bits 8 to 12 824 and a search terminates at 808 if a match is determined. Failure of the Prefix Residue to match the residual domain value causes the associate to be discarded.

Figure 50:
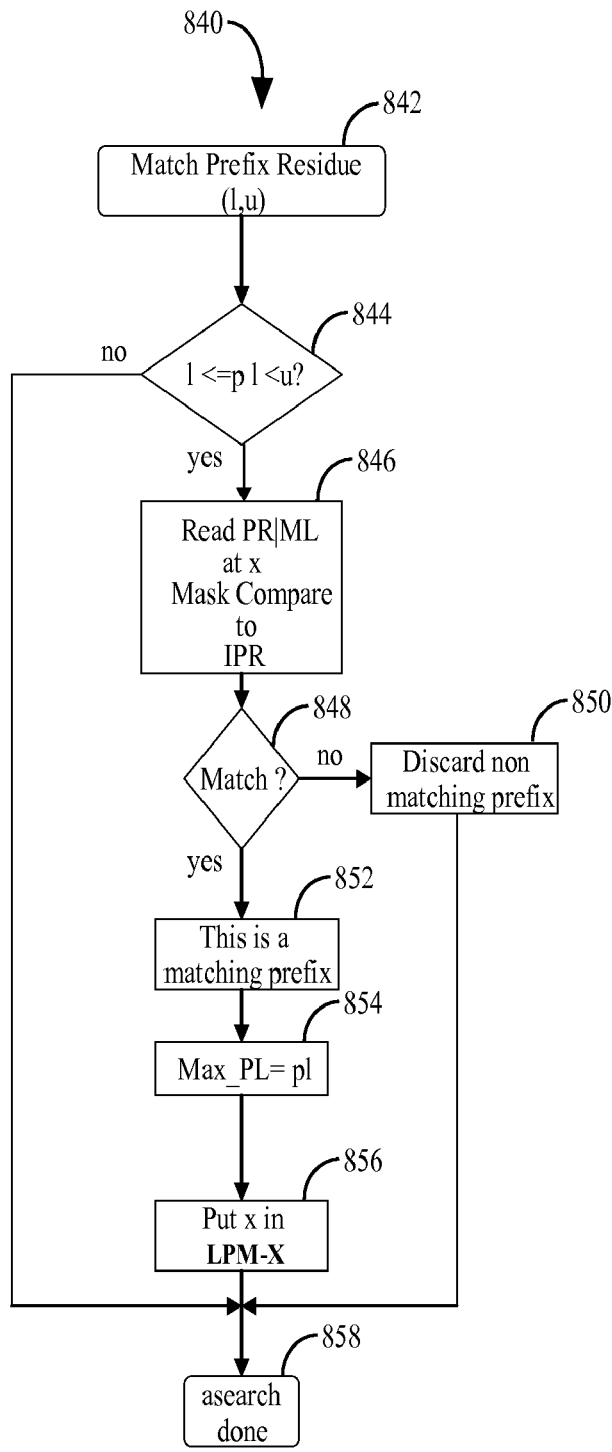
FIG. 50 is a flowchart illustrating a prefix residue matches and filter process.

The flow of the at least one associate set from the at least one AP to the at least one SP can be filtered and reduced. Passing the length of the best matching prefix back to all active APs permits filtering. Only associates corresponding to a greater length prefix will flow to the SP. FIG. 50 shows a flowchart 840 for a prefix residue match process.

Only associates corresponding to a greater length prefix will be processed 844. The value of I and u is received as shown at block 842. If the prefix length of the prefix match of the "E, C, 8, 0" segment shown in the FIG. 49 is not equal to 1 or in between 1 and u as shown in the block 844 the residue match process is not performed. When the prefix length pl lies in between 1 and u, the prefix residue is read from Prefix Residue Memory 862 along with mask length (ML) 846 868 and the residual IP address is masked as shown at block 846. The residue comparison is performed as shown at block 848. If a match occurs in the comparison, the masked IP address is the current longest matching prefix as indicated at block 852 and the current longest matching prefix is saved in the Max_PL register as shown at block 854. The memory location x is stored in the LPM_X register as shown in the block 856 and the associate search process terminates 858. If there is no match in the prefix residue comparison the non matching prefix is discarded as shown at block 850. Following this example, the longest matching prefix can be determined for arbitrarily long input key such as IPV4 or IPV6.

Figure 51:
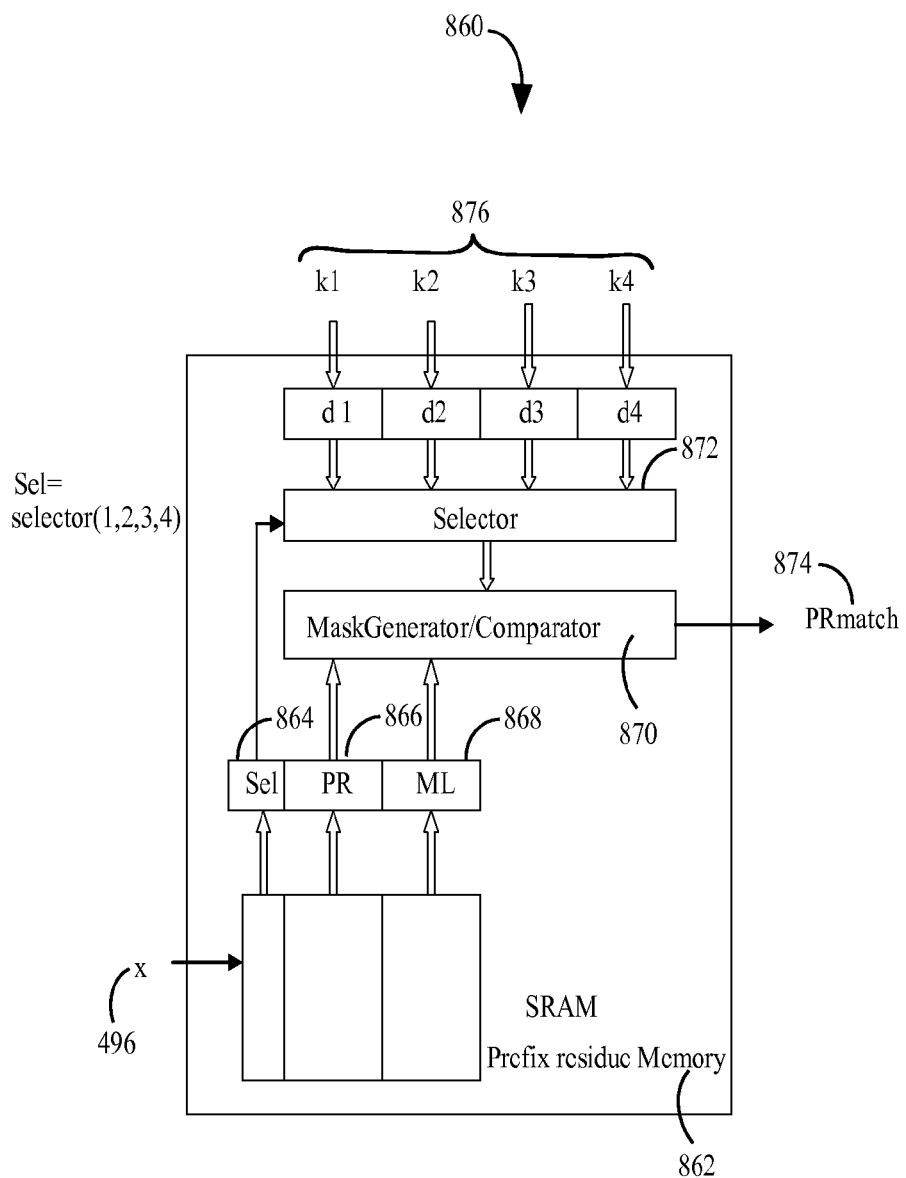
FIG. 51 is a block diagram illustrating a hardware implementation for a prefix residue match process.

FIG. 51 shows a hardware implementation 860 for the prefix residue match process 842. The memory location x 496 is input to address the SRAM 862 and the domain selector indicated as Sel 864, prefix residue (PR) 866, and mask length (ML) 868 are read out. The prefix residue match process selects a domain key 876 indicated as k1, k2, k3, k4 and matches the i$^{th}$ domain key in the prefix residue memory 862 at the memory location X 496. The selector 872 selects the at least one domain key 876 represented as k1, k2, k3, or k4. A mask generator/comparator 870 masks the domain key 876 and compares the masked selected key with the prefix residue PR 866. If there is a match, a new matching longest prefix 742 has been found and a PRmatch bit 874 is set to true. If there is no match the, PRmatch bit 874 is set to false.

Figure 52:
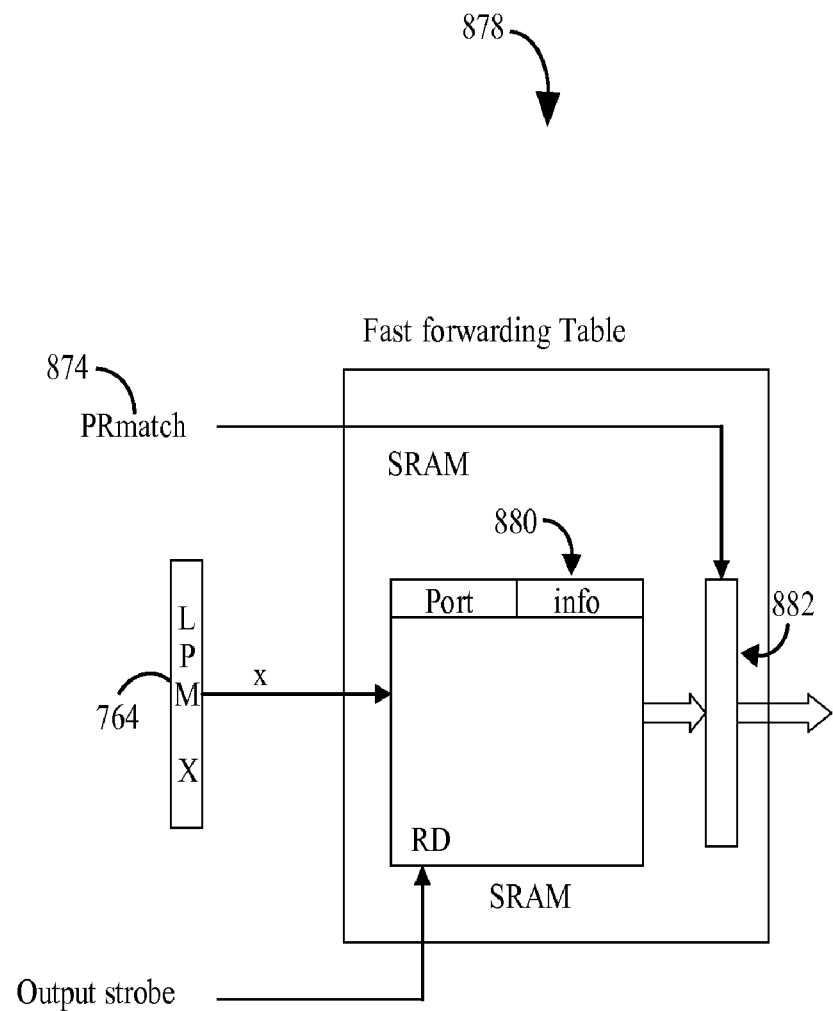
FIG. 52 is a block diagram illustrating a fast forwarding table.

FIG. 52 shows the fast forwarding table 878. The fast forwarding table 878 includes at least one packet routing instruction 880 corresponding to the entries in the prefix database 680. The signal Output strobe causes the SRAM 880 to be read each time a new associate index 764 is determined. The output goes into register 882 which is activated by the PRmatch signal 874. The fast forwarding table can be updated by writing a forwarding entry into SRAM 880 each time a new associate index for which there is a prefix residue is found.

AP Data Structures

Figure 53:
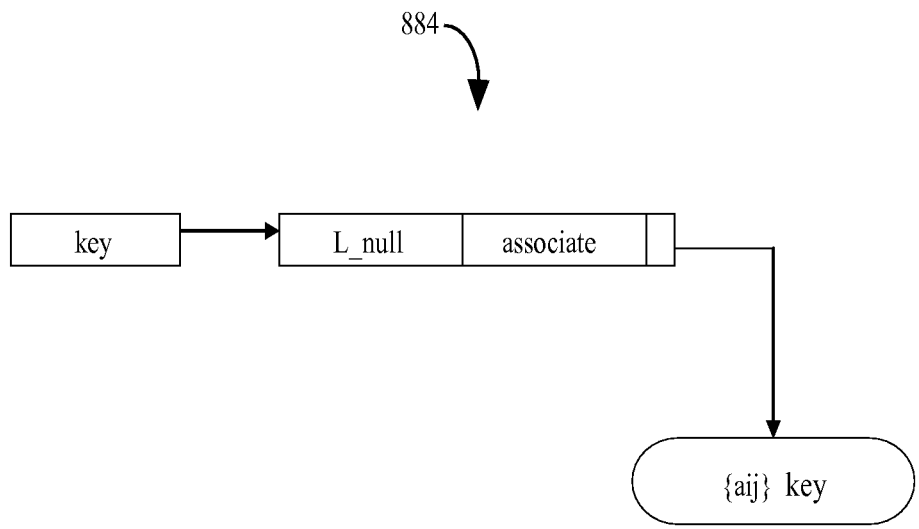
FIG. 53 is a diagrammatic representation illustrating a basic logical implementation of an AP list data structure.
Figure 54:
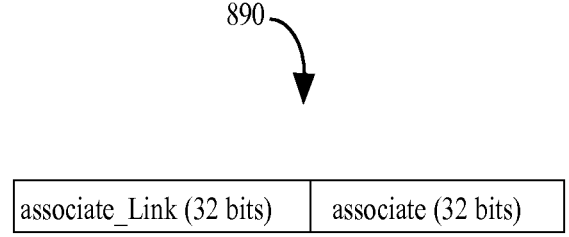
FIG. 54 is a block diagram illustrating a memory word configuration that can represent an AP data structure in a DRAM.

FIG. 53 shows a basic logical implementation of an AP list data structure 884. FIG. 54 shows the memory word configuration 890 that can represent the AP data structure 884 in a DRAM 274. There will be one memory read operation per associate with the naive implementation. The object is to reduce the number of read operations per associate.

FIG. 55 shows a schematic diagram of a more sophisticated AP data structure 900. A mode 00 configuration 902 is used for cases where there are 3 or more associates for the at least one relational instance rij. If there are only two associates then they can be read out simultaneously using mode 01 904. If mode 10 906 is used, the relational instance rij may have a key field up to 62 bits in length. If there is only associate corresponding to the super key, the next memory word will have mode 00 or mode 01 configuration. In this case, if there are two associates corresponding to the (key, key1) both are read out simultaneously on the second memory read. This yields performance of one read per associate. The data structure 900 is very efficient and can be extended to 96 or 128 bit word width if higher performance is required. Thus, for short list length of 1 or 2 associates can be read in one memory read. Short list length of 3 or 4 can be read in 2 memory read operations. This effectively increases the processing speed of the at least one AP 18 for short list lengths by 1.5 to 2 times.

FIG. 56 shows a diagrammatic representation 910 of a processing pipeline for the 64 bit and 96 bit word using the new more flexible and efficient data structure 900. Thus, 6.25 million search operations per second are shown to be achievable if every search was a worst-case search for this example without further optimization of the RP architecture 10.

Figure 57:
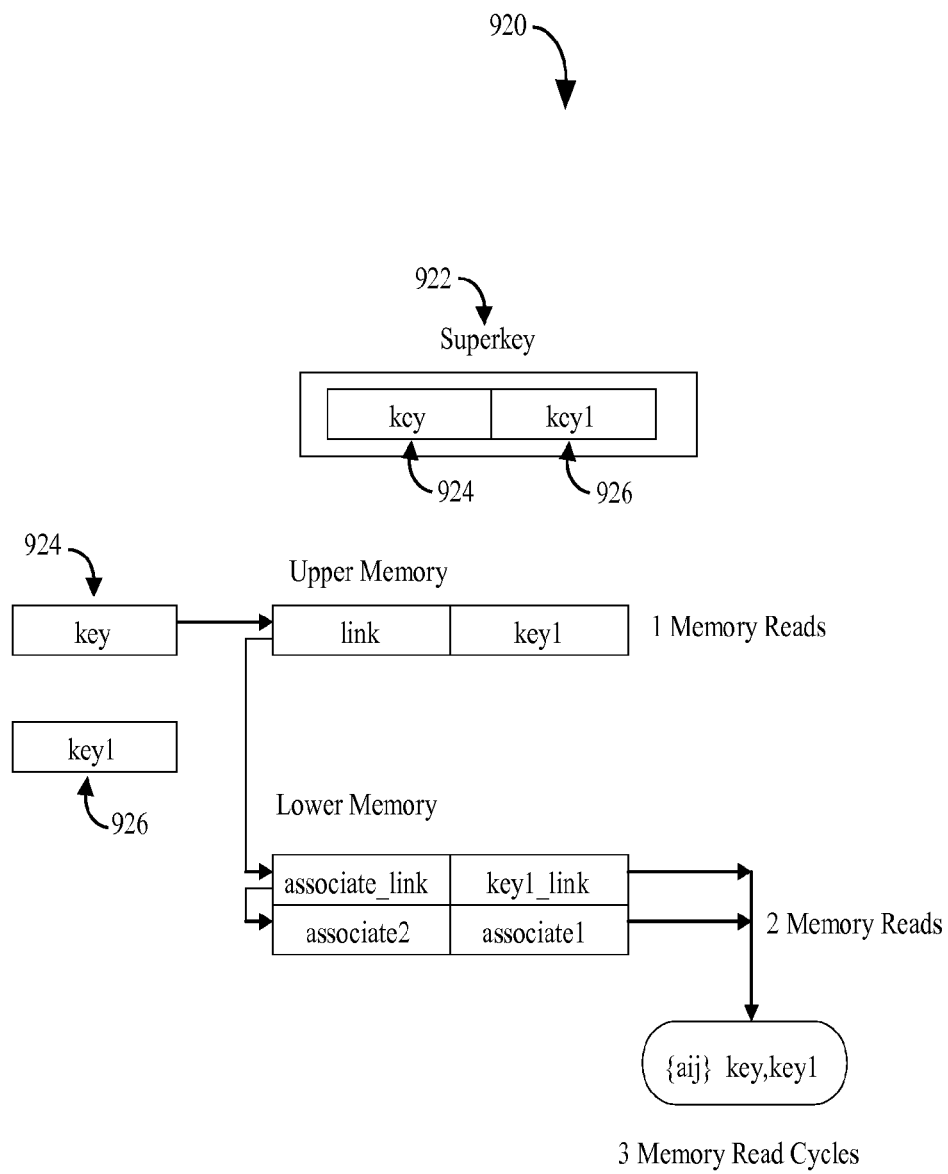
FIG. 57 is a schematic diagram a logical data structure for a 64-bit word.

FIG. 57 shows a logical data structure 920 for a 64-bit word. The super key 922 is the combination of key 924 and key1 926. The logical data structure 920 shows that the additional key segment key 1 926 of the super key 922 may not match a first entry and that a "branch link" indicated by mode 11 indicated as 908 contains the information for the processor to locate a matching key segment or alternately readout associates when a matching key 1 926 is found. If no match is found, the output is an empty set.

Figure 58:
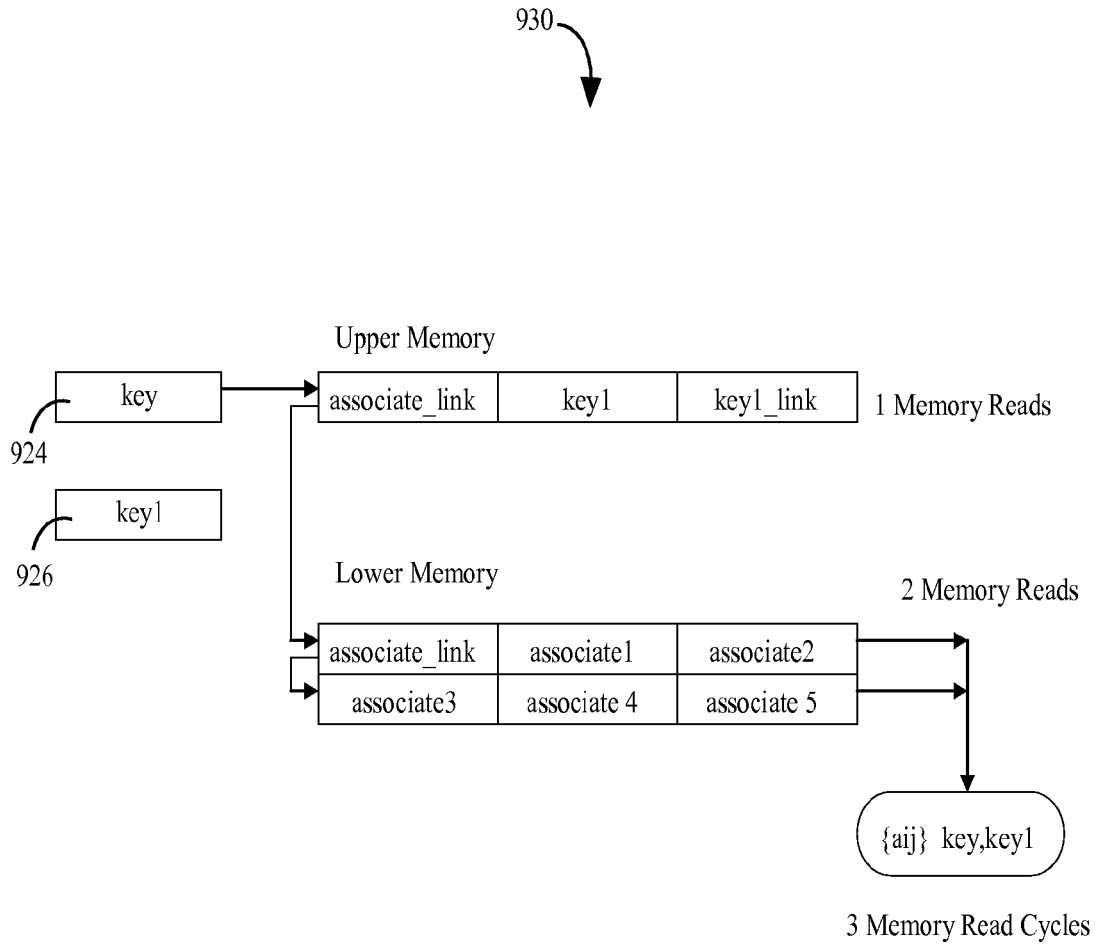
FIG. 58 is a schematic diagram a logical data structure for a 96-bit word.

FIG. 58 shows a logical data structure 930 for a 96-bit word. The super key 922 is the combination of key 924 and key1 926. The 96-bit data structure is the preferred embodiment for a general purpose RP 10 because it does not require an additional table entry to store a branch link and can readout more associates in parallel.

Packet Flow Control

FIG. 59 shows a logical memory word 940 for a 72-bit word in a memory of 1 million entries. The logical memory word 940 is used for 48-bit MAC addresses RP search engine. The memory access time is 3.5 nanoseconds and 100 million decisions per second is attainable with a single search engine RP 10. Key1 926 may be 8 bits which reduces the list length. In general, a list of the type being discussed herein is traversed in one memory read. However, support must be included for exceptional cases so the at least one AP 18 works perfectly all the time.

Figure 60:
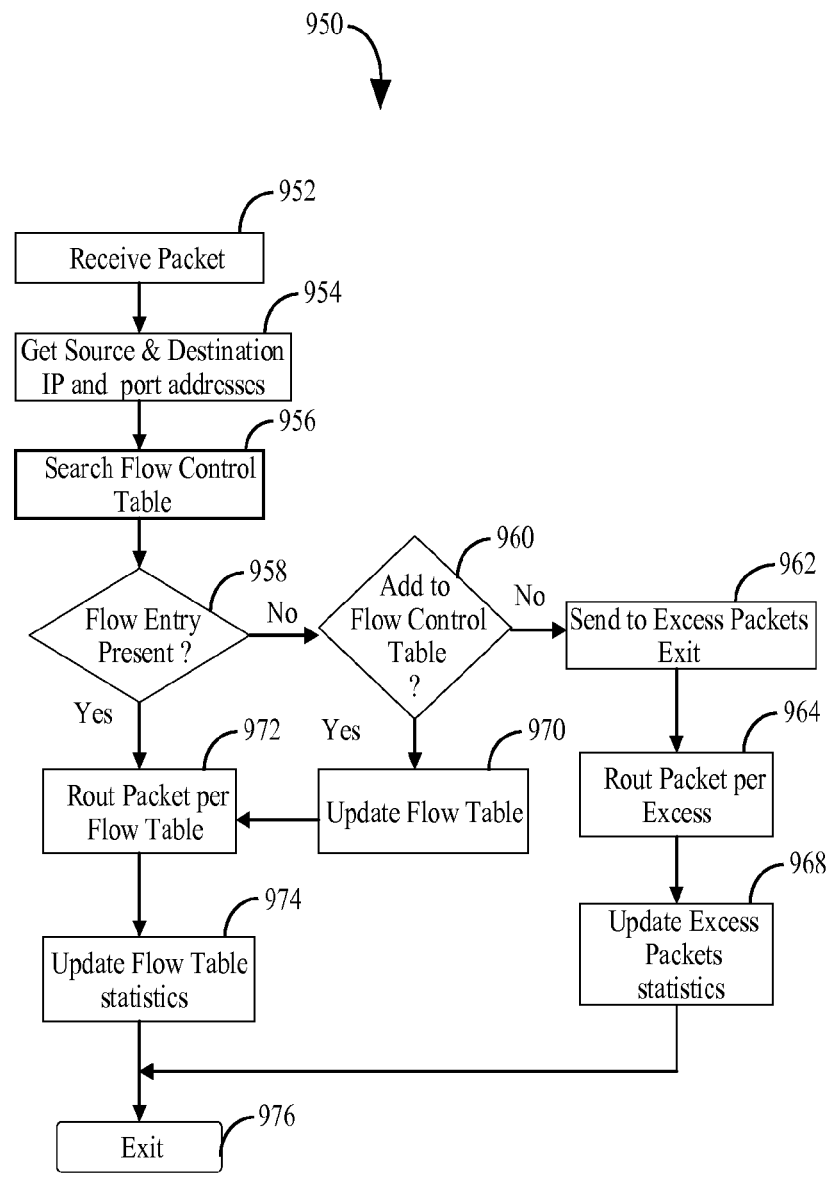
FIG. 60 is a flowchart illustrating a flow control table search.

FIG. 60 is a flowchart 950 of a flow control table search. The input query packet is received as shown at block 952. The source IP address, destination IP address and port address are extracted from the input query packet 12 as shown at block 954. A search is made to check a flow entry in a flow control table as shown in the block 956. If the searched flow entry is not found in the flow control table, a check 958 determines whether to add the flow entry in the flow control table as shown at block 960. If the flow entry is not added, the flow entry is sent to excess packet as shown at block 962. The packet per excess are routed as shown at block 964 and the excess packet statistics are updated as shown at block 968. If the flow entry is added to the flow table, the flow control table is updated as shown in the block 970. If the flow entry is present in the flow control table the packet per flow table is routed as shown in the block 972 and the flow table statistics is updated as shown at block 974 and the flow control search terminates as shown at block 976.

FIG. 61 A shows typical contents of the flow control table 980 that has a plurality of table entries similar to an access control list. A flow control is attained by setting a permit/deny flag 986 in the table entry corresponding to a source IP 982, a port address 984 thereby selecting a destination IP 988 and a destination port address 990. There may be other table entries 1000 in the flow control table 980.

FIG. 61 B shows a compressed access control list 1002 that uses the RP 10 to perform a search operation on the source IPV6 and produces a 12 bit source associate 1004 that selects the source port 1006, the destination port 1010 and a destination associate 1008 that is used to look up additional control information on the destination. The compressed access control list 1002 requires 78 bits and allows for 4095 ports. There may be other table entries 1012 in the compressed access control list 1002.

Figure 62A:
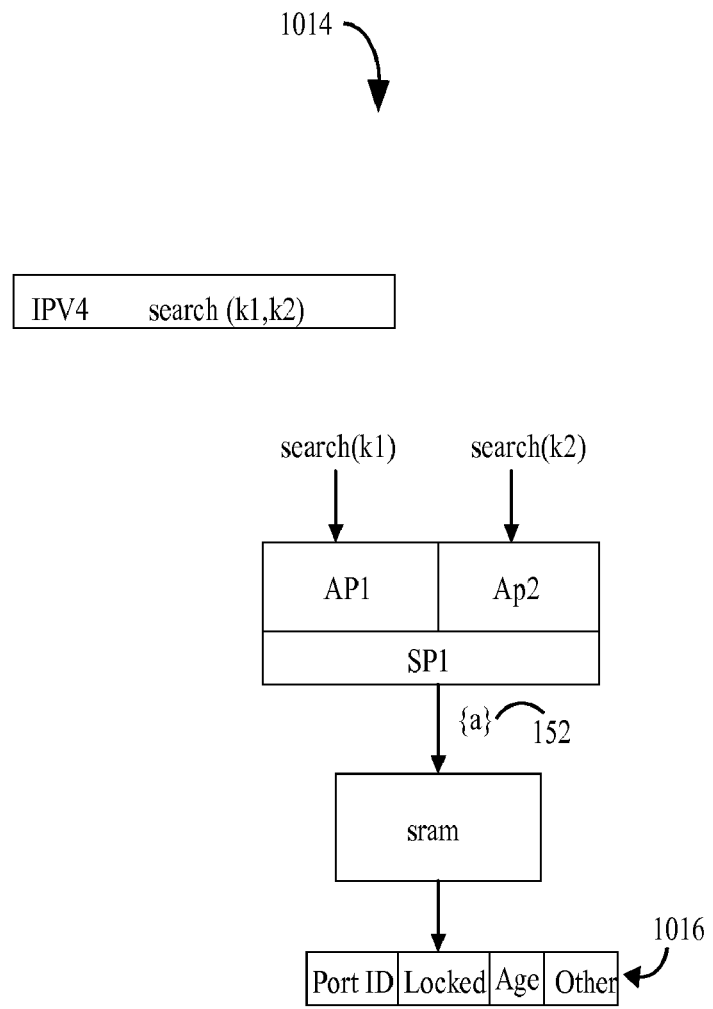
FIG. 62 A is a schematic diagram illustrating IPV4 packet header of the RP configured to perform a two dimensional search of the flow control table.
Figure 62B:
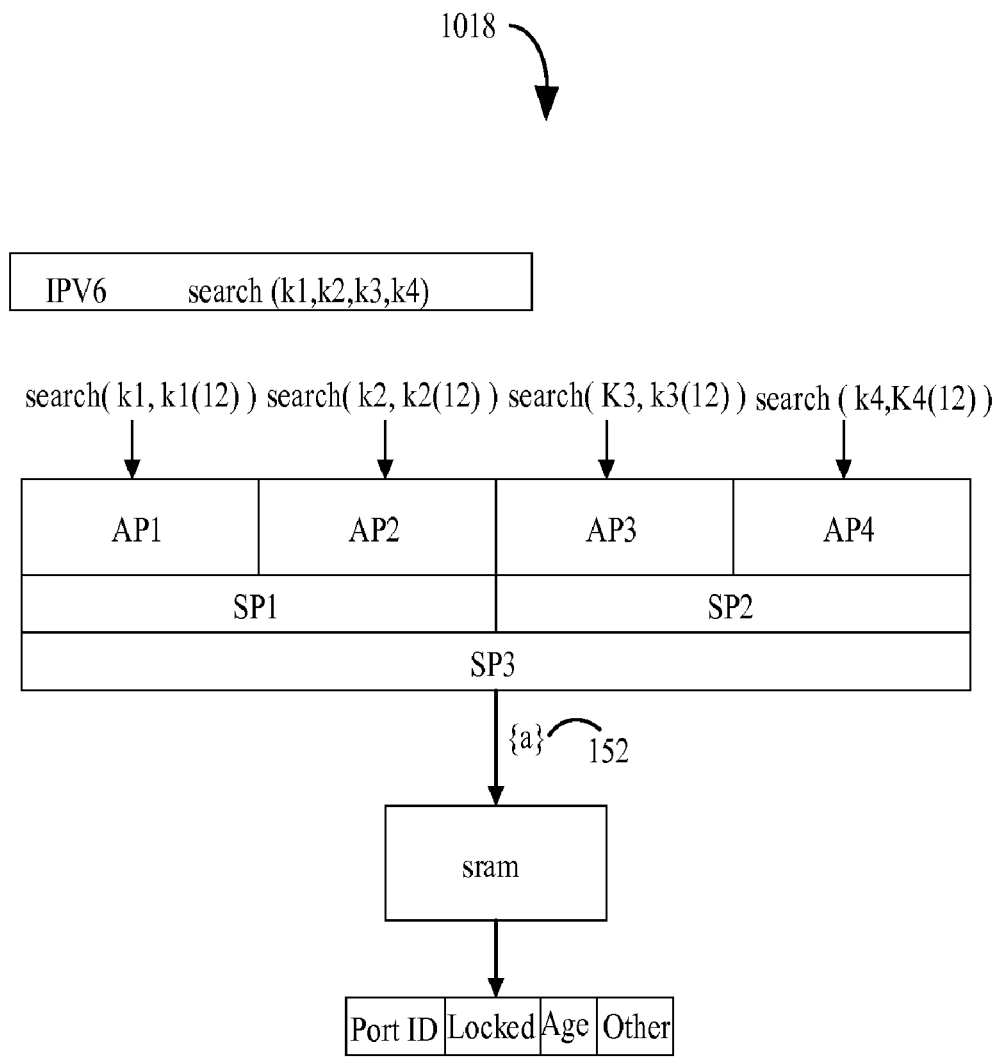

FIG. 62 A shows an IPV4 configuration 1014 of RP 10 configured to perform a two dimensional search of the flow control table 980. The output is used to access a SRAM for routing information 1016. The response associate, {a} indicated as 152 produced by the SP 22 may include the routing information 1016 eliminating the need for the SRAM. The routing information 1016 includes port ID, age, status or the like.

FIG. 62 B shows an IPV6 configuration 1018 of RP 10 having the same response associate 152. The associate may be defined to contain the Port ID, and other information such that the sram being accessed by {a} 152 shown is unnecessary.

The RP 10 is applicable in areas including relational databases, virtualized packet switching databases at various open systems interconnections (OSI) levels, direct storage management, storage area networks, data compression and cryptography, robotics and artificial intelligence applications, sensor fusion systems and radar and electronic countermeasures signal sorting.

Although specific embodiments of the invention have been described and illustrated, the invention is not to be limited to the specific forms or arrangements of parts as described and illustrated herein. The invention is limited only by the claims.

What is claimed is:

1. A method to create, maintain and query a relational database R by assigning, storing and retrieving a unique associate for each instance of a relation for one or more said relations and a plurality of said instances of said relation, the method comprising
    (a) providing input to receive data comprised of relations, relational instances and queries;
    (b) providing processing to assign an integer i for a relation R making Ri thereby allowing multiple relations, each relation having its own number k of domains making relations of the form Ri (d1, d2, through dk) where d1 is domain 1 and dk is the $k^{th}$ domain;
    (c) providing processing to assign the integer j to the $j^{th}$ instance of said Ri making Rij;
    (d) providing processing to make an associate aij comprising said i and said j;
    (e) providing processing to decompose said Rij into said k single domain relations making rij comprising rij (d1), rij (d2), through rij (dk);
    (f) providing processing to make k single domain relation keys comprising the relation index i and the domain values |d1|, |d2| through |dk|;
    (g) providing associate memory to store said aij (also called: insert command) for each said rij (d1), rij (d2), through rij (dk) using said single domain relation keys;
    (h) providing processing to retrieve (also called: search command) from said memory selected sets of associates denoted {aij} 1, {aij} 2, through {aij} k corresponding to said rij (d1), rij (d2), through rij (dk) using said single domain relation keys;
    (i) providing memory to store said k sets of single domain relation associates {aij} 1, {aij} 2, through {aij} k obtained from said single domain relation searches;
    (j) providing processing to perform intra domain set operations comprising the intersection operation and which may include the additional set operations union, difference and complement in any combination which operations act on said sets {aij} 1, {aij} 2, through {aij} k making a response set {aij} satisfying said query;
    (k) providing output to transmit said response set {aij}.

2. The method of claim 1 providing processing for any combination of the following operations
    (a) for a NOP command that prevents a retrieval operation on a specified said single domain relation;
    (b) for a delete command that causes said relation instance Rij to be removed from the relation Ri by using said single domain keys to remove said aij from memory.

3. The method of claim 1 providing processing to automatically allocate said associate aij for said relation instance Rij when adding the Rij to the database and to automatically deallocate said associate aij for reuse when removing said relational instance Rij from the database thereby enabling creation and maintenance of a dynamically changing database.

4. Implementations of the method of claim 1 comprising semiconductors, software, firmware, programmable gate arrays, and discrete logic, random access memory, content addressable memory, serial memory, disk and tape storage in any combination.

5. The method in claim 1 where said associate aij may additionally include a semantic token comprising data or control for one or more internal or external processes.

6. A relational processor (RP) to create, maintain and query a relational database by assigning, storing and retrieving a unique associate for each instance of a relation for one or more relations and a plurality of instances of a relation, comprising
    (a) input means to receive data comprised of one or more relations, one or more relation instances, and one or more queries with additional means to
        (1) assign an integer i to a relation R making an Ri thereby allowing multiple relations each with its own number of domains k making relations of the form Ri (d1, d2, through dk) where a dk is the $k^{th}$ domain;
        (2) assign the integer j to the $j^{th}$ instance of said Ri making Rij;

(3) make an associate aij comprising said i and said j;
(4) output said Rij, said aij and said query;

(b) an Associate Array Manager (AAM) with means to
(1) receive said Rij, said aij and said query from the input means;
(2) decompose said Rij into k single domain instances rij making rij (d1), rij (d2), through rij (dk);
(3) make k single domain relation keys comprised of the relation index i and the domain value i|d1|, i|d2| through i|dk|;
(4) make k single domain relation commands comprising retrieve (also called the search command) and store (also called the insert command);
(5) output said domain keys i|d1|, i|d2| through i|dk| and said k commands to a specified Associate Processor for each of the k domains;

(c) one or more Associate Processors (AP) each including memory means each with processing means to
(1) receive the single domain keys i|d1|, i|d2| through i|dk|, the aij and the k single domain commands from the AAM;
(2) store in said memory said associate aij using said single domain keys i|d1|, i|d2| through i|dk|, if said Rij does not exist in the database;
(3) retrieve from said memory for each said single domain key the corresponding sets of associates denoted $\{aij\}$ 1, $\{aij\}$ 2, through $\{aij\}$ k;
(4) output said associate sets $\{aij\}$ 1, $\{aij\}$ 2, through $\{aij\}$ k to one or more Set Processors (SP);

(d) one or more Set Processors each comprising
(1) input means to receive intra single domain commands comprising at least AND for each said single domain;
(2) input means to receive said sets $\{aij\}$ 1, $\{aij\}$ 2, through $\{aij\}$ k output by one or more said AP;
(3) memory (also known as Set Memory) and processing means to store said associate sets implicitly using said indices i, j and k where implicitly comprises using the indices i and j to address a word in said Set Memory (also called the Set Memory Word) and the indices 1, 2, through k to set bit 0, bit 1, through bit k−1 in said Set Memory Word, for each aij that is in said associate sets $\{aij\}$ 1, $\{aij\}$ 2, through $\{aij\}$ k;
(4) logic processing means to perform the set intersection operation on said sets $\{aij\}$ 1, $\{aij\}$ 2, through $\{aij\}$ k making the response set $\{aij\}$ using said Set Memory words;
(5) output means for outputting associates $\{aij\}$ responsive to a query.

7. The SPs of claim 6 wherein each said SP has two or more said input means and one said output means and each said SP's output may be connected to the input of different SP whereby for said RP with three or more said APs said sets $\{aij\}$ 1, $\{aij\}$ 2, through $\{aij\}$ k output by each AP produce one said response set $\{aij\}$.

8. The AP of claim 6 wherein each said AP includes processing means to remove said relation instance Rij by removing said associate aij from said memory for each said single domain relation key in each said AP memory (also called the delete command) and storing the aij for reuse in memory means, if relation instance Rij exists in the database.

9. The AP of claim 6 wherein each said AP includes a no-operation-command (also called the NOP command) that prevents retrieval of associates for the specified single domain relation instance.

10. The RP of claim 6 wherein the RP further includes an associate switch (AS) comprising at least one input port means and a plurality of output port means and a routing means that routs specific associates by value to a specific SP selected from the plurality of SPs.

11. The SP of claim 6 wherein each said SP signals every other AP, SP and the AAM upon detecting that the aij corresponding to Rij is not in the SP memory whereby the search is terminated and the search accelerated.

12. The SP of claim 6 wherein the intra domain set operations for sets retrieved for said instances rij (d1), rij (d2), through rij (dk) may also include the set operations union, complement, and difference in any combination.

13. The SP of claim 6 wherein the SP uses a random access memory for Set Memory to store said associate sets $\{aij\}$ 1, $\{aij\}$ 2, through $\{aij\}$ k retrieved by said query.

14. The SP of claim 6 wherein the SP uses memory means (called Ideal Set Memory) is comprised of random access memory with a ready bit for each word that can be reset at the beginning of the query and set at first access, to store said associate sets $\{aij\}$ 1, $\{aij\}$ 2, through $\{aij\}$ k retrieved according to the query.

15. The RP of claim 6 wherein the associates sets $\{aij\}$ 1, $\{aij\}$ 2, through $\{aij\}$ k output by the one or more APs are input to an Associate Switch AS which comprises means to receive the AP output, means to rout said associates to one of plurality of SPs based on the value of each associate.

16. The SP of claim 15 wherein said SP generates a search termination signal upon detecting the output associate and causes operations on every said AP, every said SP and the AS to terminate whereby the search command is accelerated and the insert and delete commands may be accelerated.

17. The RP of claim 6 wherein the RP further comprises a response collector (RC) comprising one or more input means and processing means to collect associates from said SPs and transmit the associates to the output means.

18. The RP in claim 6 where said AP memory, said input memory, said output memory and said Response Collector memory means are selected from random access memory technologies.

19. The AP of claim 6 wherein each said AP signals every other AP, SP and the AAM upon detecting that the aij corresponding to an rij is not in the AP memory whereby the is terminated and the search accelerated and the insert and delete commands may be accelerated.

20. The SP of claim 6 where the SP compares the bits in said Set Memory Word with the bits in a Response Requirement Word comprised of k bits for which one distinct bit is set for each domain 1, 2, through k required by the query to determine if said associate aij is a valid response to a query.

* * * * *